(12) United States Patent
Fukagawa et al.

(10) Patent No.: US 9,151,883 B2
(45) Date of Patent: Oct. 6, 2015

(54) CELLULOSE ACYLATE FILM, RETARDATION FILM, POLARIZER AND LIQUID-CRYSTAL DISPLAY DEVICE

(71) Applicant: FUJIFILM Corporation, Tokyo (JP)

(72) Inventors: Nobutaka Fukagawa, Kanagawa (JP); Masato Nagura, Kanagawa (JP); Takayasu Yasuda, Kanagawa (JP); Takahiro Ohno, Kanagawa (JP); Satoshi Tanaka, Kanagawa (JP); Aiko Yamamoto, Kanagawa (JP); Aiko Yoshida, Kanagawa (JP); Shinya Watanabe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/327,193

(22) Filed: Jul. 9, 2014

(65) Prior Publication Data

US 2014/0318413 A1 Oct. 30, 2014

Related U.S. Application Data

(63) Continuation of application No. 13/498,865, filed as application No. PCT/JP2010/066951 on Sep. 29, 2010, now Pat. No. 8,906,475.

(30) Foreign Application Priority Data

Sep. 29, 2009 (JP) ................................. 2009-225479

(51) Int. Cl.
*C09K 19/00* (2006.01)
(Continued)

(52) U.S. Cl.
CPC .................................. *G02B 5/3083* (2013.01);
(Continued)

(58) Field of Classification Search
CPC ............... C08L 1/10; C08L 1/12; C08L 1/14; C08J 5/01; C08J 2301/10; C08J 2301/12; C08J 2301/14; B32B 5/08; B32B 5/20; B32B 27/06; B32B 23/20; C08K 5/34; C08K 5/3412; C08K 5/3492; Y10T 428/10; Y10T 428/1041; Y10T 428/1036
USPC .................... 428/1.1, 1, 3; 349/75, 117, 118; 359/489.07; 106/170.1, 162.9, 164.3; 528/289; 544/193

See application file for complete search history.

(56) References Cited

U.S. PATENT DOCUMENTS 5,480,947 A 1/1996 Oishi et al.
(Continued)

FOREIGN PATENT DOCUMENTS

CN 1872901 A 12/2006
(Continued)

OTHER PUBLICATIONS

Chinese Second Office Action issued by SIPO on Jul. 29, 2014 in connection with corresponding Chinese Patent Application No. 201080053972.7.
(Continued)

*Primary Examiner* — Ruiyun Zhang
(74) *Attorney, Agent, or Firm* — Jean C. Edwards, Esq.; Edward Neils PLLC

(57) ABSTRACT

Provide is a cellulose acylate film, of which the environmental humidity-dependent retardation change is small and which, when stuck to a polarizer and used in high-temperature and high-humidity environments, is effective for preventing the polarizing element from being deteriorated. A cellulose acylate film, which contains a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent: (A) the compound has both a hydrogen-bonding donor part and a hydrogen-bonding acceptor part in one molecule, (B) the value computed by dividing the molecular weight of the compound by the total number of the hydrogen-bonding donor number and the hydrogen-bonding acceptor number in the compound is from 30 to 65, and (C) the total number of the aromatic ring structures in the compound is from 1 to 3.

5 Claims, 1 Drawing Sheet

(51) Int. Cl.

| | |
|---|---|
| *G02B 5/30* | (2006.01) |
| *B32B 23/08* | (2006.01) |
| *B32B 23/20* | (2006.01) |
| *B32B 27/06* | (2006.01) |
| *B32B 27/18* | (2006.01) |
| *B32B 27/30* | (2006.01) |
| *C08J 5/18* | (2006.01) |
| *C08B 3/22* | (2006.01) |
| *C08B 15/00* | (2006.01) |
| *C08L 1/10* | (2006.01) |
| *C08L 1/12* | (2006.01) |
| *C08L 1/14* | (2006.01) |
| *C08K 5/103* | (2006.01) |
| *C08K 5/151* | (2006.01) |
| *C08K 5/34* | (2006.01) |

(52) U.S. Cl.
CPC ............... *B32B 23/08* (2013.01); *B32B 23/20* (2013.01); *B32B 27/06* (2013.01); *B32B 27/18* (2013.01); *B32B 27/30* (2013.01); *C08B 3/22* (2013.01); *C08B 15/005* (2013.01); *C08J 5/18* (2013.01); *C08K 5/103* (2013.01); *C08K 5/151* (2013.01); *C08K 5/34* (2013.01); *C08L 1/10* (2013.01); *C08L 1/12* (2013.01); *C08L 1/14* (2013.01); *C08J 2301/10* (2013.01); *Y10T 428/10* (2015.01); *Y10T 428/1036* (2015.01); *Y10T 428/1041* (2015.01)

(56) References Cited

U.S. PATENT DOCUMENTS

| | | | |
|---|---|---|---|
| 6,630,973 | B1 | 10/2003 | Matsuoka et al. |
| 7,445,821 | B2 | 11/2008 | Michihata |
| 8,158,220 | B2 | 4/2012 | Nagura et al. |
| 2005/0271834 | A1* | 12/2005 | Michihata ............ 428/1.31 |
| 2006/0275560 | A1 | 12/2006 | Fukagawa et al. |

FOREIGN PATENT DOCUMENTS

| | | |
|---|---|---|
| JP | 06-345941 A | 12/1994 |
| JP | 2001-166144 A | 6/2001 |
| JP | 2004-109410 A | 4/2004 |
| JP | 2005-139304 A | 6/2005 |
| JP | 2005-206696 A | 8/2005 |
| JP | 2006-022306 A | 1/2006 |
| JP | 2006-089529 A | 4/2006 |
| JP | 2006-342227 A | 12/2006 |
| JP | 2007-009181 A | 1/2007 |
| JP | 2009-173818 A | 8/2009 |

OTHER PUBLICATIONS

International Preliminary Report on Patentability (IPRP), which issued on Apr. 12, 2012 in PCT/JP2010/066951.
First Office Action issued by the State intellectual Property Office of the People's Republic of China (SIPO) on Oct. 22, 2013, in connection with CN201080053972.7.
Japanese Official Action issued by JPO on Oct. 29, 2013, in connection with corresponding Japanese Patent Application No. 2010-217618.
Third Office Action issued by SIPO on Jan. 22, 2015 in connection with corresponding Chinese Patent Application No. 201080053972.7.

* cited by examiner

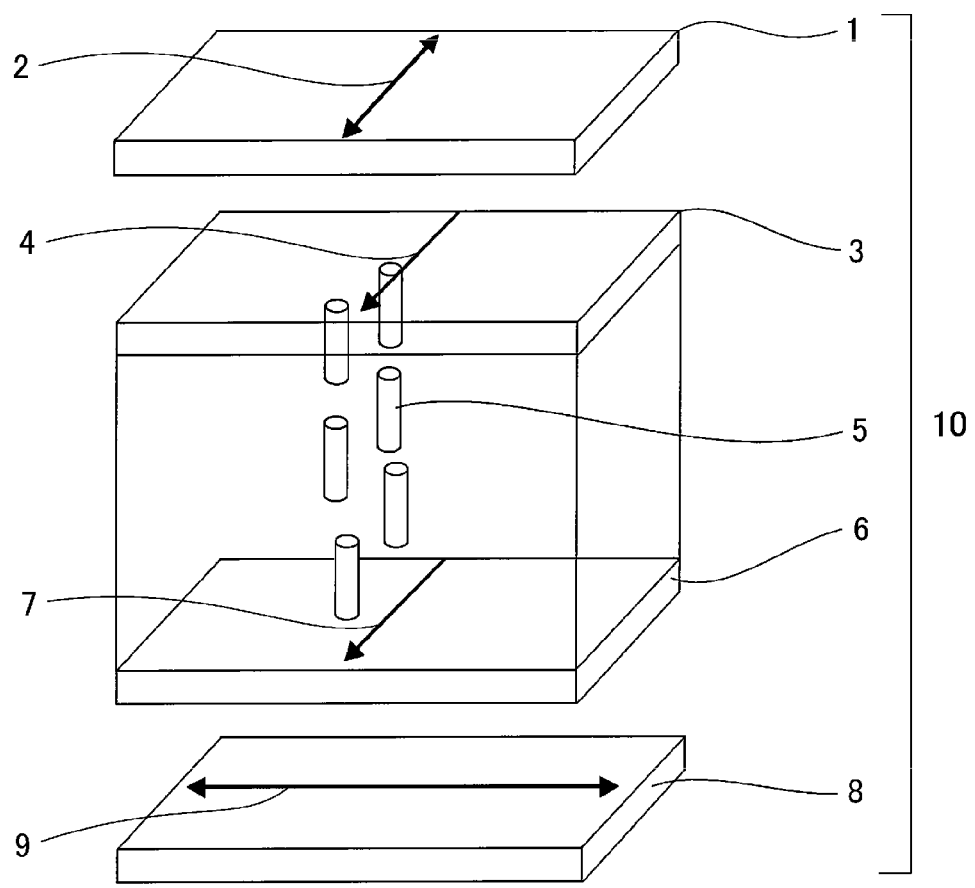

CELLULOSE ACYLATE FILM, RETARDATION FILM, POLARIZER AND LIQUID-CRYSTAL DISPLAY DEVICE

CROSS-REFERENCE TO RELATED APPLICATIONS

The present invention is a continuation application of U.S. patent application Ser. No. 13/498,865, filed Mar. 28, 2012, which is a 35 U.S.C. 371 National Stage Entry of PCT/JP2010/066951, filed Sep. 29, 2010, which claims priority from Japanese Patent Application No. 2009-225479, filed on Sep. 29, 2009, the contents of all of which are herein incorporated by reference in their entirety.

TECHNICAL FIELD

The present invention relates to a cellulose acylate film, a retardation film, and to a polarizer and a liquid-crystal display device using the cellulose acylate film.

BACKGROUND ART

Use of liquid-crystal display devices is expanding year by year as energy-saving and space-saving image display devices. Heretofore, one serious defect of liquid-crystal display devices is that the display image viewing angle dependence of the devices is large. Recently, however, wide viewing angle liquid-crystal display modes such as VA-mode and the like have become put into practical use, and accordingly, even in the market of televisions and others that require high-quality images, the demand for liquid-crystal display devices is rapidly expanding now.

The basic constitution of the liquid-crystal display device comprises a liquid-crystal cell with a polarizer arranged on both sides of the cell. The polarizer plays a role of transmitting a light polarized in a predetermined direction alone, and the performance of a liquid-crystal display device greatly depends on the performance of the polarizer therein. The polarizer generally comprises a polarizing element with a transparent protective film stuck to both sides thereof, in which the polarizing element is formed of a polyvinyl alcohol film or the like having adsorbed iodine or dye through alignment thereon. A cellulose acylate film of typically cellulose acetate has high transparency and can readily secure strong adhesiveness to polyvinyl alcohol used as the polarizing element, and is widely used as a polarizer protective film.

It is known that disposing a retardation film between the polarizer and the liquid-crystal cell in a liquid-crystal display device realizes wider viewing angles, or that is, improves display characteristics. As the retardation film, a cellulose acylate film is specifically noted that can express excellent optical properties, concretely excellent in-plane retardation Re (nm) and thickness-direction retardation Rth (nm) of the retardation film; and such a cellulose acylate film is used in a liquid-crystal display device as the retardation film therein.

Some additives are known, which are added to cellulose acylate film to improve the performance of the film. As one known compound usable as an additive to cellulose acylate film, there may be mentioned a retardation enhancer. Patent Reference 1 discloses, as a retardation enhancer, a compound capable of forming a molecular complex that contains a keto-enol tautomerizable compound as the constituent element thereof, concretely disclosing, as one example thereof, a compound that has a 1,3,5-triazine ring-containing structure such as a guanamine skeleton or the like. Similarly, Patent Reference 2 discloses, as a compound capable of increasing Rth of cellulose acetate film when added thereto, a retardation enhancer comprising a discotic compound. The retardation enhancer disclosed in this patent reference is a discotic compound, and, as one example thereof, disclosed is a structure containing a 1,3,5-triazine ring or a porphyrin skeleton.

With the recent tendency toward expanding use of liquid-crystal display devices, use of those devices for large-size and high-definition televisions and others has become expanded, and the requirements for the quality of polarizer, retardation film and polarizer protective film are much increasing. In particular, large-size and high-quality liquid-crystal display devices are desired to be used in various severer environments than before. From such viewpoints, the cellulose acylate film for use in liquid-crystal display devices is earnestly desired to satisfy both the requirement for resistance to optical performance change depending on the environmental humidity and the requirement for protection of polarizer in use in high-temperature and high humidity environments.

However, already-existing cellulose acylate films, including those containing, as added thereto, a retardation enhance having a specific structure as in the above-mentioned Patent Reference 1 or 2, could not sufficiently satisfy both the requirement for resistance to optical performance change depending on the environmental humidity and the requirement for protection of polarizer in use in high-temperature and high humidity environments.

Given the requirements as above, for example, Patent Reference 3 discloses a method of using a cellulose acylate film having a specific degree of acyl substitution to thereby enhance the resistance to optical performance change depending on the environmental humidity and enhance the resistance to performance change in use in high-temperature and high humidity environments.

Regarding the method of enhancing the resistance to performance change depending on the environmental humidity and enhancing the resistance to performance change in use in high-temperature and high humidity environments, by adding additive to cellulose acylate film, Patent Reference 4 discloses a method of using a cellulose acylate film that contains a polyester, and a polyalcohol ester or an aromatic-terminated ester.

CITATION LIST

Patent References

Patent Reference 1: JP-A 2004-109410
Patent Reference 2: JP-A 2001-166144
Patent Reference 3: JP-A 2006-089529
Patent Reference 4: JP-A 2006-342227

SUMMARY OF THE INVENTION

Problems that the Invention is to Solve

The present inventors investigated the methods described in the above-mentioned Patent References 3 and 4, and have found that the method described in Patent Reference 3 is insufficient in point of satisfying both the resistance to optical performance change depending on the environmental humidity and the polarizer protection in use in high-temperature and high humidity environments. In addition, the method has another problem in that, when the degree of acyl substitution of the cellulose acylate of cellulose acylate film is specifically defined, then the retardation control range of the film is narrowed and therefore the retardation of the film could be controlled to be applicable only to liquid-crystal display of a specific liquid-crystal cell mode. The method described in Patent Reference 4 could attain a certain effect, but has been found to be still unsatisfactory for recent high-quality liquid-crystal display devices, and further improvement of those methods is desired.

An object of the invention is to provide a cellulose acylate film, of which the environmental humidity-dependent retardation change is small and which, when stuck to a polarizer and used in high-temperature and high-humidity environments, is effective for preventing the polarizing element from being deteriorated. Another object is to provide a retardation film using the cellulose acylate film, and a polarizer and a liquid-crystal display device using the film.

Means for Solving the Problems

For the purpose of solving the above-mentioned problems, the present inventors have assiduously studied and, as a result, have found that a compound having a structure similar to that of the compound described in Patent Reference 1 or 2 is one compound useful for solving the above-mentioned problems. Given the situation, the inventors have promoted studies for further improvements and, as a result, have found that simultaneous addition of a hydrogen-bonding compound satisfying the following requirements (A) to (C) and a specific hydrophobizing agent solves the above-mentioned problems. Specifically, the above-mentioned problems can be solved by the invention having the constitution mentioned below.

[1] A cellulose acylate film, which contains a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent:

(A) the compound has both a hydrogen-bonding donor part and a hydrogen-bonding acceptor part in one molecule, (B) the value computed by dividing the molecular weight of the compound by the total number of the hydrogen-bonding donor number and the hydrogen-bonding acceptor number in the compound is from 30 to 65, and (C) the total number of the aromatic ring structures in the compound is from 1 to 3.

[2] The cellulose acylate film of [1], wherein the hydrogen-bonding compound is a compound represented by the following general formula (A-1):

[Chemical Formula 1]

General Formula (1)

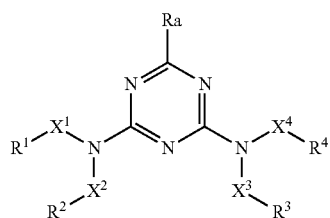

(In the general formula (A-1), Ra represents an alkyl group, an alkenyl group, an alkynyl group, a heterocyclic group or an aryl group; X1, X2, X3 and X4 each independently represent a single bond or a divalent linking group; R1, R2, R3 and R4 each independently represent a hydrogen atom, an alkyl group, an alkenyl group, an alkynyl group, an aryl group or a heterocyclic group.)

[3] The cellulose acylate film of [1], wherein the hydrogen-bonding compound is a compound represented by the following general formula (B-1):

[Chemical Formula 2]

General Formula (B-1)

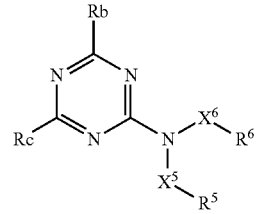

(In the general formula (B-1), Rb and Rc each independently represent an alkyl group, an alkenyl group, an alkynyl group, a heterocyclic group or an aryl group; X5 and X6 each independently represent a single bond or a divalent linking group; R5 and R6 each independently represent a hydrogen atom, an alkyl group, an alkenyl group, an alkynyl group, an aryl group or a heterocyclic group.)

[4] The cellulose acylate film of any one of [1] to [3], wherein in the general formulae (A-1) and (B-1), X1, X2, X3, X4, X5 and X6 each are independently at least one selected from a single bond and divalent linking groups represented by the following general formula (P):

[Chemical Formula 3]

General Formula (P)

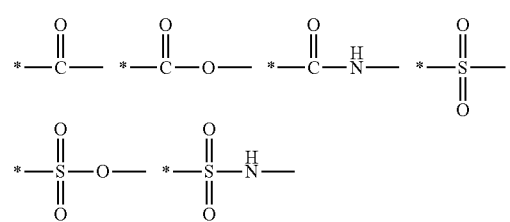

(In the general formula (P), the side * is the linking site via which the formula links with the N atom substituting on the 1,3,5-triazine ring in the compound represented by the general formulae (A-1) and (B-1).)

[5] The cellulose acylate film of [1], wherein the hydrogen-bonding compound is a compound represented by the following general formula (C-1):

[Chemical Formula 4]

General Formula (C-1)

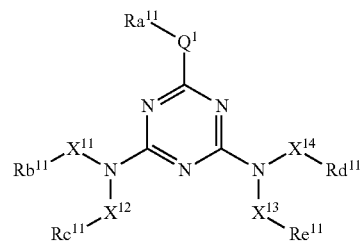

(In the general formula (C-1), Ra11 represents an alkyl group, an alkenyl group, an alkynyl group, a heterocyclic group or an aryl group; Rb11, Rc11, Rd11 and Re11 each independently represent a hydrogen atom, an alkyl group, an alkenyl group, an alkynyl group, an aryl group or a heterocyclic group; Q1 represents —O—, —S— or —NRf—; Rf represents a hydrogen atom, an alkyl group, an alkenyl group, an alkynyl group, an aryl group or a heterocyclic group, and may link with Ra to form a ring; X11, X12 and X13 each independently represent a single bond or a divalent linking group; X14 represents a linking group selected from divalent linking groups represented by the following general formula (P):

[Chemical Formula 5]

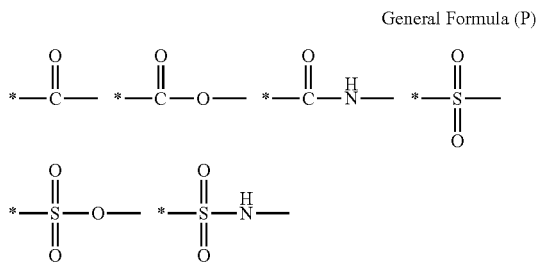

General Formula (P)

(In the general formula (P), the side * is the linking site via which the formula links with the N atom substituting on the 1,3,5-triazine ring in the compound represented by the general formulae (C-1).)

[6] The cellulose acylate film of [1], wherein the hydrogen-bonding compound is a compound represented by the following general formula (D-1):

[Chemical Formula 6]

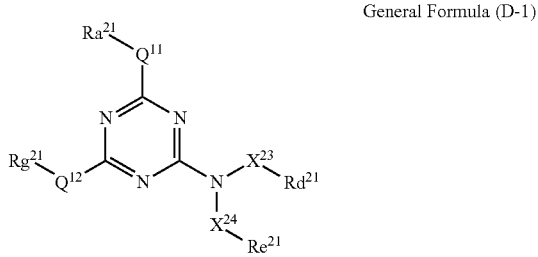

General Formula (D-1)

(In the general formula (D-1), Ra21 and Rg21 each represent an alkyl group, an alkenyl group, an alkynyl group, a heterocyclic group or an aryl group; Rd21 and Re21 each independently represent a hydrogen atom, an alkyl group, an alkenyl group, an alkynyl group, an aryl group or a heterocyclic group; Q11 represents —O—, —S— or —NRf—; Rf represents a hydrogen atom, an alkyl group, an alkenyl group, an alkynyl group, an aryl group or a heterocyclic group, and may link with Ra21 to form a ring; Q12 represents —O—, —S— or —NRh—; Rh represents a hydrogen atom, an alkyl group, an alkenyl group, an alkynyl group, an aryl group or a heterocyclic group, and may link with Rg21 to form a ring; X23 represents a single bond or a divalent linking group; X24 represents a linking group selected from divalent linking groups represented by the following general formula (P):

[Chemical Formula 7]

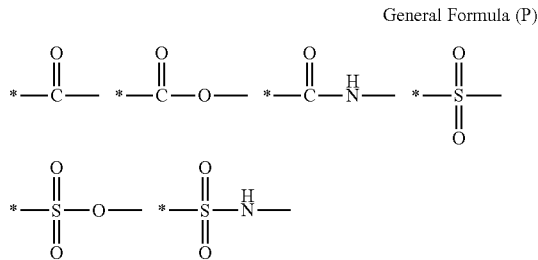

General Formula (P)

(In the general formula (P), the side * is the linking site via which the formula links with the N atom substituting on the 1,3,5-triazine ring in the compound represented by the general formula (D-1).)

[7] The cellulose acylate film of [1], wherein the hydrogen-bonding compound is a compound represented by the following general formula (E-1):

[Chemical Formula 8]

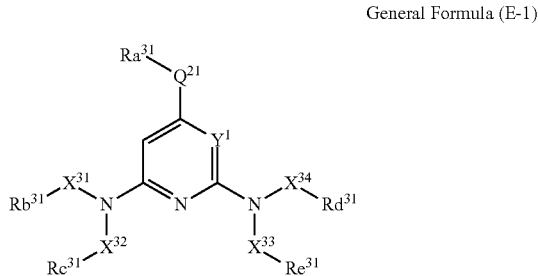

General Formula (E-1)

(In the general formula (E-1), Y1 represents a methine group or —N—; Ra31 represents an alkyl group, an alkenyl group, an alkynyl group, an aryl group or a heterocyclic group; Rb31, Rc31, Rd31 and Re31 each independently represent a hydrogen atom, an alkyl group, an alkenyl group, an alkynyl group, an aryl group or a heterocyclic group; Q21 represents a single bond, —O—, —S— or —NRf—; Rf represents a hydrogen atom, an alkyl group, an alkenyl group, an alkynyl group, an aryl group or a heterocyclic group, and may link with Ra31 to form a ring; X31, X32 and X33 each independently represent a single bond or a divalent linking group; X34 represents a linking group selected from divalent linking groups represented by the following general formula (Q):

[Chemical Formula 9]

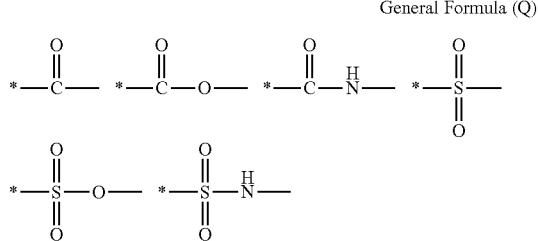

General Formula (Q)

(In the general formula (Q), the side * is the linking site via which the formula links with the N atom substituting on the hetero ring in the compound represented by the general formula (E-1).)

[8] The cellulose acylate film of [1], wherein the hydrogen-bonding compound is a compound represented by the following general formula (F-1):

[Chemical Formula 10]

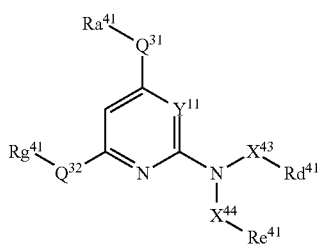

General Formula (F-1)

(In the general formula (F-1), Y11 represents a methine group or —N—; Ra41 and Rg41 each represent an alkyl group, an alkenyl group, an alkynyl group, an aryl group or a heterocyclic group; Rd41 and Re41 each independently represent a hydrogen atom, an alkyl group, an alkenyl group, an alkynyl group, an aryl group or a heterocyclic group; Q31 represents —O—, —S— or —NRf—; Rf represents a hydrogen atom, an alkyl group, an alkenyl group, an alkynyl group, an aryl group or a heterocyclic group, and may link with Ra41 to form a ring; Q32 represents —O—, —S— or —NRh—; Rh represents a hydrogen atom, an alkyl group, an alkenyl group, an alkynyl group, an aryl group or a heterocyclic group, and may link with Rg41 to form a ring; X43 represents a single bond or a divalent linking group; X44 represents a linking group selected from divalent linking groups represented by the following general formula (P):

[Chemical Formula 11]

General Formula (P)

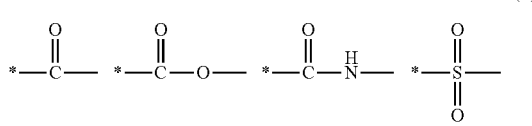

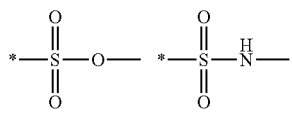

(In the general formula (P), the side * is the linking site via which the formula links with the N atom substituting on the hetero ring in the compound represented by the general formula (F-1).)

[9] The cellulose acylate film of [1], wherein the hydrogen-bonding compound is a compound represented by the following general formula (G-1):

[Chemical Formula 12]

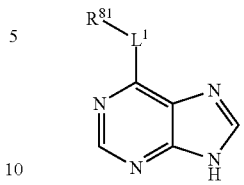

General Formula (G-1)

(In the general formula (G-1), L1 represents a single bond or a hetero atom-containing divalent linking group; R81 represents a hydrogen atom, an alkyl group having from 1 to 20 carbon atoms, an alkenyl group having from 2 to 20 carbon atoms, an alkynyl group having from 2 to 20 carbon atoms, an aryl group having from 6 to 20 carbon atoms, or an arylalkyl group having from 7 to 20 carbon atoms.)

[10] The cellulose acylate film of [1], wherein the hydrogen-bonding compound is a compound represented by the following general formula (H-1):

[Chemical Formula 13]

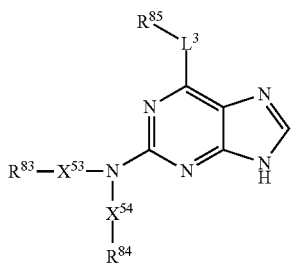

General Formula (H-1)

(In the general formula (H-1), L3 represents a single bond or a hetero atom-containing divalent linking group; R85 represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms, or an arylalkyl group having from 7 to 20 carbon atoms; R83 and R84 each independently represent a hydrogen atom, an alkyl group, an alkenyl group, an alkynyl group, an aryl group or a heterocyclic group; X53 and X54 each independently represent a linking group selected from divalent linking groups represented by the following general formula (P):

[Chemical Formula 14]

General Formula (P)

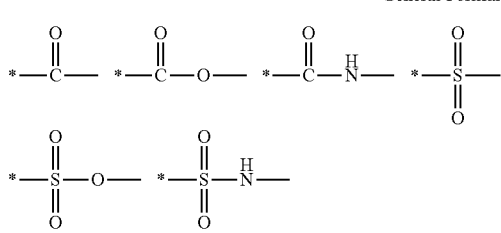

(In the general formula (P), the side * is the linking site via which the formula links with the N atom substituting on the hetero ring in the compound represented by the general formula (H-1).)

[11] The cellulose acylate film of any one of [1] to [10], wherein the molecular weight of the hydrogen-bonding compound is from 100 to 1000.
[12] A retardation film containing the cellulose acylate film of any one of [1] to [11].
[13] A polarizer containing the cellulose acylate film of any one of [1] to [11] or the retardation film of [12].
[14] A liquid-crystal display device containing the cellulose acylate film of any one of [1] to [11], the retardation film of [12] or the polarizer of [13].

Advantage of the Invention

There are provided a cellulose acylate film, of which the environmental humidity-dependent retardation change is small and which, when stuck to a polarizer and used in high-temperature and high-humidity environments, is effective for preventing the polarizing element from being deteriorated, and a retardation film, a polarizer and a liquid-crystal display device using the film.

BRIEF DESCRIPTION OF THE DRAWING

FIG. 1 This is a schematic view showing an example of the liquid-crystal display device of the invention.

MODE FOR CARRYING OUT THE INVENTION

[Cellulose Acylate Film]

The cellulose acylate film of the invention contains a hydrogen-bonding compound satisfying the following requirements (A) to (C) (hereinafter referred to as the hydrogen-bonding compound for use in the invention), and at least one hydrophobizing agent selected from a polyalcohol ester-base hydrophobizing agent, a polycondensate ester-base hydrophobizing agent and a carbohydrate derivative-base hydrophobizing agent:
 (A) the compound has both a hydrogen-bonding donor part and a hydrogen-bonding acceptor part in one molecule,
 (B) the value computed by dividing the molecular weight of the compound by the total number of the hydrogen-bonding donor number and the hydrogen-bonding acceptor number in the compound is from 25 to 65, and
 (C) the total number of the aromatic ring structures in the compound is from 1 to 3.

Adding both the hydrogen-bonding compound for use in the invention and the specific hydrophobizing agent to a cellulose acylate film greatly reduces the environmental humidity-dependent retardation change of the cellulose acylate film.

Further, when the cellulose acylate film is used as a polarizer protective film, then the performance deterioration of the polarizing element in high-temperature and high-humidity environments can be significantly reduced.

The hydrogen-bonding compound for use in the invention, the hydrophobizing agent, and the production method for cellulose acylate film are described sequentially in detail.

<Hydrogen-Bonding Compound for Use in the Invention>

The cellulose acylate film of the invention contains the above-mentioned hydrogen-bonding compound. The structure of the hydrogen-bonding compound for use in the invention is described in detail hereinunder.

Not adhering to any theory, it may be presumed that the humidity dependence of the retardation value of cellulose acylate film would be caused by the change in the birefringence of cellulose acylate resin owing to coordination of a water molecule with the carbonyl group existing in the acyl group of the cellulose acylate resin. Also not adhering to any theory, the hydrogen-bonding compound for use in the invention has a hydrogen-bonding group at a suitable site therein, and therefore can effectively interact with the carbonyl group or the hydroxyl group of cellulose acylate resin and can prevent water molecules in high humidity condition from approaching to cellulose acylate resin. Specifically, in the invention, the structure of the hydrogen-bonding compound, especially the intramolecular configuration of the hydrogen-bonding compound is focused on. In case where an already-existing, 1,3,5-triazine ring-having compound is added to a cellulose acylate resin, the planarity of the entire configuration of the 1,3,5-triazine ring-having compound is focused on, and therefore the compound having the above-mentioned structure for use in the invention is not almost focused on.

The hydrogen-bonding compound for use in the invention satisfies the following requirements (A) to (C):
 (A) the compound has both a hydrogen-bonding donor part and a hydrogen-bonding acceptor part in one molecule,
 (B) the value computed by dividing the molecular weight of the compound by the total number of the hydrogen-bonding donor number and the hydrogen-bonding acceptor number in the compound is from 30 to 65, and
 (C) the total number of the aromatic ring structures in the compound is from 1 to 3.

The requirement (A) is described first.

In the hydrogen-bonding compound for use in the invention, examples of the functional group acting as the hydrogen-bonding donor part and the hydrogen-bonding acceptor part are described, for example, in Introduction to Hydrogen Bonding written by Jeffery, Gorge A. and published by Oxford UP, page 15, Table 2. In this description, the total number of the functional groups of the hydrogen-bonding compound in the Table is used as the total number of the hydrogen-bonding donor number and the hydrogen-bonding acceptor number in the compound.

The hydrogen-bonding compound for use in the invention has both a hydrogen-bonding donor part and a hydrogen-bonding acceptor part in one molecule, and therefore forms strong hydrogen bonding to water and can inhibit coordination of water with the carbonyl group in cellulose acylate. Preferably, the number of the bonding that bonds the hydrogen-bonding donor part and the hydrogen-bonding acceptor part is from 0 to 3, from the viewpoint of forming the above-mentioned hydrogen bonding to water, more preferably 1 or 2.

Next described is the requirement (B).

The hydrogen-bonding compound for use in the invention is preferably such that the value computed by dividing the molecular weight of the compound by the total number of the hydrogen-bonding donor number and the hydrogen-bonding acceptor number in the compound is from 35 to 60. When the value computed by dividing the molecular weight by the total number of the hydrogen-bonding donor number and the hydrogen-bonding acceptor number is too large, then the hydrogen-bonding compound could hardly approach to cellulose acylate and therefore the effect of retarding the environmental change-dependent retardation change would be small. On the other hand, when the value computed by dividing the molecular weight by the total number of the hydrogen-bonding donor number and the hydrogen-bonding acceptor number is too small, then the interaction of the hydrogen-bonding compounds to each other would be too strong and is therefore unfavorable since the solubility of the compound in solvent and the miscibility thereof with cellulose acylate would be insufficient.

Next described is the requirement (C).

The number of the aromatic ring structures in the hydrogen-bonding compound for use in the invention is from 1 to 3. The aromatic ring structure as referred to herein includes not only an aromatic hydrocarbon ring but also a heterocyclic aromatic ring. Regarding the number of the aromatic ring structures in the compound, an aromatic ring-condensed ring is counted as one, but aromatic rings bonding to each other via a linking group are counted as a plural number. For example, the aromatic ring derived from naphthalene and having 10 carbon atoms is counted as one aromatic ring structure. When the number of the aromatic ring structures in the hydrogen-bonding compound is 4 or more, the molecular size of the compound would be too large and could hardly approach to the carbonyl group in cellulose acylate, and if so, the compound would be ineffective for resisting to environmental humidity-dependent optical performance change.

Preferably, the hydrogen-bonding compound for use in the invention contains at least one heterocyclic aromatic ring. When the compound contains a heterocyclic aromatic ring, then the hetero atom in the heterocyclic ring and the other hydrogen-bonding acceptor or hydrogen-bonding donor in the hydrogen-bonding compound can favorably form a cyclic hydrogen bond with water.

(Hydrophilicity/Hydrophobicity of Hydrogen-Bonding Compound)

Preferably, the hydrophilicity/hydrophobicity of the hydrogen-bonding compound for use in the invention is controlled to fall within a specific range. Specifically, when the additive is too much hydrophobic, then the miscibility thereof with cellulose acylate would be insufficient and the proportion of the additive capable of existing around cellulose acylate would be small. On the other hand, when the additive is too much hydrophilic, then the solubility thereof in dope solvent would be insufficient.

—C log P Value—

The octanol-water distribution coefficient (log P value) can be measured by a flask permeation method described in Japan Industrial Standards (JIS) Z7260-107 (2000). The octanol-water distribution coefficient (log P value) may also be estimated, instead of the actual measurement, by a computational chemical method or an empirical method. As a computational method, known is use of Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem.-Chim. Theor., 19, 71 (1984)) and the like. In the invention, the Crippen's fragmentation method (J. Chem. Inf. Comput. Sci., 27, 21 (1987)) is used.

The C log P value is a value of the common logarithm P of the distribution coefficient P between 1-octanol and water, as determined through computation. As the method and the software to be used in computation of the C log P value, usable are known ones. In the invention, used is the CLOGP program incorporated in the system, PC Models by Daylight Chemical Information Systems.

In case where a compound shows different log P values depending on the measuring method or the computational method, the Crippen's fragmentation method is used for determining as to whether the compound is within the range of the invention.

The hydrophilicity/hydrophobicity of the hydrogen-bonding compound can be expressed by the octanol-water distribution coefficient (hereinafter this may be referred to as log P). The hydrophilicity/hydrophobicity of the hydrogen-bonding compound for use in the invention is characterized in that the C log P value of the octanol-water distribution coefficient thereof is controlled to fall within a range of from 0 to 5.5. More preferably, the C log P value of the hydrogen-bonding compound for use in the invention is from 1.0 to 5.0, most preferably from 2.0 to 4.5.

Concrete structures of the hydrogen-bonding compound for use in the invention are described below.

Preferably, the hydrogen-bonding compound for use in the invention is represented by any of the following general formulae (A-1) to (H-1). The structures of those formulae are described in detail hereinunder.

(A) Hydrogen-Bonding Compound Represented by General Formula (A-1):

First described is the compound represented by the general formula (A-1). In this description, the hydrocarbon group such as alkyl group and others may be linear or branched, not contradictory to the scope and the spirit of the invention.

[Chemical Formula 15]

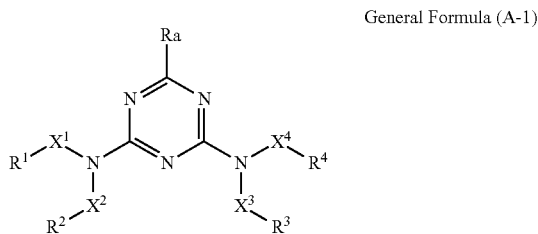

General Formula (A-1)

(In the general formula (A-1), Ra represents an alkyl group, an alkenyl group, an alkynyl group, a heterocyclic group or an aryl group; X1, X2, X3 and X4 each independently represent a single bond or a divalent linking group; R1, R2, R3 and R4 each independently represent a hydrogen atom, an alkyl group, an alkenyl group, an alkynyl group, an aryl group or a heterocyclic group.)

Ra represents an alkyl group, an alkenyl group, an alkynyl group, a heterocyclic group or an aryl group, and is preferably an alkyl group or an aryl group.

In case where Ra is an alkyl group, the group preferably has from 1 to 20 carbon atoms, more preferably from 3 to 15 carbon atoms, even more preferably from 6 to 12 carbon atoms.

In case where Ra is an alkenyl group, the group preferably has from 2 to 20 carbon atoms, more preferably from 3 to 15 carbon atoms, even more preferably from 6 to 12 carbon atoms.

In case where Ra is an alkynyl group, the group preferably has from 2 to 20 carbon atoms, more preferably from 3 to 15 carbon atoms, even more preferably from 6 to 12 carbon atoms.

In case where Ra is an aryl group, the group preferably has from 6 to 24 carbon atoms, more preferably from 6 to 18 carbon atoms.

In case where Ra is a heterocyclic group, the group preferably has from 5 to 23 carbon atoms, more preferably from to 17 carbon atoms.

Ra may have or may not have a substituent, but preferably Ra does not have a substituent from the viewpoint of reducing the humidity dependence of the film.

The substituent that Ra may have includes the following T. The substituent group T includes, for example, an alkyl group (preferably having from 1 to 20 carbon atoms, more preferably from 1 to 12 carbon atoms, even more preferably from 1 to 8 carbon atoms, for example, a methyl group, an ethyl group, an isopropyl group, a tert-butyl group, an n-octyl group, an n-decyl group, an n-hexadecyl group, a cyclopropyl group, a cyclopentyl group, a cyclohexyl group, etc.), an alkenyl group (preferably having from 2 to 20 carbon atoms, more preferably from 2 to 12 carbon atoms, even more preferably from 2 to 8 carbon atoms, for example, a vinyl group, an allyl group, a 2-butenyl group, a 3-pentenyl group, etc.), an alkynyl group (preferably having from 2 to 20 carbon atoms, more preferably from 2 to 12 carbon atoms, even more preferably from 2 to 8 carbon atoms, for example, a propargyl group, a 3-pentynyl group, etc.), an aryl group (preferably having from 6 to 30 carbon atoms, more preferably from 6 to 20 carbon atoms, even more preferably from 6 to 12 carbon atoms, for example, a phenyl group, a biphenyl group, a naphthyl group, etc.), an amino group (preferably having from 0 to 20 carbon atoms, more preferably from 0 to 10 carbon atoms, even more preferably from 0 to 6 carbon atoms, for example, an amino group, a methylamino group, a dimethylamino group, a diethylamino group, a dibenzylamino group, etc.), an alkoxy group (preferably having from 1 to 20 carbon atoms, more preferably from 1 to 12 carbon atoms, even more preferably from 1 to 8 carbon atoms, for example, a methoxy group, an ethoxy group, a butoxy group, etc.), an aryloxy group (preferably having from 6 to 20 carbon atoms, more preferably from 6 to 16 carbon atoms, even more preferably from 6 to 12 carbon atoms, for example, a phenyloxy group, a 2-naphthyloxy group, etc.), an acyl group (preferably having from 1 to 20 carbon atoms, more preferably from 1 to 16 carbon atoms, even more preferably from 1 to 12 carbon atoms, for example, an acetyl group, a benzoyl group, a formyl group, a pivaloyl group, etc.), an alkoxycarbonyl group (preferably having from 2 to 20 carbon atoms, more preferably from 2 to 16 carbon atoms, even more preferably from 2 to 12 carbon atoms, for example, a methoxycarbonyl group, an ethoxycarbonyl group, etc.), an aryloxycarbonyl group (preferably having from 7 to 20 carbon atoms, more preferably from 7 to 16 carbon atoms, even more preferably from 7 to 10 carbon atoms, for example, a phenyloxycarbonyl group, etc.), an acyloxy group (preferably having from 2 to 20 carbon atoms, more preferably from 2 to 16 carbon atoms, even more preferably from 2 to 10 carbon atoms, for example, an acetoxy group, a benzoyloxy group, etc.), an acylamino group (preferably having from 2 to 20 carbon atoms, more preferably from 2 to 16 carbon atoms, even more preferably from 2 to 10 carbon atoms, for example, an acetylamino group, a benzoylamino group, etc.), an alkoxycarbonylamino group (preferably having from 2 to 20 carbon atoms, more preferably from 2 to 16 carbon atoms, even more preferably from 2 to 12 carbon atoms, for example, a methoxycarbonylamino group, etc.), an aryloxycarbonylamino group (preferably having from 7 to 20 carbon atoms, more preferably from 7 to 16 carbon atoms, even more preferably from 7 to 12 carbon atoms, for example, a phenyloxycarbonylamino group, etc.), a sulfonylamino group (preferably having from 1 to 20 carbon atoms, more preferably from 1 to 16 carbon atoms, even more preferably from 1 to 12 carbon atoms, for example, a methanesulfonylamino group, a benzenesulfonylamino group, etc.), a sulfamoyl group (preferably having from 0 to 20 carbon atoms, more preferably from 0 to 16 carbon atoms, even more preferably from 0 to 12 carbon atoms, for example, a sulfamoyl group, a methylsulfamoyl group, a dimethylsulfamoyl group, a phenylsulfamoyl group, etc.), a carbamoyl group (preferably having from 1 to 20 carbon atoms, more preferably from 1 to 16 carbon atoms, even more preferably from 1 to 12 carbon atoms, for example, a carbamoyl group, a methylcarbamoyl group, a diethylcarbamoyl group, a phenylcarbamoyl group, etc.), an alkylthio group (preferably having from 1 to 20 carbon atoms, more preferably 1 to 16 carbon atoms, even more preferably from 1 to 12 carbon atoms, for example a methylthio group, an ethylthio group, etc.), an arylthio group (preferably having from 6 to 20 carbon atoms, more preferably from 6 to 16 carbon atoms, even more preferably from 6 to 12 carbon atoms, for example, a phenylthio group, etc.), a sulfonyl group (preferably having from 1 to 20 carbon atoms, more preferably from 1 to 16 carbon atoms, even more preferably from 1 to 12 carbon atoms, for example, a mesyl group, a tolyl group, etc.), a sulfinyl group (preferably having from 1 to 20 carbon atoms, more preferably from 1 to 16 carbon atoms, even more preferably from 1 to 12 carbon atoms, for example, a methanesulfinyl group, a benzenesulfinyl group, etc.), an ureido group (preferably having from 1 to 20 carbon atoms, more preferably from 1 to 16 carbon atoms, even more preferably from to 12 carbon atoms, for example, an ureido group, a methylureido group, a phenylureido group, etc.), a phosphoramido group (preferably having from 1 to 20 carbon atoms, more preferably from 1 to 16 carbon atoms, even more preferably from 1 to 12 carbon atoms, for example, a diethylphosphoramido group, a phenylphosphoramido group, etc.), a hydroxyl group, a mercapto group, a halogen atom (for example, fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is, for example, a nitrogen atom, an oxygen atom or a sulfur atom, concretely including an imidazolyl group, a pyridyl group, a quinolyl group, a furyl group, a piperidyl group, a morpholino group, a benzoxazolyl group, a benzimidazolyl group, a benzothiazolyl group, etc.), a silyl group (preferably having from 3 to 40 carbon atoms, more preferably from 3 to 30 carbon atoms, even more preferably from 3 to 24 carbon atom, for example, a trimethylsilyl group, a triphenylsilyl group, etc.), etc. These substituents may be further substituted. In case where there exist two or more substituents, they may be the same or different, and if possible, they may bond to each other to form a ring.

X1, X2, X3 and X4 each independently represent a single bond or a divalent linking group, and preferably they are independently a single bond, more preferably, they are all single bonds.

The divalent linking group that X1, X2, X3 and X4 may each independently represent includes, for example, divalent linking groups represented by the following general formula (P), and an alkylene group (preferably having from 1 to 30 carbon atoms, more preferably from 1 to 3 carbon atoms, even more preferably 2 carbon atoms), an arylene group (preferably having from 6 to 30 carbon atoms, more preferably from 6 to 10 carbon atoms), etc. Of those, preferred are the divalent linking groups represented by the following general formula (P), and more preferred is a carbonyl group.

[Chemical Formula 16]

General Formula (P)

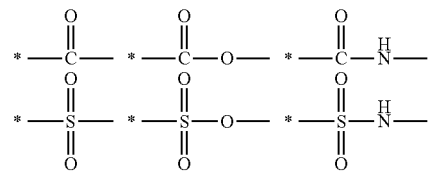

(In the general formula (P), the side * is the linking site via which the formula links with the N atom substituting on the 1,3,5-triazine ring in the compound represented by the general formulae (A-1).)

R1, R2, R3 and R4 each independently represent a hydrogen atom, an alkyl group, an alkenyl group, an alkynyl group, an aryl group or a heterocyclic group, preferably a hydrogen atom, an alkyl group, an aryl group or a heterocyclic group, more preferably a hydrogen atom, an alkyl group or an acyl group, even more preferably a hydrogen atom or an alkyl group. Preferably, at least one of R1 and R2 is a hydrogen atom, and also preferably, at least one of R3 and R4 is a hydrogen atom.

In case where R1, R2, R3 and R4 each are an alkyl group, the group preferably has from 1 to 12 carbon atoms, more preferably from 1 to 6 carbon atoms, even more preferably from 1 to 4 carbon atoms. In case where R1 is an alkyl group and X1 is —C(=O)—, R2 is an alkyl group and X2 is —C(=O)—, R3 is an alkyl group and X3 is —C(=O)—, and R4 is an alkyl group and X4 is —C(=O)—, the preferred range of R1, R2, R3 and R4 is a hydrogen atom, an alkyl group, an alkenyl group, an alkynyl group, an aryl group, an acyl group or a heterocyclic group, from the viewpoint of enhancing the moisture dependence of the film, more preferably a substituted or unsubstituted aryl group. Preferred examples of the substituent that the aryl group may have are the same as those of R31 to R34 in the general formula (A-4) to be mentioned below, or that is, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, and a dialkylamino group having from 1 to 8 carbon atoms.

In case where R1, R2, R3 and R4 each are an alkenyl group, the group preferably has from 2 to 12 carbon atoms, more preferably from 2 to 6 carbon atoms, even more preferably from 2 to 4 carbon atoms.

In case where R1, R2, R3 and R4 each are an alkynyl group, the group preferably has from 2 to 12 carbon atoms, more preferably from 2 to 6 carbon atoms, even more preferably from 2 to 4 carbon atoms.

In case where R1, R2, R3 and R4 each are an aryl group, the group preferably has from 6 to 18 carbon atoms, more preferably from 6 to 12 carbon atoms, even more preferably 6 carbon atoms, from the viewpoint of reducing the humidity dependence of the film.

R1, R2, R3 and R4 each may additionally have or may not have a substituent, and as examples of the substituent, there may be mentioned those of the substituent group T mentioned above.

Especially preferably, the compound represented by the above-mentioned general formula (A-1) is represented by the following general formula (A-2):

[Chemical Formula 17]

General Formula (A-2)

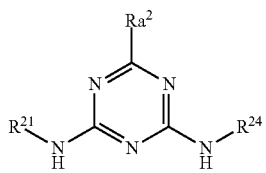

Ra2 represents an alkyl group, an alkenyl group, an alkynyl group or an aryl group, and the preferred range thereof is the same as the preferred range of Ra mentioned above.

R21 and R24 each independently represent a hydrogen atom, an alkyl group, an alkenyl group, an alkynyl group, an aryl group or a heterocyclic group, and the preferred range thereof is the same as the preferred range of R1, R2, R3 and R4 mentioned above.

Especially preferably, the compound represented by the above-mentioned general formula (A-1) is represented by the following general formula (A-3):

[Chemical Formula 18]

General Formula (A-3)

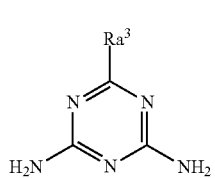

(In the general formula (A-3), Ra3 represents an alkyl group, an alkenyl group, an alkynyl group or an aryl group.)

Ra3 represents an alkyl group, an alkenyl group, an alkynyl group or an aryl group, and the preferred range thereof is the same as the preferred range of Ra mentioned above.

In the cellulose acylate film of the invention, more preferably, Ra3 is an alkyl group for lowering Rth of the film and for reducing the humidity dependence thereof. In the case, more preferably, Ra3 is an unsubstituted alkyl group.

Especially preferably, the compound represented by the above-mentioned general formula (A-1) is represented by the following general formula (A-4):

[Chemical Formula 19]

General Formula (A-4)

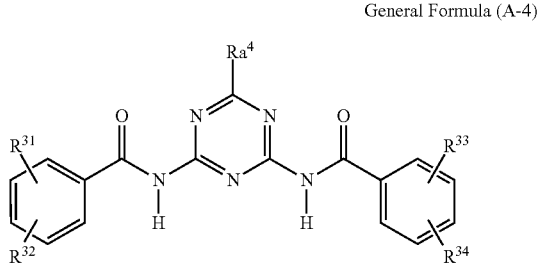

(In the general formula (A-4), R31, R32, R33 and R34 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms.) Ra4 represents an alkyl group, an alkenyl group, an alkynyl group or an aryl group, and the preferred range thereof is the same as the preferred range of Ra mentioned above.

(B) Hydrogen-Bonding Compound Represented by General Formula (B-1):

Next described is the compound represented by the general formula (B-1).

[Chemical Formula 20]

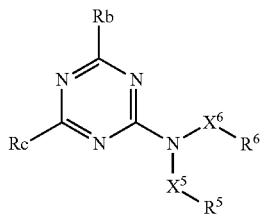

General Formula (B-1)

(In the general formula (B-1), Rb and Rc each independently represent an alkyl group, an alkenyl group, an alkynyl group, a heterocyclic group or an aryl group; X5 and X6 each independently represent a single bond or a divalent linking group; R5 and R6 each independently represent a hydrogen atom, an alkyl group, an alkenyl group, an alkynyl group, an aryl group or a heterocyclic group.)

Rb and Rc each independently represent an alkyl group, an alkenyl group, an alkynyl group, a heterocyclic group or an aryl group, and the preferred range thereof is the same as the preferred range of Ra mentioned above.

X5 and X6 each independently represent a single bond or a divalent linking group, and the preferred range thereof is the same as the preferred range of X1, X2, X3 and X4 mentioned above.

R5 and R6 each independently represent a hydrogen atom, an alkyl group, an alkenyl group, an alkynyl group, an aryl group or a heterocyclic group, and the preferred range thereof is the same as the preferred range of R1, R2, R3 and R4 mentioned above.

Especially preferably, the compound represented by the general formula (B-1) is represented by the following general formula (B-2):

[Chemical Formula 21]

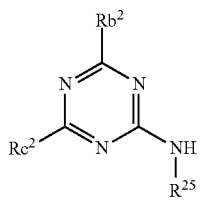

General Formula (B-2)

Rb2 and Rc2 each independently represent an alkyl group, an alkenyl group, an alkynyl group or an aryl group, and the preferred range thereof is the same as the preferred range of Ra mentioned above.

R25 each independently represents a hydrogen atom, an alkyl group, an alkenyl group, an alkynyl group, an aryl group or a heterocyclic group, and the preferred range thereof is the same as the preferred range of R21 and R24 mentioned above.

More preferably, the compound represented by the general formula (B-3) is represented by the following general formula (B-3):

[Chemical Formula 22]

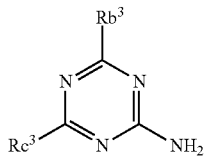

General Formula (B-3)

Rb3 and Rc3 each independently represent an alkyl group, an alkenyl group, an alkynyl group or an aryl group, and the preferred range thereof is the same as the preferred range of Ra mentioned above.

Especially preferably, the compound represented by the general formula (B-1) is represented by the following general formula (B-4):

[Chemical Formula 23]

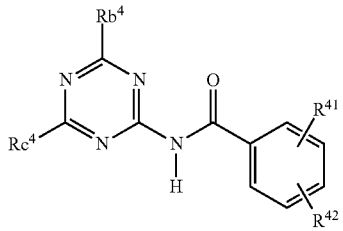

General Formula (B-4)

Rb4 and Rc4 each independently represent an alkyl group, an alkenyl group, an alkynyl group or an aryl group.

Further, in the cellulose acylate film of the invention, preferably, both Rb3 and Rc3 are alkyl groups for lowering the Rth of the film and for reducing the humidity dependence of the film. In the case, more preferably, Rb3 and Rc3 are both unsubstituted alkyl groups. Similarly preferably, Rb4 and Rc4 are both alkyl groups.

Specific examples of the compounds represented by the above-mentioned general formulae (A-1) and (B-1) are mentioned below; however, the invention is not limited by the following specific examples.

[Chemical Formula 24]

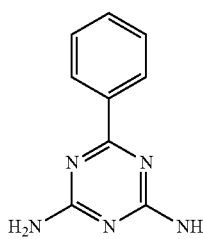

(A-11)

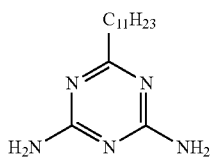

(A-12)

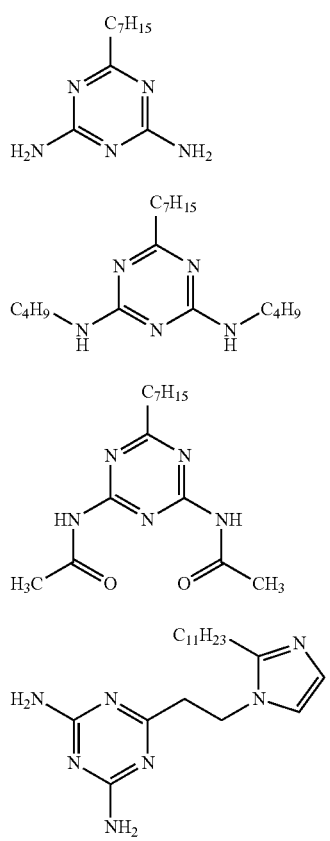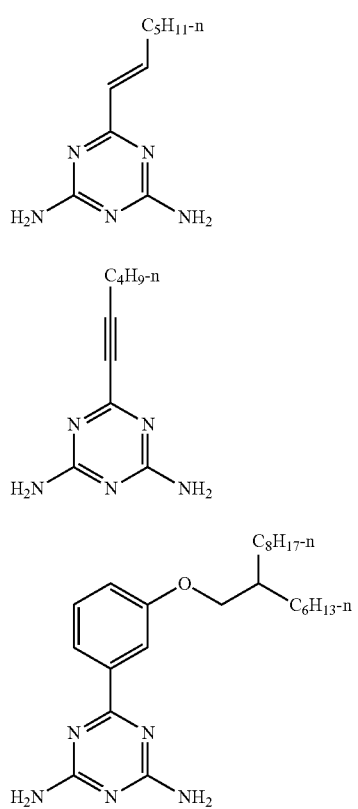
[Chemical Formula 25]
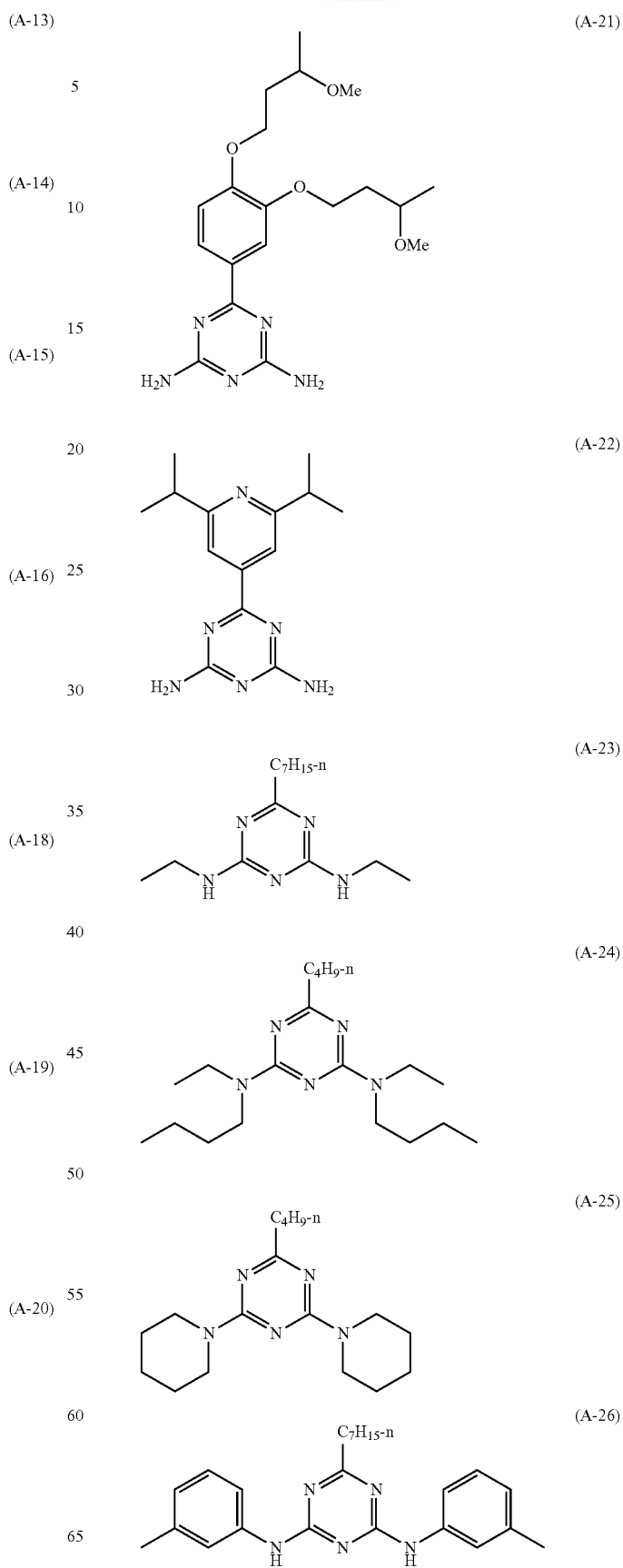

-continued
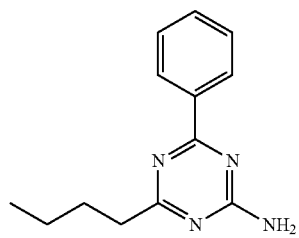
(A-27)
[Chemical Formula 26]
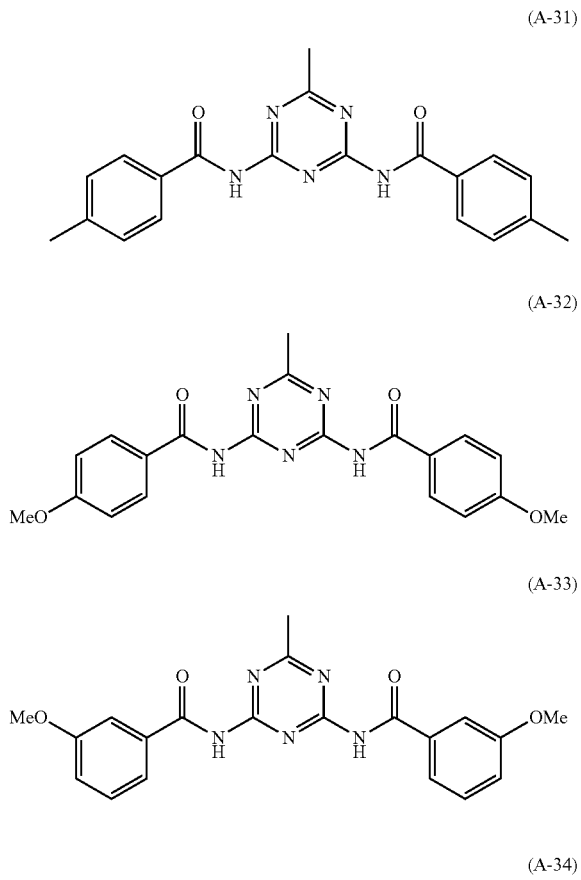
(A-31)
(A-32)
(A-33)
(A-34)
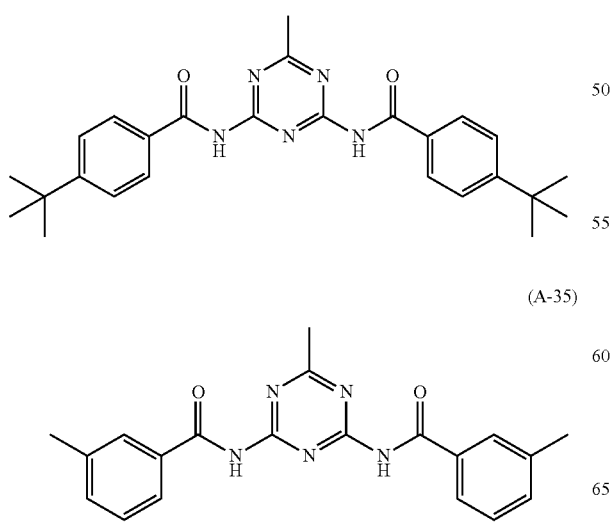
(A-35)
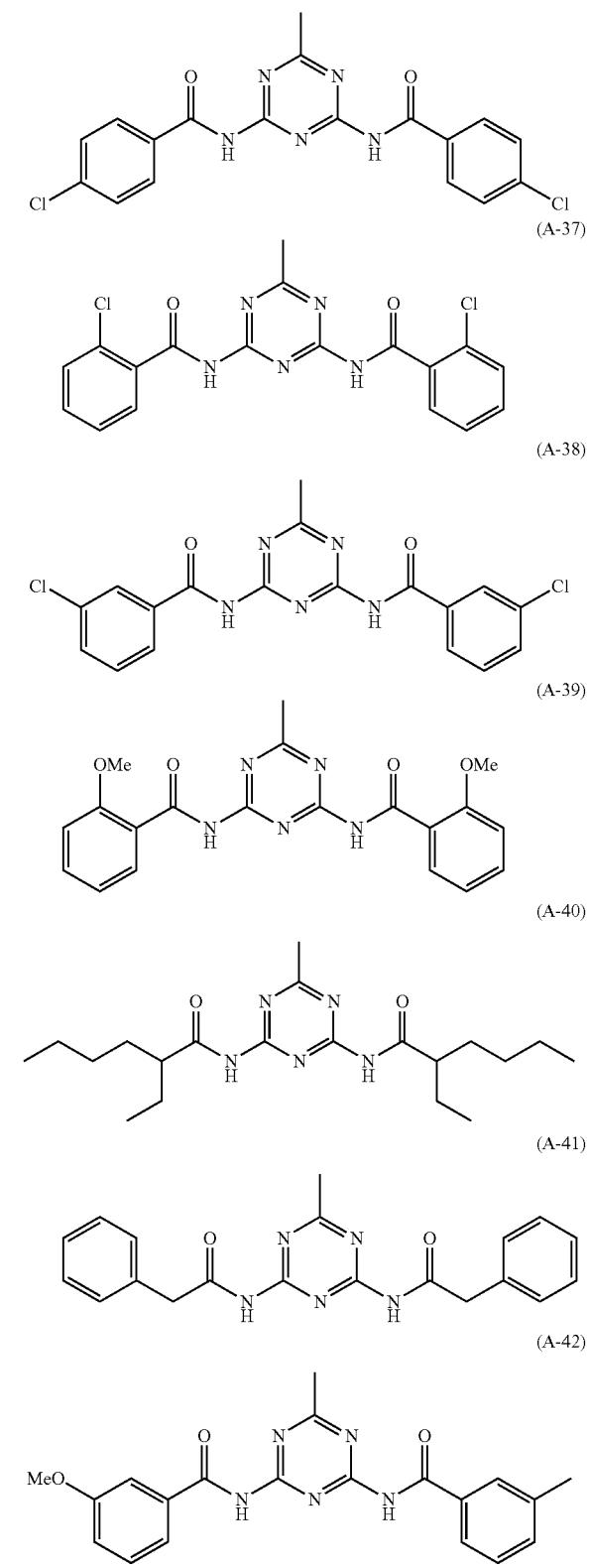
(A-36)
(A-37)
(A-38)
(A-39)
(A-40)
(A-41)
(A-42)
(Production Method for Compounds Represented by General Formula (A-1) or General Formula (B-1))
The method for producing the compounds represented by the above-mentioned general formula (A-1) or general formula (B-1) is not specifically defined, and the compounds may be produced according to known methods. Production methods preferably used in the invention are, for example, a method of heating a dicyanediamide and a nitrile compound in an alcohol in the presence of an inorganic base such as potassium hydroxide or the like to form a triazine ring, as in U.S. Pat. No. 3,478,026 and Chem. Eur. J. 2005, 11, 6616-6628; a method of starting from cyanuric chloride and reacting it with a Grignard compound and an amine compound in a mode of stepwise substitution reaction, as in Tetrahedron, 2000, 56, 9705-9711; and a method synthesizing monoamino-di-substituted-s-triazines through reaction of an imidoylguanidine and a carboxylic acid chloride or ester, as in the Journal of Organic Synthetic Chemistry Association 1967, Fol. 25, No. 11, 1048-1051.

The compounds represented by the general formula (A-1) or general formula (B-1) may be commercially available.

(C) Compound Represented by General Formula (C-1):

Next described in detail is the compound represented by the general formula (C-1).

[Chemical Formula 27]

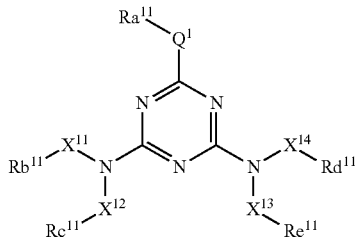

General Formula (C-1)

(In the general formula (C-1), Ra11 represents an alkyl group, an alkenyl group, an alkynyl group, an aryl group or a heterocyclic group; Rb11, Rc11, Rd11 and Re11 each independently represent a hydrogen atom, an alkyl group, an alkenyl group, an alkynyl group, an aryl group or a heterocyclic group; Q1 represents —O—, —S— or —NRf—; Rf represents a hydrogen atom, an alkyl group, an alkenyl group, an alkynyl group, an aryl group or a heterocyclic group, and may link with Ra to form a ring; X11, X12 and X13 each independently represent a single bond or a divalent linking group; X14 represents a linking group selected from divalent linking groups represented by the above-mentioned general formula (P).)

Especially preferably, the compound represented by the general formula (C-1) is represented by the following general formula (C-2):

[Chemical Formula 28]

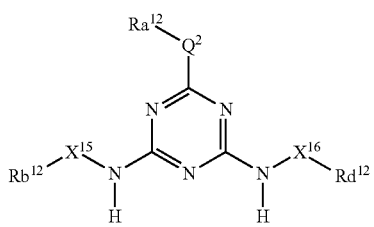

General Formula (C-2)

(In the general formula (C-2), Ra12 represents an alkyl group, an alkenyl group, an alkynyl group, an aryl group or a heterocyclic group; Rb12 and Rd12 each independently represent a hydrogen atom, an alkyl group, an alkenyl group, an alkynyl group, an aryl group or a heterocyclic group; Q2 represents —O—, —S— or —NRf—; Rf represents a hydrogen atom, an alkyl group, an alkenyl group, an alkynyl group, an aryl group or a heterocyclic group, and may link with Ra12 to form a ring; X11, X12 and X13 each independently represent a single bond or a divalent linking group; X14 represents a linking group selected from divalent linking groups represented by the above-mentioned general formula (P).)

Especially preferably, the compound represented by the general formula (C-1) is represented by the following general formula (C-3):

[Chemical Formula 29]

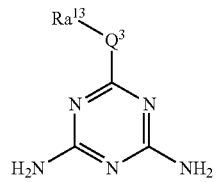

General Formula (C-3)

(In the general formula (C-3), Ra13 represents an alkyl group, an alkenyl group, an alkynyl group, an aryl group or a heterocyclic group; Q3 represents —O—, —S— or —NRf—; Rf represents a hydrogen atom, an alkyl group, an alkenyl group, an alkynyl group, an aryl group or a heterocyclic group, and may link with Ra13 to form a ring.)

Especially preferably, the compound represented by the general formula (C-1) is represented by the following general formula (C-4):

[Chemical Formula 30]

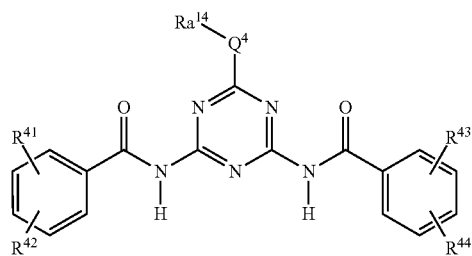

General Formula (C-4)

(In the general formula (C-4), R41, R42, R43 and R44 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms. Ra14 represents an alkyl group, an alkenyl group, an alkynyl group, an aryl group or a heterocyclic group. Q4 represents —O—, —S— or —NRf—; Rf represents a hydrogen atom, an alkyl group, an alkenyl group, an alkynyl group, an aryl group or a heterocyclic group, and may link with Ra14 to form a ring.)

(D) Compound Represented by General Formula (D-1):

Next described in detail is the compound represented by the general formula (D-1).

[Chemical Formula 31]

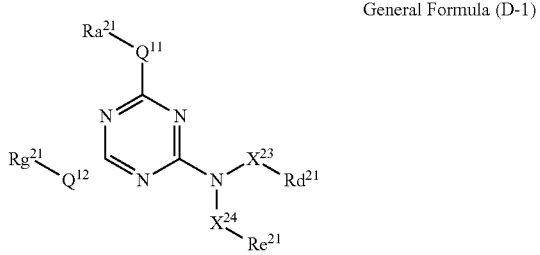

General Formula (D-1)

(In the general formula (D-1), Ra21 and Rg21 each represent an alkyl group, an alkenyl group, an alkynyl group, an aryl group or a heterocyclic group; Rd21 and Re21 each independently represent a hydrogen atom, an alkyl group, an alkenyl group, an alkynyl group, an aryl group or a heterocyclic group; Q11 represents —O—, —S— or —NRf—; Rf represents a hydrogen atom, an alkyl group, an alkenyl group, an alkynyl group, an aryl group or a heterocyclic group, and may link with Ra21 to form a ring; Q12 represents —O—, —S— or —NRh—; Rh represents a hydrogen atom, an alkyl group, an alkenyl group, an alkynyl group, an aryl group or a heterocyclic group, and may link with Rg21 to form a ring; X23 represents a single bond or a divalent linking group; X24 represents a linking group selected from divalent linking groups represented by the above-mentioned general formula (P).)

Especially preferably, the compound represented by the general formula (D-1) is represented by the following general formula (D-2):

[Chemical Formula 32]

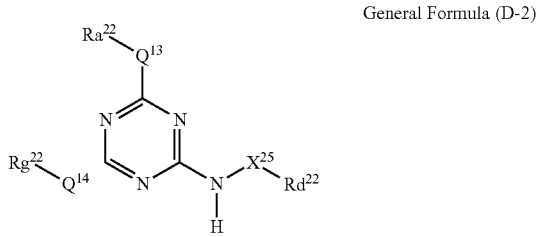

General Formula (D-2)

(In the general formula (D-2), Ra22 and Rg22 each represent an alkyl group, an alkenyl group, an alkynyl group, an aryl group or a heterocyclic group; Rd22 represents a hydrogen atom, an alkyl group, an alkenyl group, an alkynyl group, an aryl group or a heterocyclic group; Q13 represents —O—, —S— or —NRf—; Rf represents a hydrogen atom, an alkyl group, an alkenyl group, an alkynyl group, an aryl group or a heterocyclic group, and may link with Ra22 to form a ring; Q14 represents —O—, —S— or —NRh—; Rh represents a hydrogen atom, an alkyl group, an alkenyl group, an alkynyl group, an aryl group or a heterocyclic group, and may link with Rg22 to form a ring; X25 represents a linking group selected from divalent linking groups represented by the above-mentioned general formula (P).)

Especially preferably, the compound represented by the general formula (D-1) is represented by the following general formula (D-3):

[Chemical Formula 33]

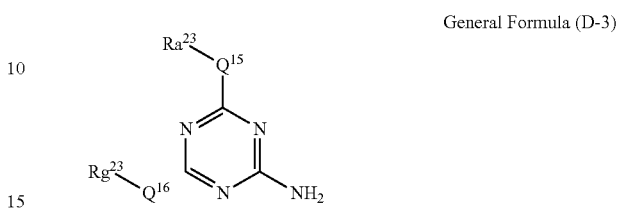

General Formula (D-3)

(In the general formula (D-3), Ra23 and Rg23 each represent an alkyl group, an alkenyl group, an alkynyl group, an aryl group or a heterocyclic group; Q15 represents —O—, —S— or —NRf—; Rf represents a hydrogen atom, an alkyl group, an alkenyl group, an alkynyl group, an aryl group or a heterocyclic group, and may link with Ra23 to form a ring; Q16 represents —O—, —S— or —NRh—; Rh represents a hydrogen atom, an alkyl group, an alkenyl group, an alkynyl group, an aryl group or a heterocyclic group, and may link with Rg23 to form a ring.)

Especially preferably, the compound represented by the general formula (D-1) is represented by the following general formula (D-4):

[Chemical Formula 34]

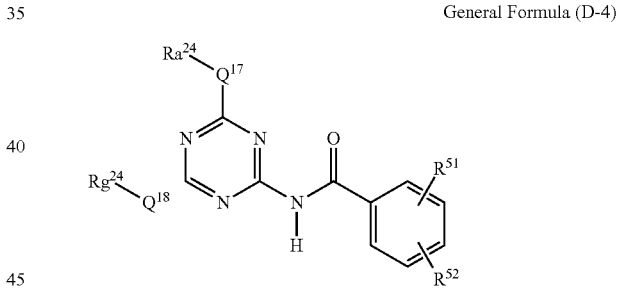

General Formula (D-4)

(In the general formula (D-4), R51 and R52 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms. Ra24 and Rg24 each represent an alkyl group, an alkenyl group, an alkynyl group, an aryl group or a heterocyclic group. Q17 represents —O—, —S— or —NRf—; Rf represents a hydrogen atom, an alkyl group, an alkenyl group, an alkynyl group, an aryl group or a heterocyclic group, and may link with Ra24 to form a ring. Q18 represents —O—, —S— or —NRh—; Rh represents a hydrogen atom, an alkyl group, an alkenyl group, an alkynyl group, an aryl group or a heterocyclic group, and may link with Rg24 to form a ring.)

Preferred examples of the compounds represented by the general formula (C-1) or the general formula (D-1) are shown below.

[Chemical Formula 35]

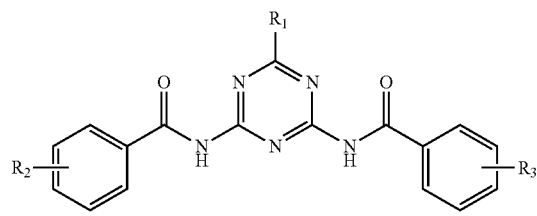

TABLE 1

| Compound | R1 | R2 | R3 |
|---|---|---|---|
| C-101 | morpholino | H | H |
| C-102 | | o-Me | o-Me |
| C-103 | | m-Me | m-Me |
| C-104 | | p-Me | p-Me |
| C-105 | | o-OMe | o-OMe |
| C-106 | | m-OMe | m-OMe |
| C-107 | | p-OMe | p-OMe |
| C-108 | | p-t-Bu | p-t-Bu |
| C-109 | | m-Cl | m-Cl |
| C-110 | | m-F | m-F |
| C-111 | MeO— | H | H |
| C-112 | | o-Me | o-Me |
| C-113 | | m-Me | m-Me |
| C-114 | | p-Me | p-Me |
| C-115 | | o-OMe | o-OMe |
| C-116 | | m-OMe | m-OMe |
| C-117 | | p-OMe | p-OMe |
| C-118 | | p-t-Bu | p-t-Bu |
| C-119 | | m-Cl | m-Cl |
| C-120 | | m-F | m-F |
| C-121 | EtO— | H | H |
| C-122 | | o-Me | o-Me |
| C-123 | | m-Me | m-Me |
| C-124 | | p-Me | p-Me |
| C-125 | | o-OMe | o-OMe |
| C-126 | | m-OMe | m-OMe |
| C-127 | | p-OMe | p-OMe |
| C-128 | | p-t-Bu | p-t-Bu |
| C-129 | | m-Cl | m-Cl |
| C-130 | | m-F | m-F |
| C-131 | PrO— | H | H |
| C-132 | | o-Me | o-Me |
| C-133 | | m-Me | m-Me |
| C-134 | | p-Me | p-Me |
| C-135 | | o-OMe | o-OMe |
| C-136 | | m-OMe | m-OMe |
| C-137 | | p-OMe | p-OMe |
| C-138 | | p-t-Bu | p-t-Bu |
| C-139 | | m-Cl | m-Cl |
| C-140 | | m-F | m-F |

TABLE 2

| Compound | R1 | R2 | R3 |
|---|---|---|---|
| C-141 | $H_2N-*$ | H | H |
| C-142 | | o-Me | o-Me |
| C-143 | | m-Me | m-Me |
| C-144 | | p-Me | p-Me |
| C-145 | | o-OMe | o-OMe |
| C-146 | | m-OMe | m-OMe |
| C-147 | | p-OMe | p-OMe |
| C-148 | | p-t-Bu | p-t-Bu |
| C-149 | | m-Cl | m-Cl |
| C-150 | | m-F | m-F |
| C-151 | MeNH— | H | H |
| C-152 | | o-Me | o-Me |
| C-153 | | m-Me | m-Me |
| C-154 | | p-Me | p-Me |
| C-155 | | o-OMe | o-OMe |
| C-156 | | m-OMe | m-OMe |
| C-157 | | p-OMe | p-OMe |
| C-158 | | p-t-Bu | p-t-Bu |
| C-159 | | m-Cl | m-Cl |
| C-160 | | m-F | m-F |
| C-161 | EtNH— | H | H |
| C-162 | | o-Me | o-Me |
| C-163 | | m-Me | m-Me |
| C-164 | | p-Me | p-Me |
| C-165 | | o-OMe | o-OMe |
| C-166 | | m-OMe | m-OMe |
| C-167 | | p-OMe | p-OMe |
| C-168 | | p-t-Bu | p-t-Bu |
| C-169 | | m-Cl | m-Cl |
| C-170 | | m-F | m-F |
| C-171 | PrNH— | H | H |
| C-172 | | o-Me | o-Me |
| C-173 | | m-Me | m-Me |
| C-174 | | p-Me | p-Me |
| C-175 | | o-OMe | o-OMe |
| C-176 | | m-OMe | m-OMe |
| C-177 | | p-OMe | p-OMe |
| C-178 | | p-t-Bu | p-t-Bu |
| C-179 | | m-Cl | m-Cl |
| C-180 | | m-F | m-F |

[Chemical Formula 36]

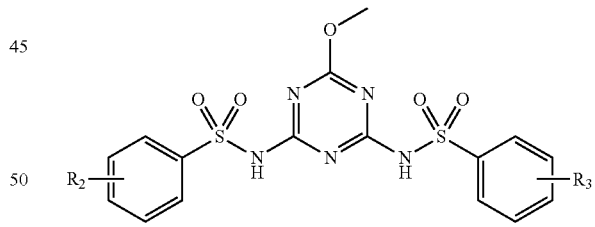

TABLE 3

| Compound | R2 | R3 |
|---|---|---|
| C-181 | H | H |
| C-182 | o-Me | o-Me |
| C-183 | m-Me | m-Me |
| C-184 | p-Me | p-Me |
| C-185 | o-OMe | o-OMe |
| C-186 | m-OMe | m-OMe |
| C-187 | p-OMe | p-OMe |
| C-188 | p-t-Bu | p-t-Bu |
| C-189 | m-Cl | m-Cl |
| C-190 | m-F | m-F |

[Chemical Formula 37]

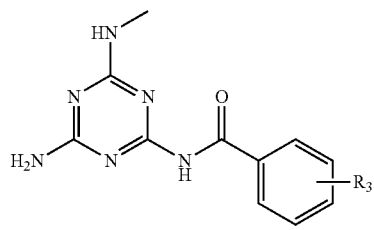

TABLE 4

| Compound | R3 |
|---|---|
| D-101 | H |
| D-102 | o-Me |
| D-103 | m-Me |
| D-104 | p-Me |
| D-105 | o-OMe |
| D-106 | m-OMe |
| D-107 | p-OMe |
| D-108 | p-t-Bu |
| D-109 | m-Cl |
| D-110 | m-F |

(E) Compound Represented by General Formula (E-1):

Next described in detail is the compound represented by the general formula (E-1).

[Chemical Formula 38]

General Formula (E-1)

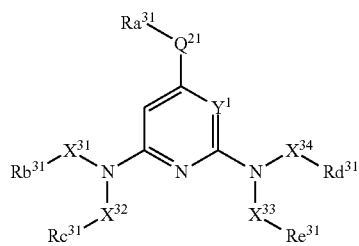

(In the general formula (E-1), Y1 represents a methine group or —N—; Ra31 represents an alkyl group, an alkenyl group, an alkynyl group, an aryl group or a heterocyclic group; Rb31, Rc31, Rd31 and Re31 each independently represent a hydrogen atom, an alkyl group, an alkenyl group, an alkynyl group, an aryl group or a heterocyclic group; Q21 represents a single bond, —O—, —S— or —NRf—; Rf represents a hydrogen atom, an alkyl group, an alkenyl group, an alkynyl group, an aryl group or a heterocyclic group, and may link with Ra31 to form a ring; X31, X32 and X33 each independently represent a single bond or a divalent linking group; X34 represents a linking group selected from divalent linking groups represented by the following general formula (Q):

[Chemical Formula 39]

General formula (Q)

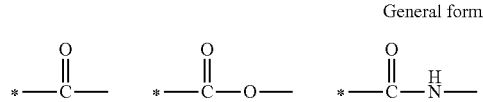

-continued

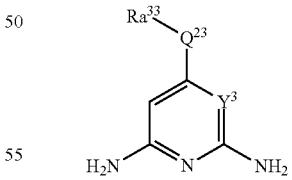

(In the general formula (Q), the side * is the linking site via which the formula links with the N atom substituting on the hetero ring in the compound represented by the general formulae (E-1).)

Especially preferably, the compound represented by the general formula (E-1) is represented by the following general formula (E-2):

[Chemical Formula 40]

General Formula (E-2)

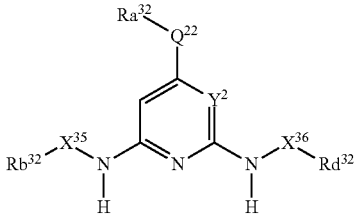

(In the general formula (E-2), Y2 represents a methine group or —N—; Ra32 represents an alkyl group, an alkenyl group, an alkynyl group, an aryl group or a heterocyclic group; Rb32, Rc32 and Rd32 each independently represent a hydrogen atom, an alkyl group, an alkenyl group, an alkynyl group, an aryl group or a heterocyclic group; Q22 represents a single bond, —O—, —S— or —NRf—; Rf represents a hydrogen atom, an alkyl group, an alkenyl group, an alkynyl group, an aryl group or a heterocyclic group, and may link with Ra32 to form a ring; X35 each independently represents a single bond or a divalent linking group; X36 represents a linking group selected from divalent linking groups represented by the above-mentioned general formula (Q).)

Especially preferably, the compound represented by the general formula (E-1) is represented by the following general formula (E-3):

[Chemical Formula 41]

General Formula (E-3)

(In the general formula (E-3), Y3 represents a methine group or —N—; Ra33 represents an alkyl group, an alkenyl group, an alkynyl group, an aryl group or a heterocyclic group; Q23 represents a single bond, —O—, —S— or —NRf—; Rf represents a hydrogen atom, an alkyl group, an alkenyl group, an alkynyl group, an aryl group or a heterocyclic group, and may link with Ra33 to form a ring.)

Especially preferably, the compound represented by the general formula (E-1) is represented by the following general formula (E-4):

[Chemical Formula 42]

General Formula (E-4)

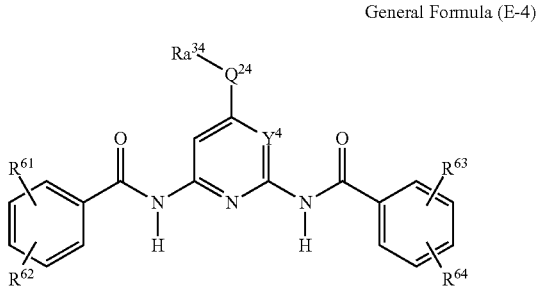

(In the general formula (E-4), Y4 represents a methine group or —N—; Ra34 represents an alkyl group, an alkenyl group, an alkynyl group, an aryl group or a heterocyclic group; Q24 represents a single bond, —O—, —S— or —NRf—; Rf represents a hydrogen atom, an alkyl group, an alkenyl group, an alkynyl group, an aryl group or a heterocyclic group, and may link with Ra34 to form a ring. R61, R62, R63 and R64 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms.)

Especially preferably, the compound represented by the general formula (E-1) is represented by the following general formula (E-5):

[Chemical Formula 43]

General Formula (E-5)

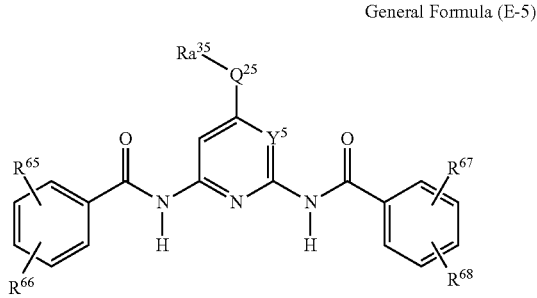

(In the general formula (E-5), R65, R66, R67 and R68 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms. Ra35 represents an alkyl group, an alkenyl group, an alkynyl group, an aryl group or a heterocyclic group. Q25 represents a single bond, —O—, —S— or —NRf—; Rf represents a hydrogen atom, an alkyl group, an alkenyl group, an alkynyl group, an aryl group or a heterocyclic group, and may link with Ra35 to form a ring.)

(F) Compound Represented by General Formula (F-1):

[Chemical Formula 44]

General Formula (F-1)

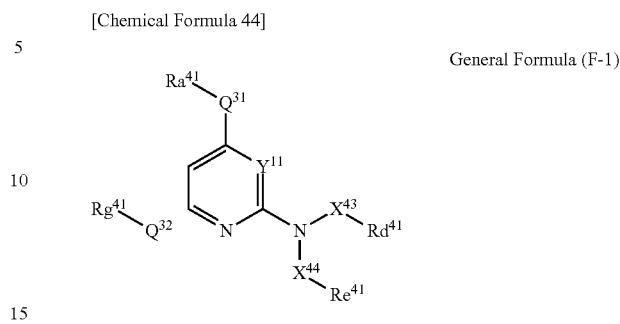

(In the general formula (F-1), Y11 represents a methine group or —N—; Ra41 and Rg41 each represent an alkyl group, an alkenyl group, an alkynyl group, an aryl group or a heterocyclic group; Rd41 and Re41 each independently represent a hydrogen atom, an alkyl group, an alkenyl group, an alkynyl group, an aryl group or a heterocyclic group; Q31 represents —O—, —S— or —NRf—; Rf represents a hydrogen atom, an alkyl group, an alkenyl group, an alkynyl group, an aryl group or a heterocyclic group, and may link with Ra41 to form a ring; Q32 represents —O—, —S— or —NRh—; Rh represents a hydrogen atom, an alkyl group, an alkenyl group, an alkynyl group, an aryl group or a heterocyclic group, and may link with Rg41 to form a ring; X43 represents a single bond or a divalent linking group; X44 represents a linking group selected from divalent linking groups represented by the above-mentioned general formula (P). In the general formula (P), the side * is the linking site via which the formula links with the N atom substituting on the hetero ring in the compound represented by the general formulae (F-1).)

Especially preferably, the compound represented by the general formula (F-1) is represented by the following general formula (F-2):

[Chemical Formula 45]

General Formula (F-2)

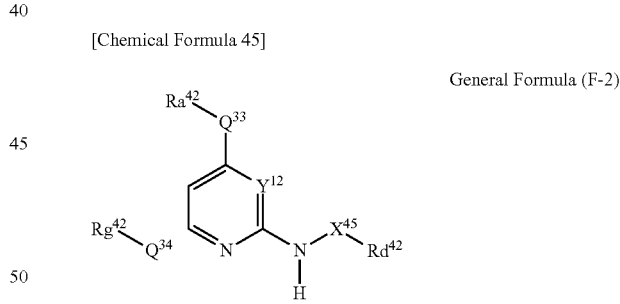

(In the general formula (F-2), Y12 represents a methine group or —N—; Ra42 and Rg42 each represent an alkyl group, an alkenyl group, an alkynyl group, an aryl group or a heterocyclic group; Rd42 represents a hydrogen atom, an alkyl group, an alkenyl group, an alkynyl group, an aryl group or a heterocyclic group; Q33 represents —O—, —S— or —NRf—; Rf represents a hydrogen atom, an alkyl group, an alkenyl group, an alkynyl group, an aryl group or a heterocyclic group, and may link with Ra42 to form a ring; Q34 represents —O—, —S— or —NRh—; Rh represents a hydrogen atom, an alkyl group, an alkenyl group, an alkynyl group, an aryl group or a heterocyclic group, and may link with Rg42 to form a ring; X43 represents a single bond or a divalent linking group; X45 represents a linking group selected from divalent linking groups represented by the above-mentioned general formula (P). In the general formula (P), the side * is the linking site via which the formula links with the N atom substituting on the hetero ring in the compound represented by the general formulae (F-1).)

Especially preferably, the compound represented by the general formula (F-1) is represented by the following general formula (F-3):

[Chemical Formula 46]

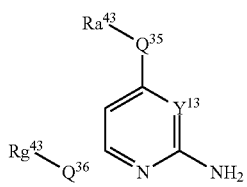

General Formula (F-3)

(In the general formula (F-3), Y13 represents a methine group or —N—; Ra43 and Rg43 each represent an alkyl group, an alkenyl group, an alkynyl group, an aryl group or a heterocyclic group; Q35 represents —O—, —S— or —NRf—; Rf represents a hydrogen atom, an alkyl group, an alkenyl group, an alkynyl group, an aryl group or a heterocyclic group, and may link with Ra43 to form a ring; Q36 represents —O—, —S— or —NRh—; Rh represents a hydrogen atom, an alkyl group, an alkenyl group, an alkynyl group, an aryl group or a heterocyclic group, and may link with Rg43 to form a ring.)

Especially preferably, the compound represented by the general formula (F-1) is represented by the following general formula (F-4):

[Chemical Formula 47]

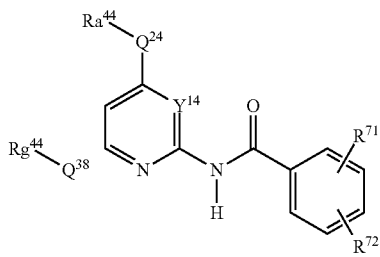

General Formula (F-4)

(In the general formula (F-4), Y14 represents a methine group or —N—; Ra44 and Rg44 each represent an alkyl group, an alkenyl group, an alkynyl group, an aryl group or a heterocyclic group; Q37 represents a single bond, —O—, —S— or —NRf—; Rf represents a hydrogen atom, an alkyl group, an alkenyl group, an alkynyl group, an aryl group or a heterocyclic group, and may link with Ra44 to form a ring; Q38 represents a single bond, —O—, —S— or —NRf—; Rf represents a hydrogen atom, an alkyl group, an alkenyl group, an alkynyl group, an aryl group or a heterocyclic group, and may link with Rg44 to form a ring. R71 and R72 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms.)

Especially preferably, the compound represented by the general formula (F-1) is represented by the following general formula (F-5):

[Chemical Formula 48]

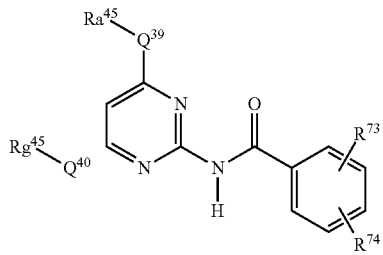

General Formula (F-5)

(In the general formula (F-5), Ra45 and Rg45 each represent an alkyl group, an alkenyl group, an alkynyl group, an aryl group or a heterocyclic group; Q39 represents a single bond, —O—, —S— or —NRf—; Rf represents a hydrogen atom, an alkyl group, an alkenyl group, an alkynyl group, an aryl group or a heterocyclic group, and may link with Ra45 to form a ring; Q40 represents a single bond, —O—, —S— or —NRf—; Rf represents a hydrogen atom, an alkyl group, an alkenyl group, an alkynyl group, an aryl group or a heterocyclic group, and may link with Rg45 to form a ring. R73 and R74 each independently represent a hydrogen atom, a halogen atom, a hydroxyl group, a carbamoyl group, a sulfamoyl group, an alkyl group having from 1 to 8 carbon atoms, an alkoxy group having from 1 to 8 carbon atoms, an alkylamino group having from 1 to 8 carbon atoms, or a dialkylamino group having from 1 to 8 carbon atoms.)

Preferred examples of the compounds represented by the general formula (E-1) or the general formula (F-1) are shown below.

[Chemical Formula 49]

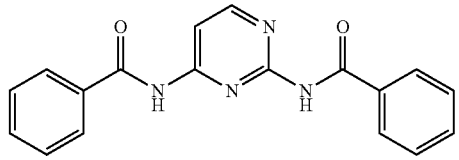

E-101

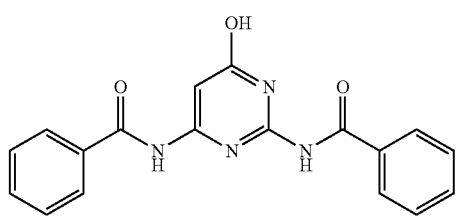

E-102

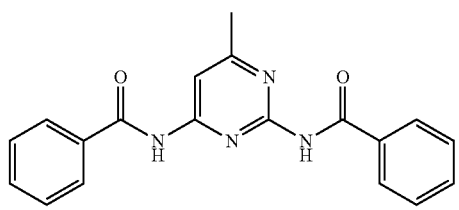

E-103

E-104 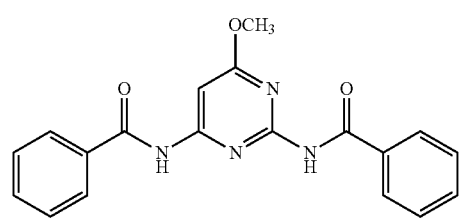
E-105 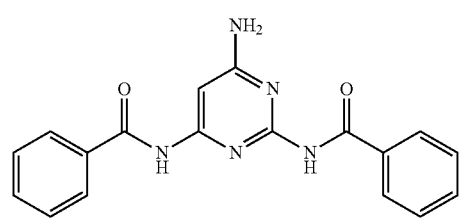
E-106 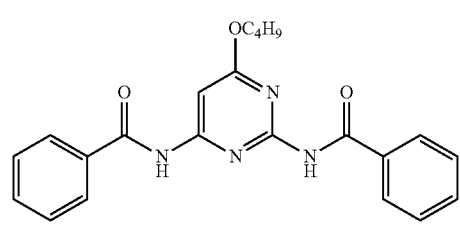
E-107 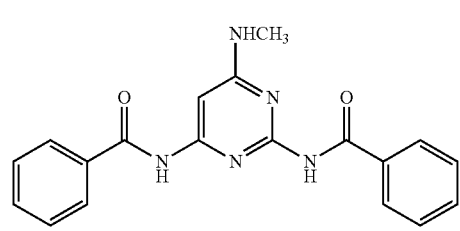
E-108 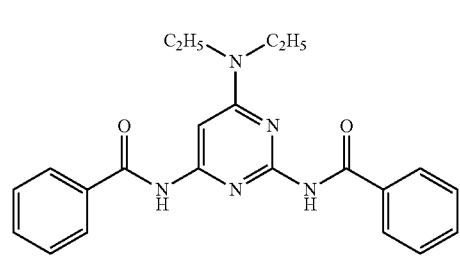
E-109 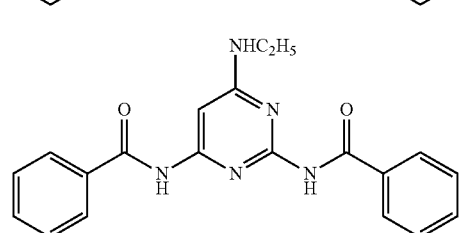
E-110 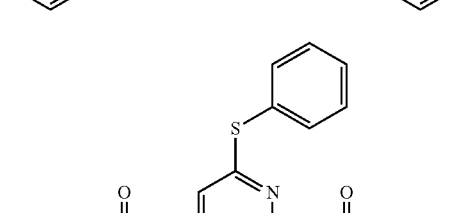
E-111 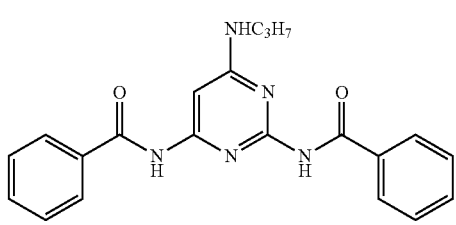
E-112 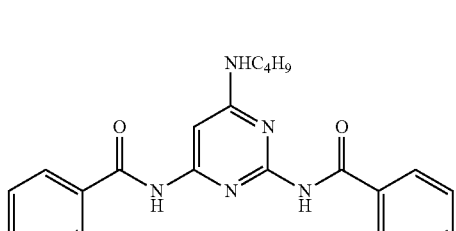
E-113 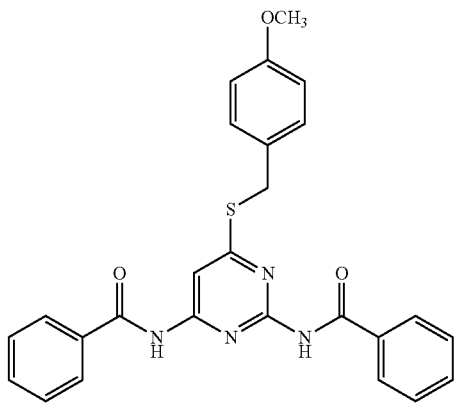
[Chemical Formula 50]
E-201 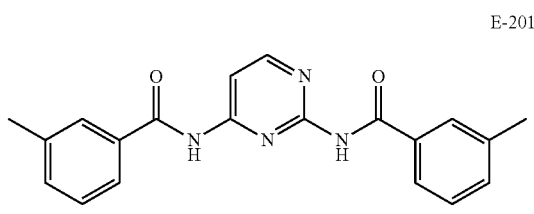
E-202 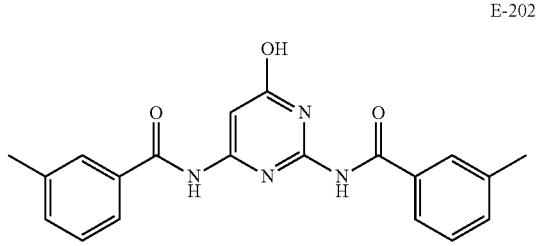
E-203 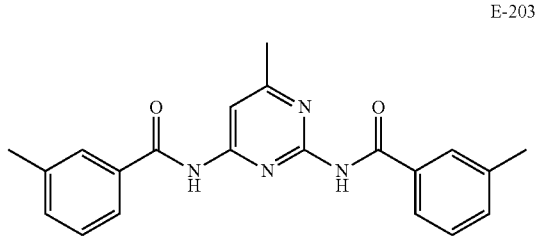

E-204
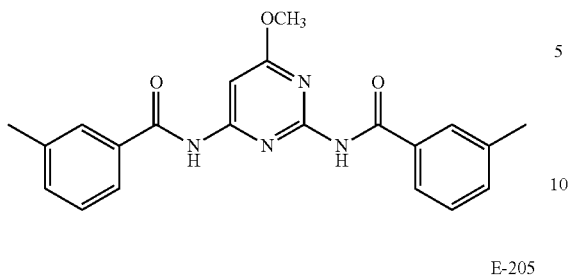
E-205
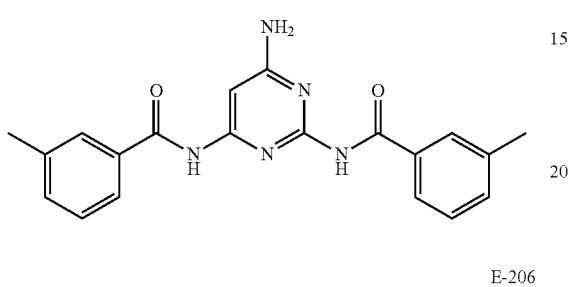
E-206
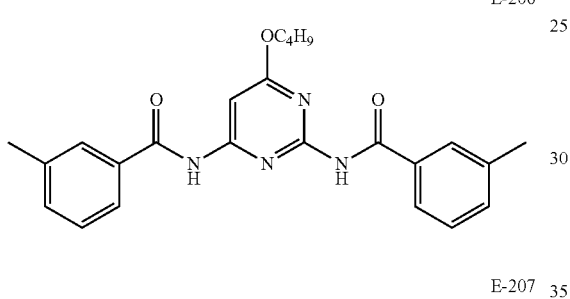
E-207
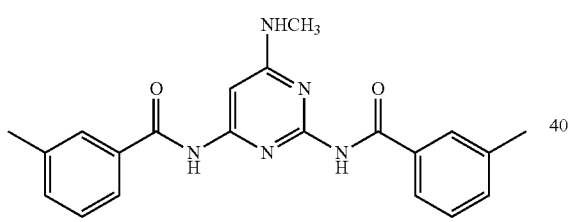
E-208
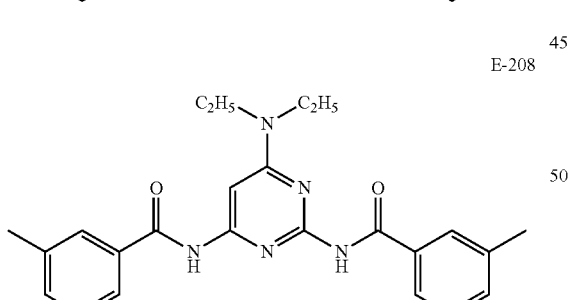
E-209
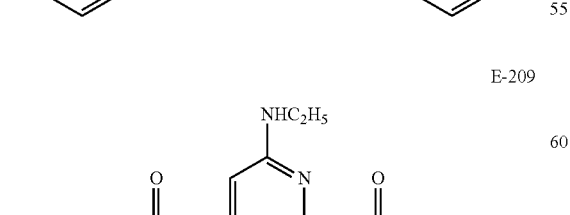
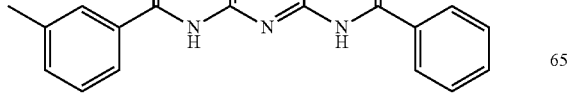
E-210
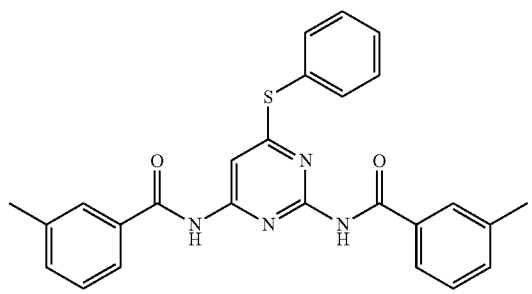
E-211
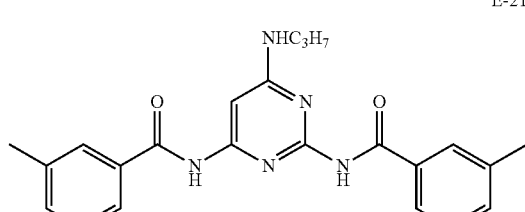
E-212
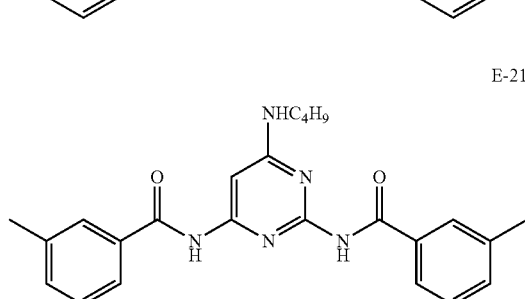
E-213
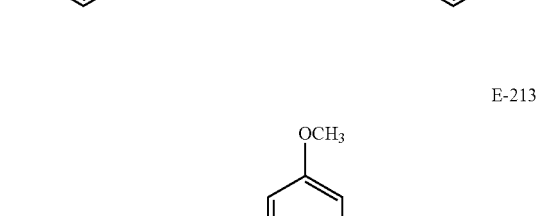
[Chemical Formula 51]
E-301
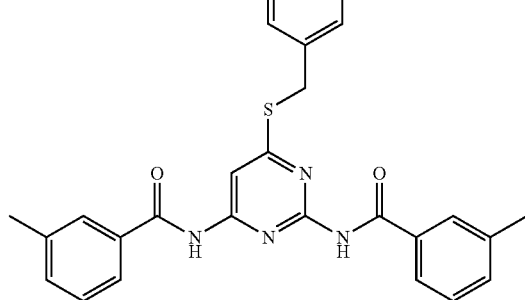
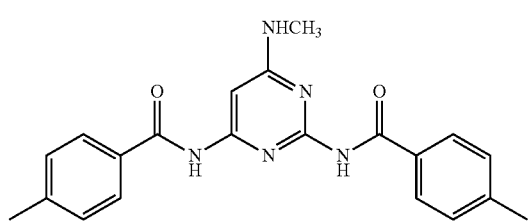

E-302
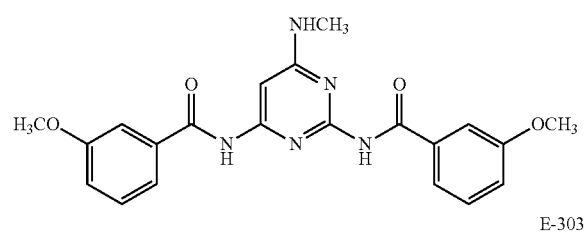
E-303
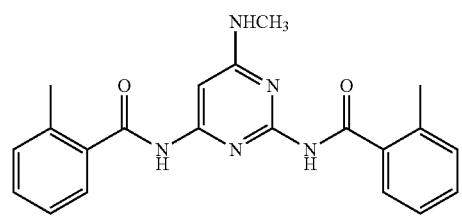
E-304
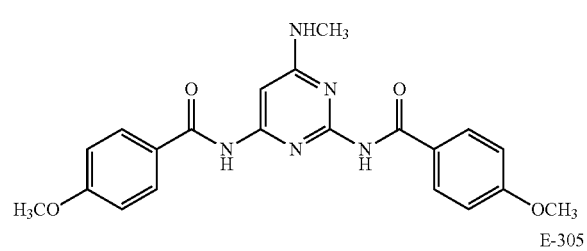
E-305
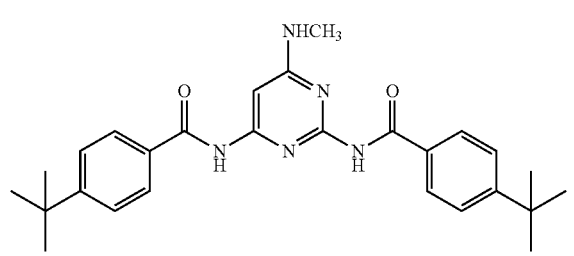
E-306
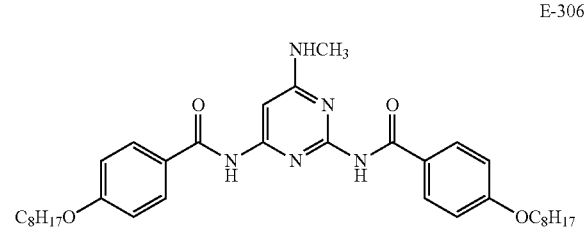
E-307
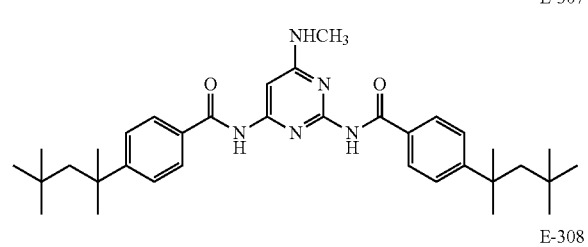
E-308
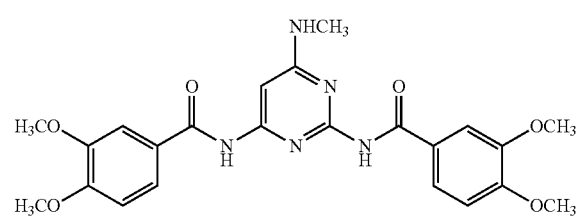
E-309
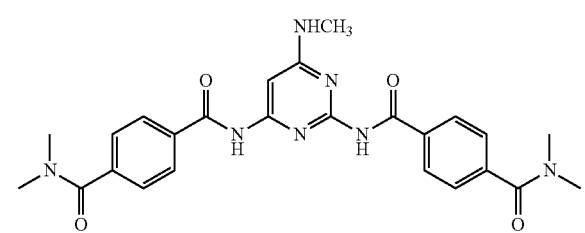
E-310
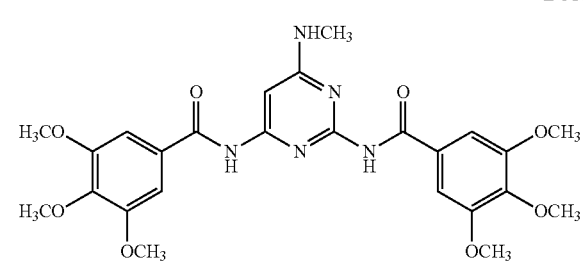
E-311
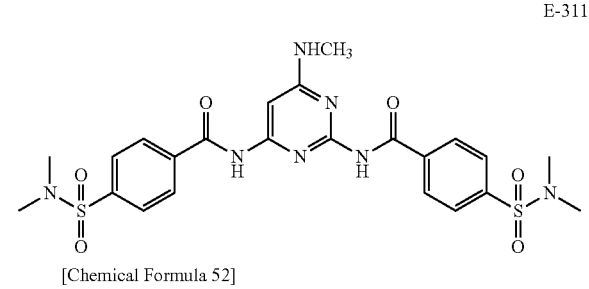
[Chemical Formula 52]
E-401
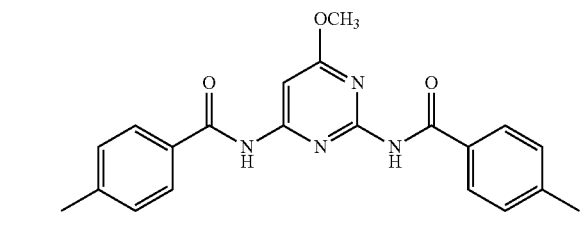
E-402
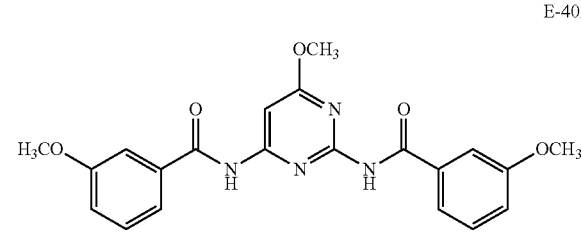
E-403
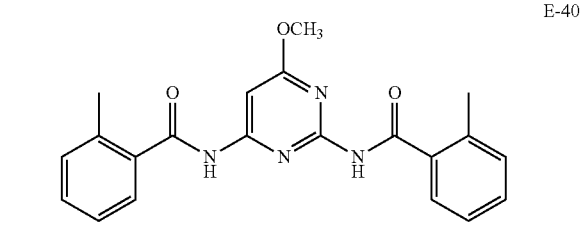

E-404
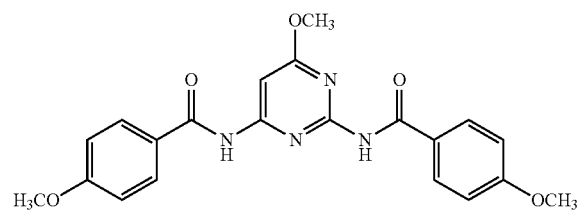
E-405
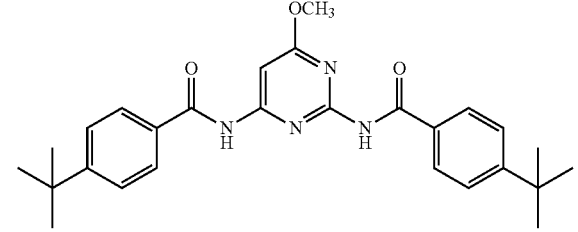
E-406
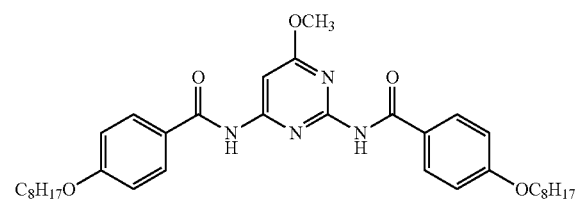
E-407
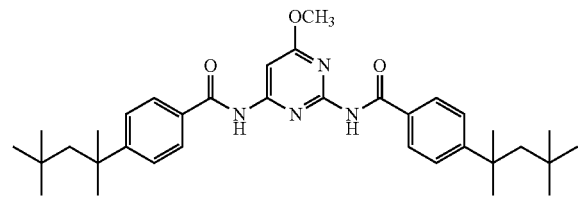
E-408
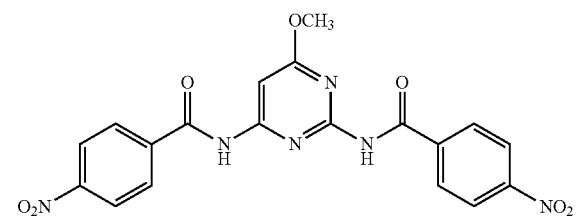
E-409
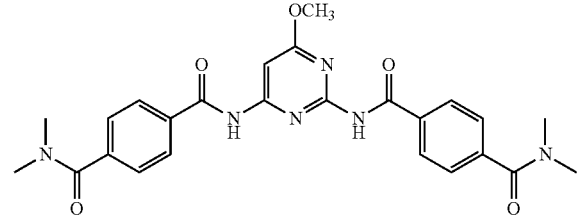
E-410
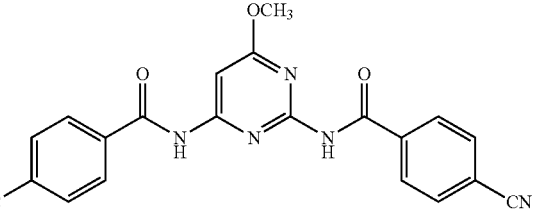
E-411
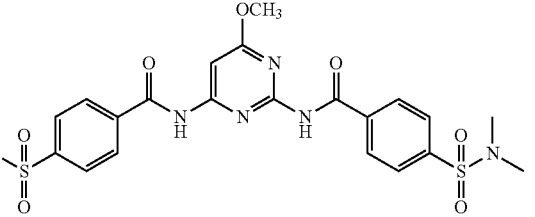
E-412
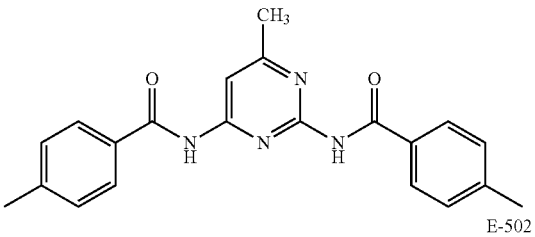
[Chemical Formula 53]
E-501
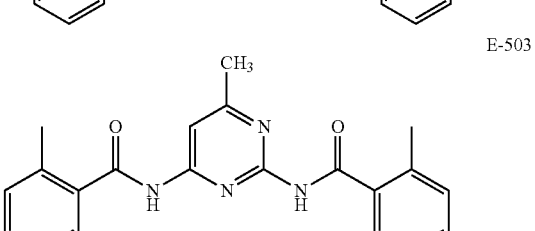
E-502
E-503
E-504
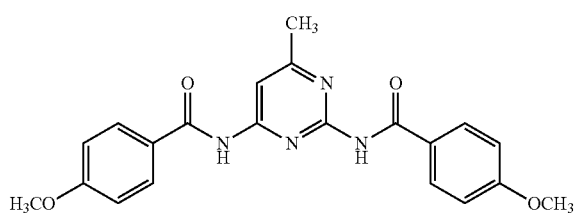

E-505
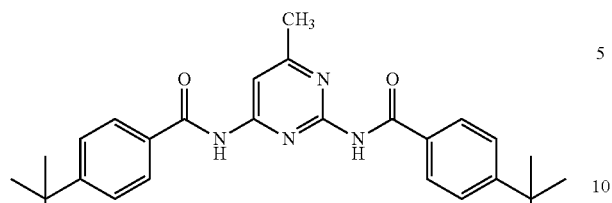
E-506
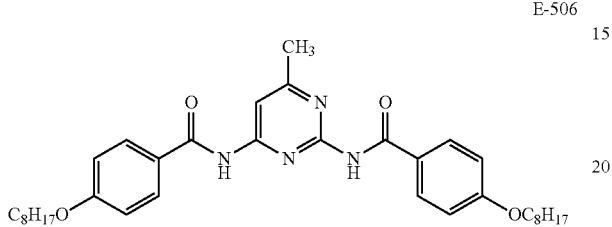
E-507
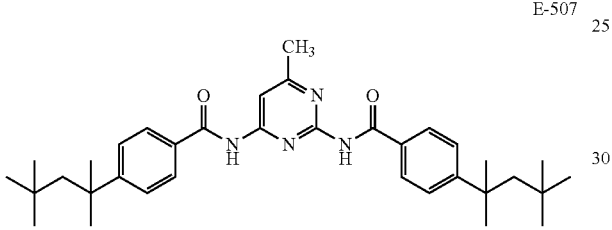
E-508
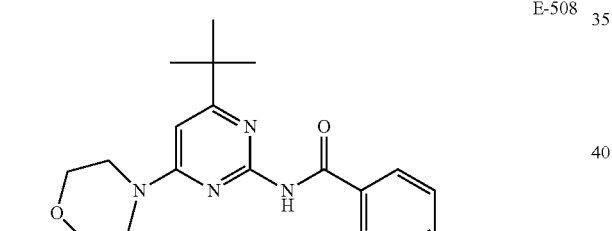
E-509
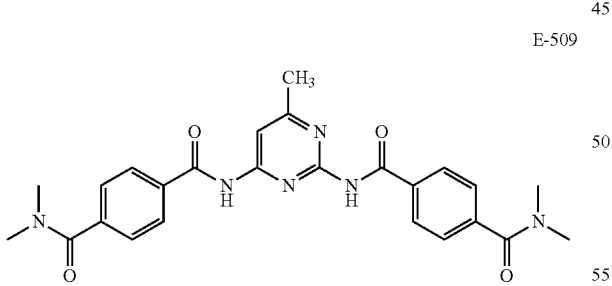
E-510
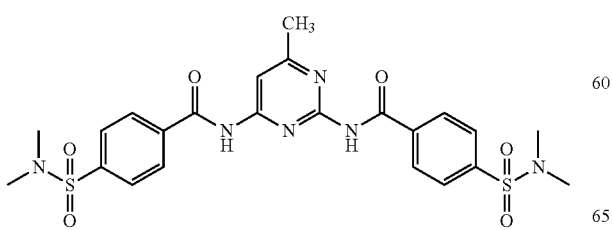
[Chemical Formula 54]
E-601
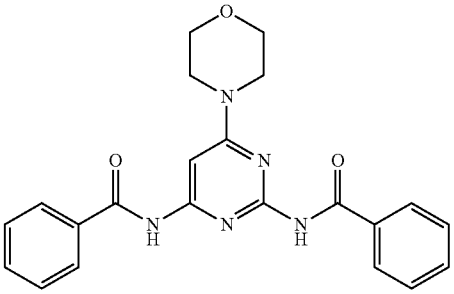
E-602
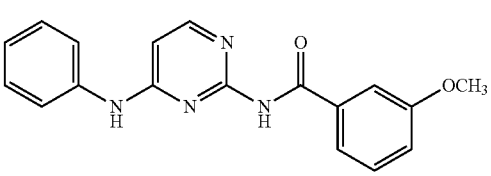
E-603
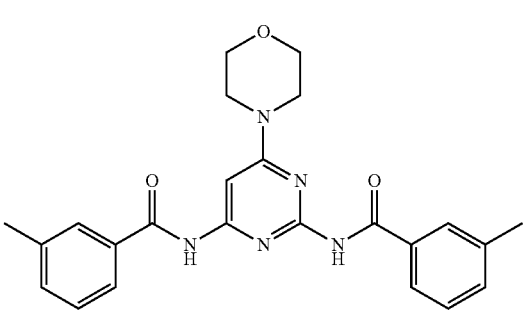
E-604
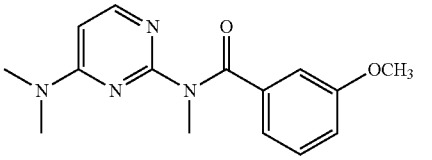
E-605
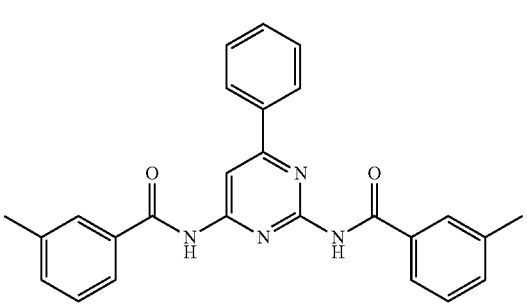
E-606
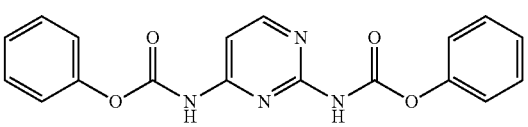

-continued
E-607
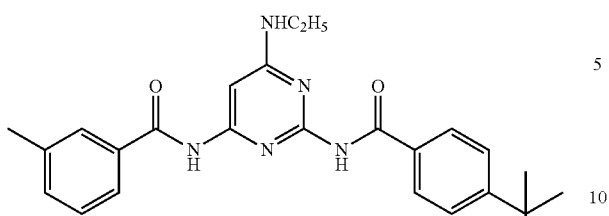
E-608
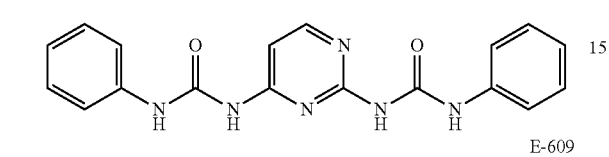
[Chemical Formula 55]
E-609
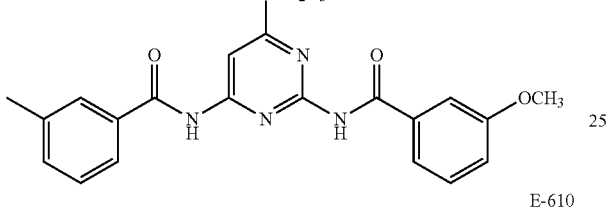
E-610
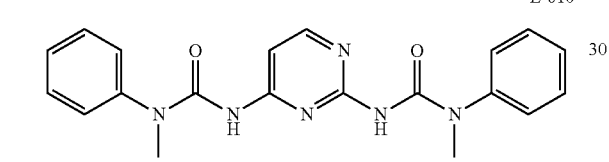
E-611
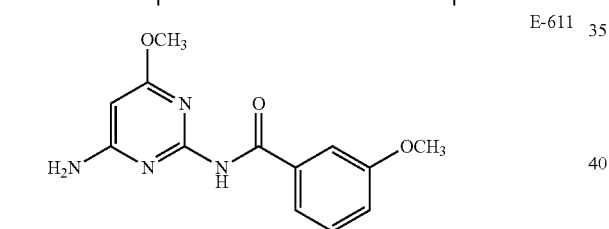
E-612
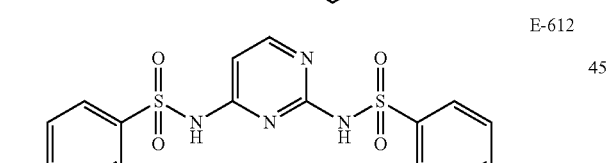
E-701
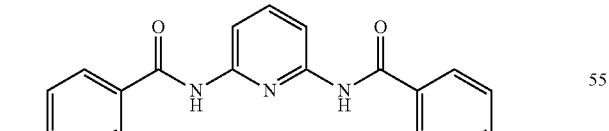
E-701
-continued
E-702
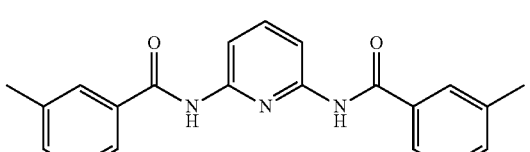
E-703
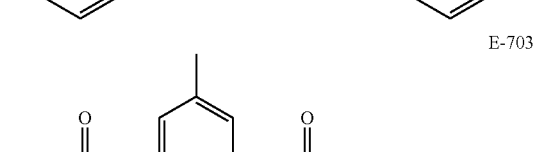
E-704
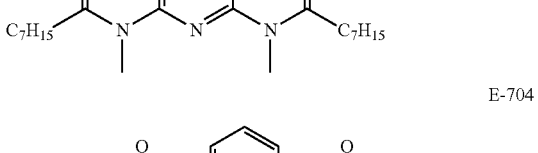
E-705
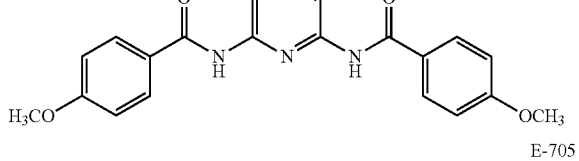
E-706
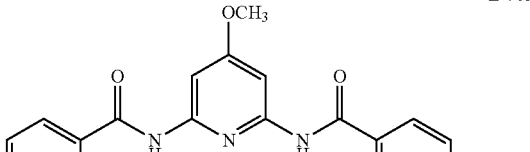
E-707
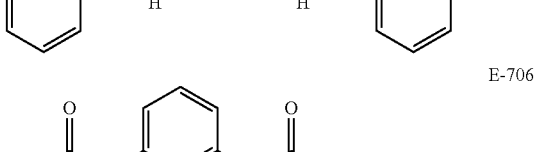
E-708
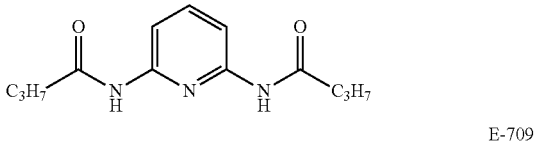
E-709
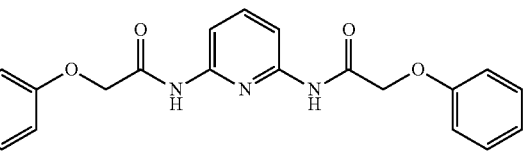

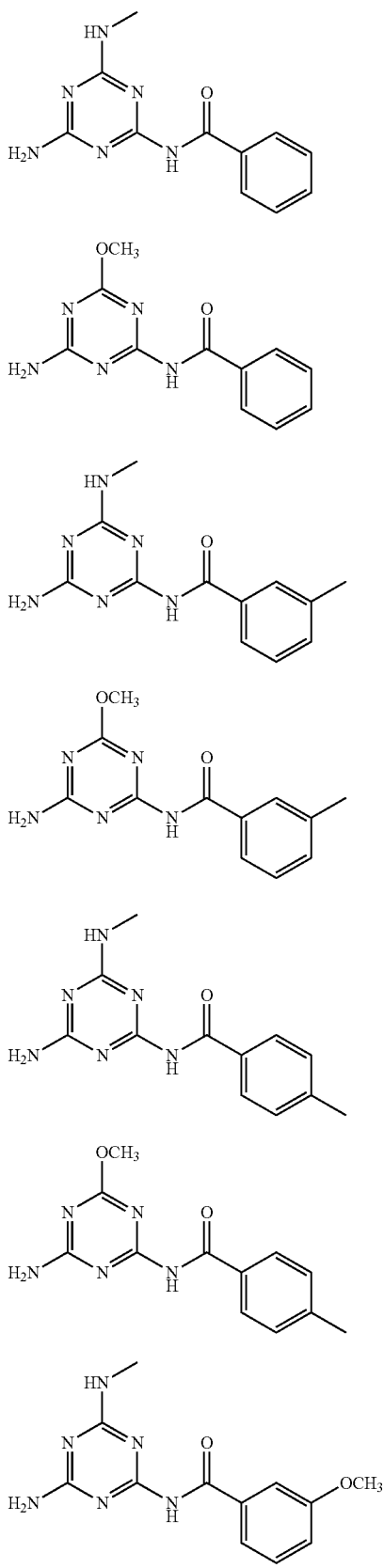
(F-101)
(F-102)
(F-103)
(F-104)
(F-105)
(F-106)
(F-107)
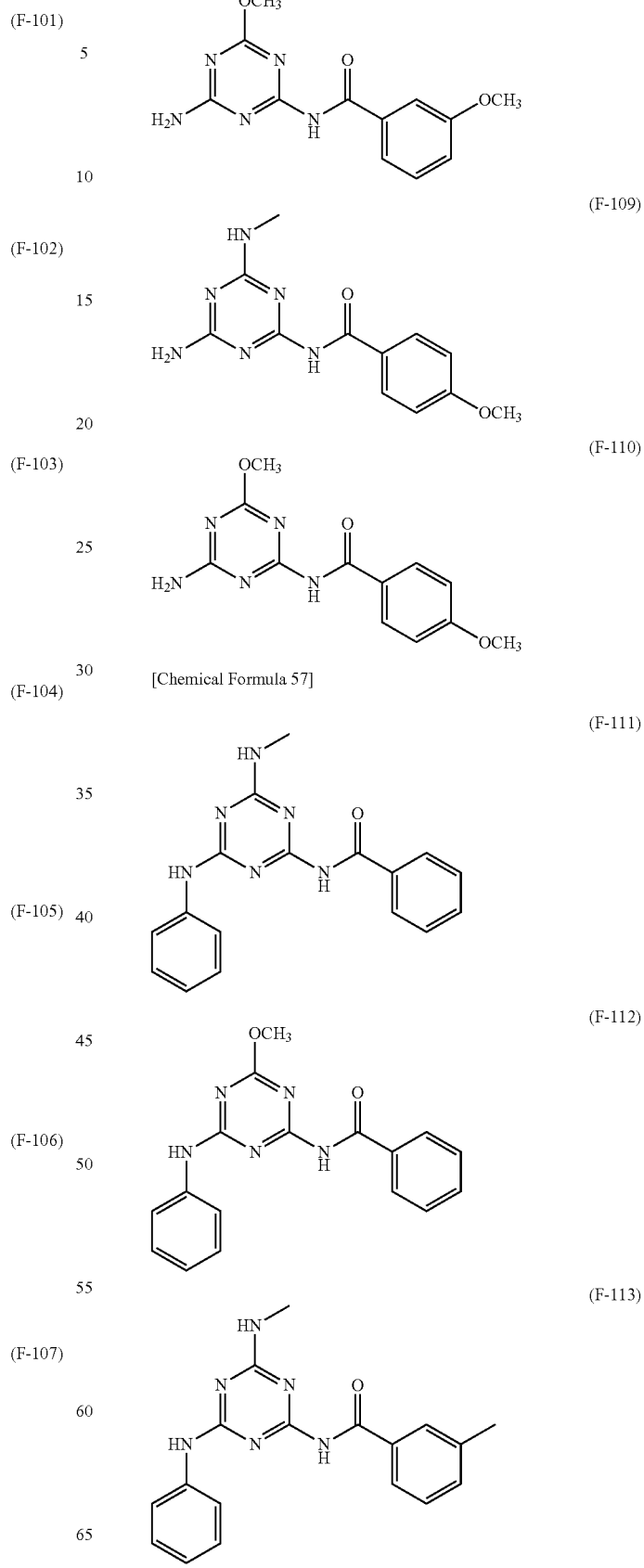
(F-108)
(F-109)
(F-110)
[Chemical Formula 57]
(F-111)
(F-112)
(F-113)

(F-114) 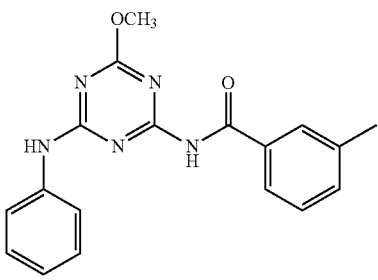

(F-115) 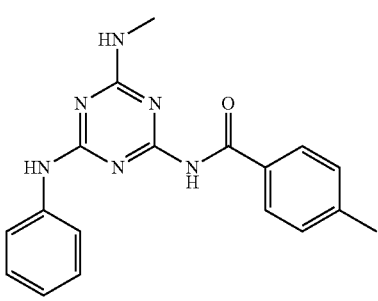

(F-116) 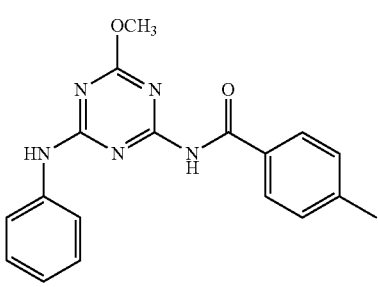

(F-117) 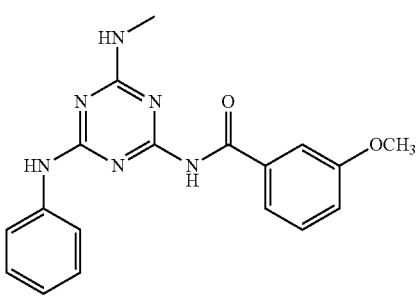

(F-118) 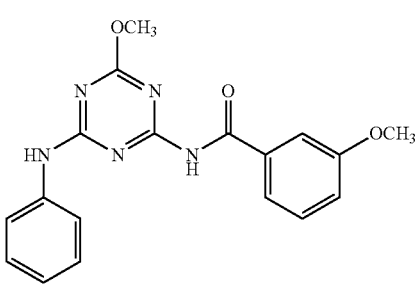

(F-119) 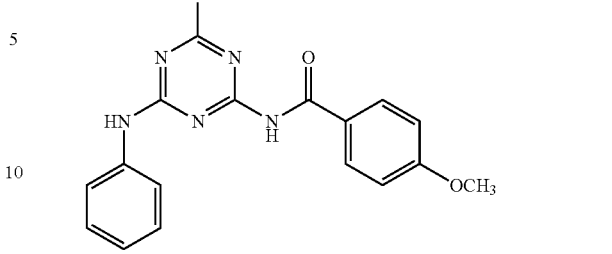

(F-120) 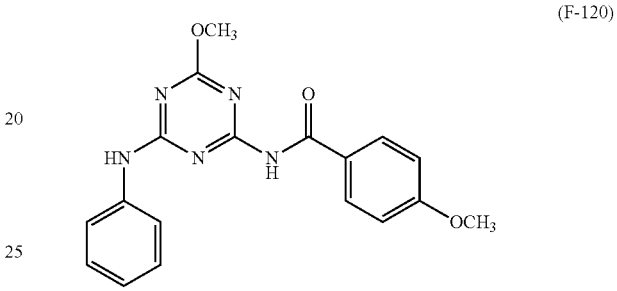

The compounds represented by the above-mentioned general formula (E-1) can be produced, for example, according to the method of the following scheme 1. Specifically, the compounds can be produced by reacting a compound of the general formula (E-1a) and a compound of the general formula (E-1b) in an organic solvent in the presence of a base. As the compound of the general formula (E-1a) and the compound of the general formula (E-1b), employable are commercial products or synthetic products produced according to known production methods. As the organic solvent, usable is any of alcohols (e.g., methanol, ethanol), esters (e.g., ethyl acetate), hydrocarbons (e.g., toluene), ethers (e.g., tetrahydrofuran), amides (e.g., dimethylformamide, dimethylacetamide, N-methylpyrrolidone, N-ethylpyrrolidone), halogenohydrocarbons (e.g., dichloromethane), nitriles (e.g., acetonitrile) or their mixed solvents. Preferred are alcohols and amides; and more preferred are methanol, ethanol, N-methylpyrrolidone and N-ethylpyrrolidone. Also preferred are mixed solvents of methanol, ethanol, N-methylpyrrolidone and N-ethylpyrrolidone.

As the base, usable are any of inorganic bases (e.g., potassium carbonate) and organic bases (e.g., triethylamine, sodium methoxide, sodium ethoxide). Preferred are organic bases, and more preferred is sodium methoxide. The amount of the base to be used is preferably within a range of from 0.5 to 10 equivalents relative to the compound represented by the general formula (E-1b), more preferably within a range of from 1 to 3 equivalents.

The reaction temperature falls generally from −20° C. to the boiling point of the solvent used, but is preferably from room temperature to the boiling point of the solvent used. The reaction time is generally from 10 minutes to 3 days, but is preferably from 1 hour to 1 day. The reaction may be attained in a nitrogen atmosphere or under reduced pressure. In particular, when the leaving group Z is an alkoxy group or an aryl group, the reaction is preferably attained under reduced pressure.

Scheme 1:

[Chemical Formula 58]

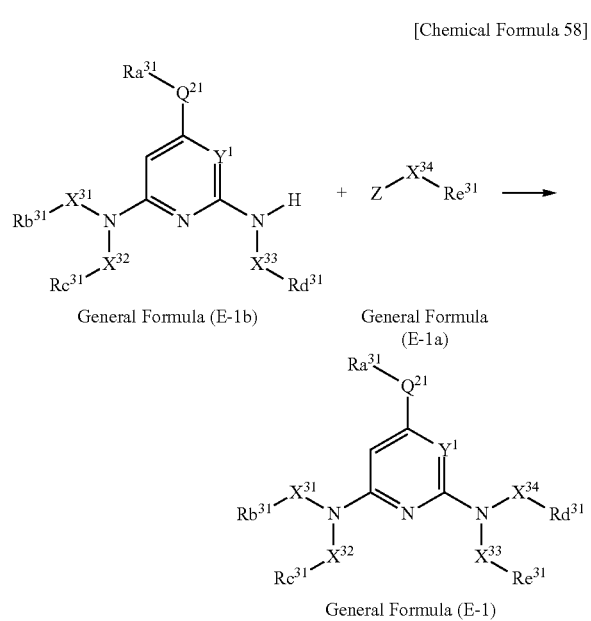

General Formula (E-1b)     General Formula (E-1a)

General Formula (E-1)

In the scheme 1, Z represents a leaving group, and is preferably a halogen atom, an alkoxy group or an aryloxy group.

The compounds represented by the above-mentioned general formula (E-2) for use in the invention can be produced, for example, according to the method of the following scheme 2. Specifically, the compounds can be produced by reacting a compound of the general formula (E-2a) with a compound of the general formula (E-2b) and the compound of the general formula (E-2c) in an organic solvent in the presence of a base. As the compounds of the general formula (E-2a), the general formula (E-2b) and the general formula (E-2c), employable are commercial products or synthetic products produced according to known production methods. Preferred examples of the solvent usable here are the same as those mentioned above. Preferred examples of the solvent usable here are the same as those mentioned above. The amount of the base to be used is preferably within a range of from 0.5 to 10 equivalents relative to the total amount of the compound represented by the general formula (E-2b) and the compound represented by the general formula (E-2c), more preferably within a range of from 1 to 3 equivalents. Preferred ranges of the reaction temperature and the reaction time are the same as those mentioned above.

Scheme 2:

[Chemical Formula 59]

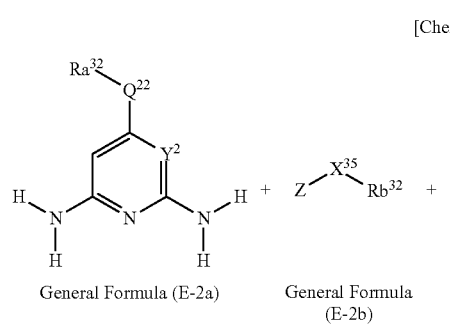

General Formula (E-2a)     General Formula (E-2b)

-continued

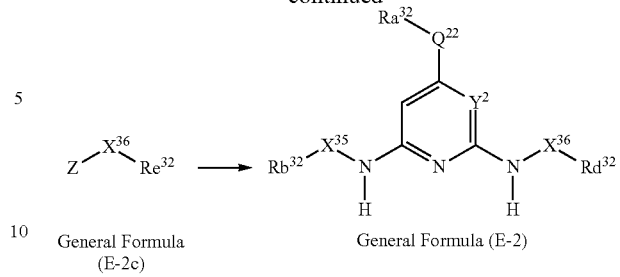

General Formula (E-2c)     General Formula (E-2)

Next described in detail is the compound represented by the general formula (G-1).

[Chemical Formula 60]

General Formula (G-1)

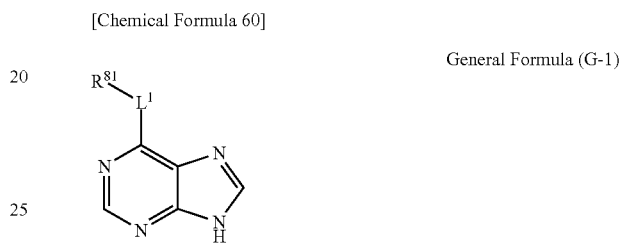

In the general formula (G-1), L1 represents a single bond or a hetero atom-containing divalent linking group, and is preferably a hetero atom-containing divalent linking group. The hetero atom-containing divalent linking group represented by L1 is preferably a linking group in which one and the same atom has the two chemical bonds participating in the linking. The linking group of the type includes —O—, —N(R82)-, —C(=O)—, —S—, —S(=O)$_2$—, and a linking group of their combination. The range of R82 is the same as the range of R3 mentioned above; and the preferred range of R82 covers a hydrogen atom and an alkyl group having from 1 to 15 carbon atoms (more preferably having from 1 to 10 carbon atoms, even more preferably from 1 to 5 carbon atoms, and still more preferably a methyl group).

Of those, preferred are —O—, —NH— and —N (CH3)-, —C (=O)—, and a linking group of their combination, and more preferred are —O—, —NH—C(=O)— and —N(CH3)-.

In the general formula (G-1), R81 represents a hydrogen atom, an alkyl group having from 1 to 20 carbon atoms, an alkenyl group having from 1 to 20 carbon atoms, an alkynyl group having from 2 to 20 carbon atoms, a heteroaryl group having from 5 to 20 carbon atoms, or an aryl group having from 6 to 20 carbon atoms.

In case where R81 is an alkyl group, preferably, the group has from 1 to 15 carbon atoms, more preferably from 1 to 10 carbon atoms, even more preferably from 1 to 5 carbon atoms.

In case where R1 and R2 each are independently an alkenyl group, preferably, the group has from 12 to 15 carbon atoms, more preferably from 12 to 10 carbon atoms, even more preferably from 12 to 5 carbon atoms.

In case where R81 is an alkynyl group, preferably, the group has from 2 to 15 carbon atoms, more preferably from 2 to 10 carbon atoms, even more preferably from 2 to 5 carbon atoms.

In case where R81 is an alkyl group, an alkenyl group or an alkynyl group, the group may be cyclic, linear or branched, but is preferably linear or branched, more preferably linear.

In case where R81 is a heteroaryl group, preferably, the group has from 5 to 18 carbon atoms, more preferably from 5 to 12 carbon atoms.

In case where R81 is an aryl group, preferably, the group has from 6 to 18 carbon atoms, more preferably from 6 to 12 carbon atoms.

In case where R81 is an arylalkyl group, preferably, the group has from 7 to 18 carbon atoms, more preferably from 7 to 12 carbon atoms.

R81 may further has a substituent, or may be unsubstituted. The substituent is not specifically defined so far as it is not contradictory to the spirit of the invention.

Preferably, the substituent is a halogen atom, an alkyl group having from 1 to 20 carbon atoms, an alkenyl group having from 1 to 20 carbon atoms, an alkynyl group having from 2 to 20 carbon atoms, a heteroaryl group having from 5 to 20 carbon atoms or an aryl group having from 6 to 20 carbon atoms. Above all, more preferred is an aryl group having from 6 to 20 carbon atoms. In particular, when R81 is an alkyl group having a substituent, the substituent is preferably a phenyl group.

Preferred combinations of L1 and R81 are as follows.

In case where L1 is —O—, R81 is preferably an alkyl group or an arylalkyl group having from 1 to 15 carbon atoms, more preferably an arylalkyl group.

In case where L1 is —NH—, R81 is preferably an alkyl group or an arylalkyl group having from 1 to 15 carbon atoms, more preferably an arylalkyl group.

In case where L1 is —NH—C(=O)—, R81 is preferably an alkyl group or an aryl group having from 1 to 15 carbon atoms, more preferably an alkyl group.

In case where L1 is —N(CH3)-, R81 is preferably an alkyl group or an alkyl group having from 1 to 15 carbon atoms, more preferably an alkyl group.

Preferably, R81 is a hydrogen atom or an alkyl group having from 1 to 20 carbon atoms from the viewpoint of retarding the retardation change of the film depending on the environmental humidity.

As the hydrogen-bonding compound for use in the invention, preferred are those represented by the above-mentioned general formula (G-1) where the number of the amino group in the purine base skeleton excluding the substituent is 0 or 1.

As the hydrogen-bonding compound for use in the invention, preferred are those represented by the above-mentioned general formula (G-1) where R1 is not a hydrogen atom. Specifically, as the hydrogen-bonding compound for use in the invention, more preferred are the above-mentioned nucleobase skeleton-having compounds represented by the following general formula (G-2).

[Chemical Formula 61]

General Formula (G-2)

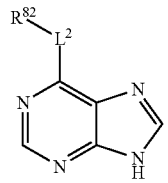

In the general formula (G-2), L2 represents a single bond or a hetero atom-containing divalent linking group; R82 represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms, or an arylalkyl group having from 7 to 20 carbon atoms.

In the general formula (G-2), the preferred range of L2 is the same as the preferred range of L1 in the above-mentioned general formula (G-1).

R82 represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms, or an arylalkyl group having from 7 to 20 carbon atoms; and the preferred range of the carbon number of each group is the same as the preferred range of the carbon number of each group in R81 in the general formula (G-1).

More preferably, R82 is a methyl group, a phenyl group or a benzyl group, even more preferably a methyl group, a phenyl group or a benzyl group.

The preferred combination of L2 and R82 in the general formula (G-2) tends to be the same as the preferred range of L1 and R81 in the general formula (G-1).

Preferably, the interaction between the nucleobase skeleton-having compound and cellulose acylate is retarded in order that the hydrogen-bonding compound does not cause a haze in the cellulose acylate film and does not bleed out or evaporate away from the film.

The partial structure which the nucleobase skeleton-having compound preferably has and which enables the interaction of the compound with cellulose acylate through hydrogen bonding or the like therebetween includes a purine base skeleton, an ether bond skeleton, an ester bond skeleton, an amide bond skeleton, an —NH— lining group skeleton, etc.

(Examples of Nucleobase Skeleton-Having Compound Represented by General Formula (G-1))

Specific examples of the nucleobase skeleton-having compound represented by the general formula (G-1) are as follows. However, the nucleobase skeleton-having compound represented by the general formula (G-1) usable in the invention as the hydrogen-bonding compound is not limited to these examples.

[Chemical Formula 62]

(G-101)

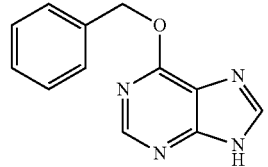

(G-102)

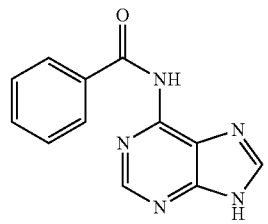

(G-103)

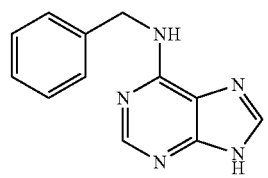

(G-104)
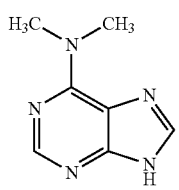
(G-106)
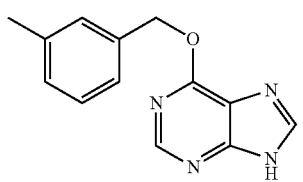
(G-107)
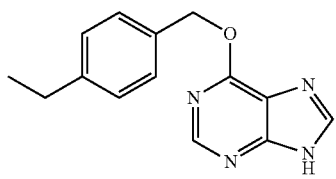
(G-108)
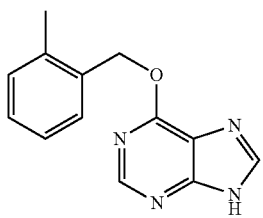
(G-109)
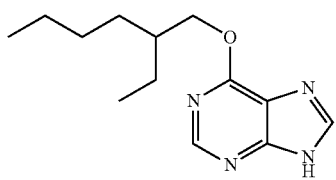
(G-110)
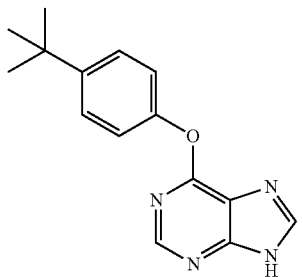
[Chemical Formula 63]
(G-111)
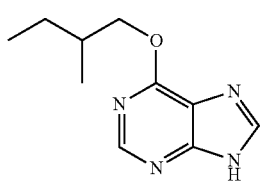
(G-112)
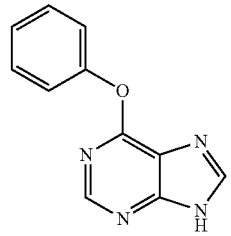
(G-113)
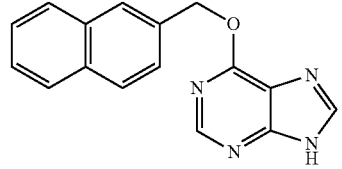
(G-114)
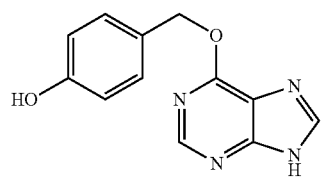
(G-115)
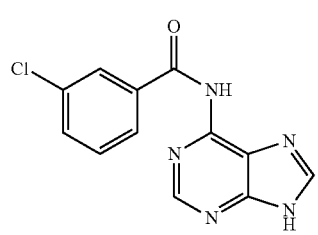
(G-116)
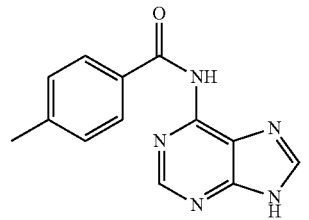
(G-117)
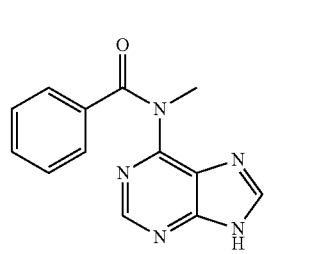
(G-118)
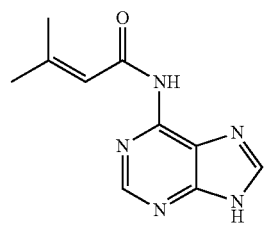

(G-119)

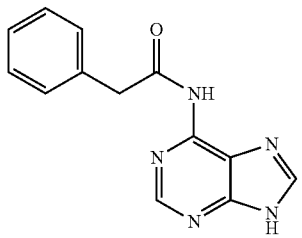

(G-120)

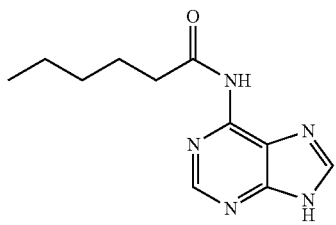

[Chemical Formula 64]

(G-121)

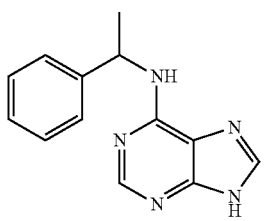

(G-122)

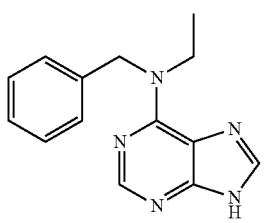

(G-123)

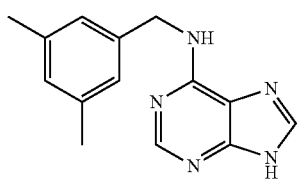

(G-124)

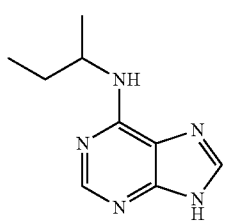

(H) Compound Represented by General Formula (H-1):

Next described in detail is the compound represented by the general formula (H-1).

[Chemical Formula 65]

General Formula (H-1)

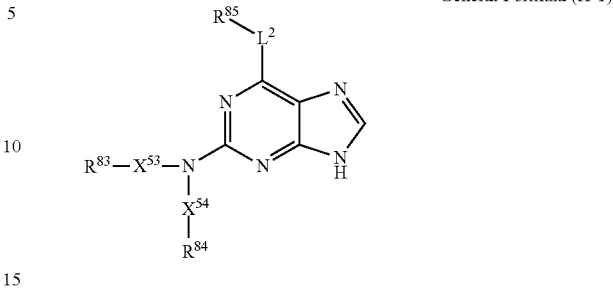

(In the general formula (H-1), L3 represents a single bond or a hetero atom-containing divalent linking group; $R^{85}$ represents an alkyl group having from 1 to 20 carbon atoms, an alkenyl group having from 2 to 20 carbon atoms, an alkynyl group having from 2 to 20 carbon atoms, an aryl group having from 6 to 20 carbon atoms, or an arylalkyl group having from 7 to 20 carbon atoms; $R^{83}$ and $R^{84}$ each independently represent a hydrogen atom, an alkyl group, an alkenyl group, an alkynyl group, an aryl group or a heterocyclic group; $X^{53}$ and $X^{54}$ each independently represent a linking group selected from divalent linking groups represented by the above-mentioned general formula (P). In the general formula (P), the side * is the linking site via which the formula links with the N atom substituting on the hetero ring in the compound represented by the general formulae (H-1).)

Preferred examples of the compound represented by the general formula (H-1) are shown below.

[General Formula 66]

(H-101)

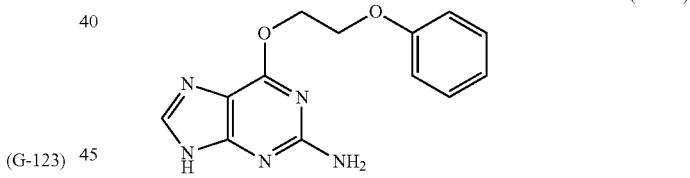

(H-102)

(H-103)

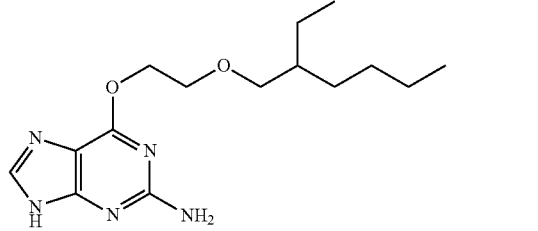

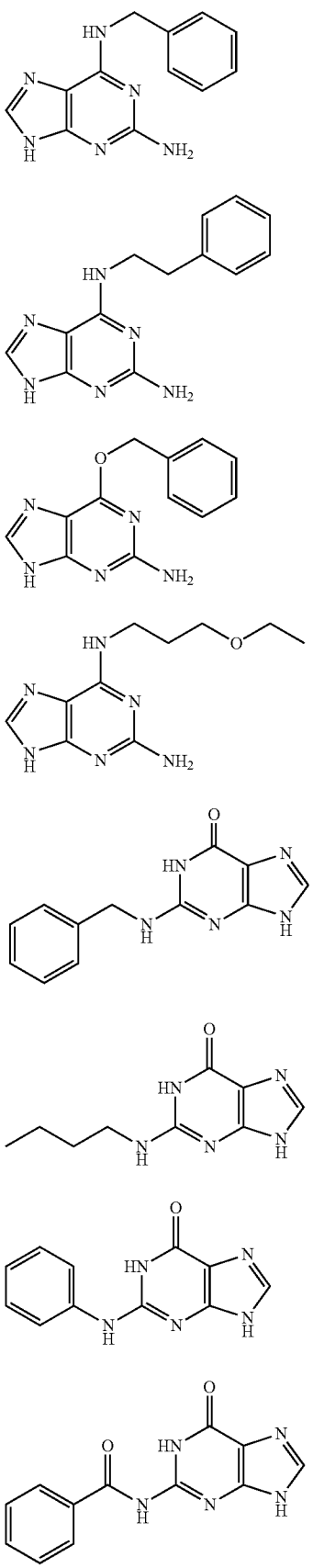

(H-104)
(H-105)
(H-106)
(H-107)
(H-108)
(H-109)
(H-110)
(H-111)

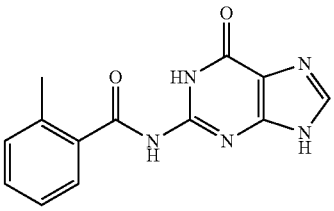

(H-112)

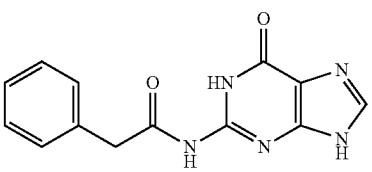

(H-113)

(Physical Properties)

Preferably, the compound represented by the above-mentioned general formulae (A-1) to (H-1) has a molecular weight of from 100 to 1000, more preferably from 150 to 700, even more preferably from 150 to 450.

(Amount to be Added)

The amount to be added of the compound represented by the above-mentioned general formulae (A-1) to (H-1) is preferably at most 30% by mass of cellulose acylate resin, more preferably from 1 to 30% by mass, even more preferably from 2 to 20% by mass, still more preferably from 3 to 15% by mass.

Also preferably, the total content of the hydrogen-bonding compound in the film relative to the cellulose acylate resin therein is at most 35% by mass, more preferably at most 30% by mass, even more preferably at most 20% by mass. The hydrogen-bonding compound is not limited to the compounds represented by the above-mentioned general formulae (A-1) to (H-1).

<Hydrophobizing Agent>

The cellulose acylate film of the invention contains at least one hydrophobizing agent selected from a polyalcohol ester-base hydrophobizing agent, a polycondensate ester-base hydrophobizing agent and a carbohydrate derivative-base hydrophobizing agent. The hydrophobizing agent is preferably one capable of reducing the water content of the film not lowering as much as possible the glass transition temperature thereof. Containing the hydrophobizing agent of the type, the advantage of the cellulose acylate film is that the additives in the film can be prevented from diffusing into the polarizing element layer arranged adjacent to the film, in high-temperature and high-humidity environments, therefore preventing the degradation of the polarizing element performance. The hydrophobizing agent usable in the invention is described in detail hereinunder.

(Polyalcohol Ester-Base Hydrophobizing Agent)

The polyalcohol usable in the invention is represented by the following general formula (4):

R1-(OH)$_n$   General Formula (4)

(wherein R1 represents an n-valent organic group, and n indicates a positive integer of 2 or more.)

Preferred examples of the polyalcohol-base hydrophobizing agent are mentioned below, to which, however, the invention is not limited. Adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, etc. Especially preferred are triethylene glycol, tetraethylene glycol, dipropylene glycol, tripropylene glycol, sorbitol, trimethylolpropane, xylitol.

Above all, polyalcohol esters using a polyalcohol having at least 5 carbon atoms are preferred as the polyalcohol-base hydrophobizing agent. Especially preferred are those having from 5 to 20 carbon atoms.

The monocarboxylic acid for use in the polyalcohol ester is not specifically defined, for which are usable any known aliphatic monocarboxylic acids, alicyclic monocarboxylic acids, aromatic monocarboxylic acids, etc. Use of alicyclic monocarboxylic acids and aromatic monocarboxylic acids is preferred as enhancing the moisture permeability and moisture retentivity in the film.

Preferred examples of the monocarboxylic acid usable in the polyalcohol ester are mentioned below, to which, however, the invention is not limited.

As the aliphatic monocarboxylic acid, preferred is use of linear or branched fatty acids having from 1 to 32 carbon atoms. More preferably, the carbon number is from 1 to 20, even more preferably from 1 to 10. Acetic acid is preferred, as having good miscibility with cellulose derivatives; and also preferred is use of a mixture of acetic acid and any other monocarboxylic acid.

Preferred aliphatic monocarboxylic acids for use herein are saturated fatty acids such as acetic acid, propionic acid, butyric acid, valeric acid, caproic acid, enanthic acid, caprylic acid, pelargonic acid, caprylic acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotinic acid, heptacosanoic acid, montanic acid, melissic acid, lacceric acid, etc.; and unsaturated fatty acids such as undecylic acid, oleic acid, sorbic acid, linolic acid, linolenic acid, arachidonic acid, etc.

Preferred examples of the alicyclic monocarboxylic acid are cyclopentanecarboxylic acid, cyclohexanecarboxylic acid, cyclooctanecarboxylic acid, and their derivatives.

Preferred examples of the aromatic monocarboxylic acid are benzoic acid, those prepared by introducing an alkyl group into the benzene ring of benzoic acid such as, toluic acid, etc., aromatic monocarboxylic acids having at least 2 benzene rings such as biphenylcarboxylic acid, naphthalenecarboxylic acid, tetralincarboxylic acid, etc., and their derivatives.

Especially preferred is benzoic acid.

Not specifically defined, the molecular weight of the polyalcohol-base hydrophobizing agent is preferably from 300 to 3000, more preferably from 350 to 1500. Those having a larger molecular weight are preferred as hardly evaporating away from the film; however, those having a smaller molecular weight are also preferred from the viewpoint of the moisture permeability of the film and of the miscibility with cellulose derivatives.

One alone or two or more different types of carboxylic acids may be used in the polyalcohol ester. The hydroxyl groups in the polyalcohol may be all esterified, or a part of the hydroxyl groups may be kept remaining as such therein.

Specific examples of polyalcohol esters are shown below.

[Chemical Formula 67]

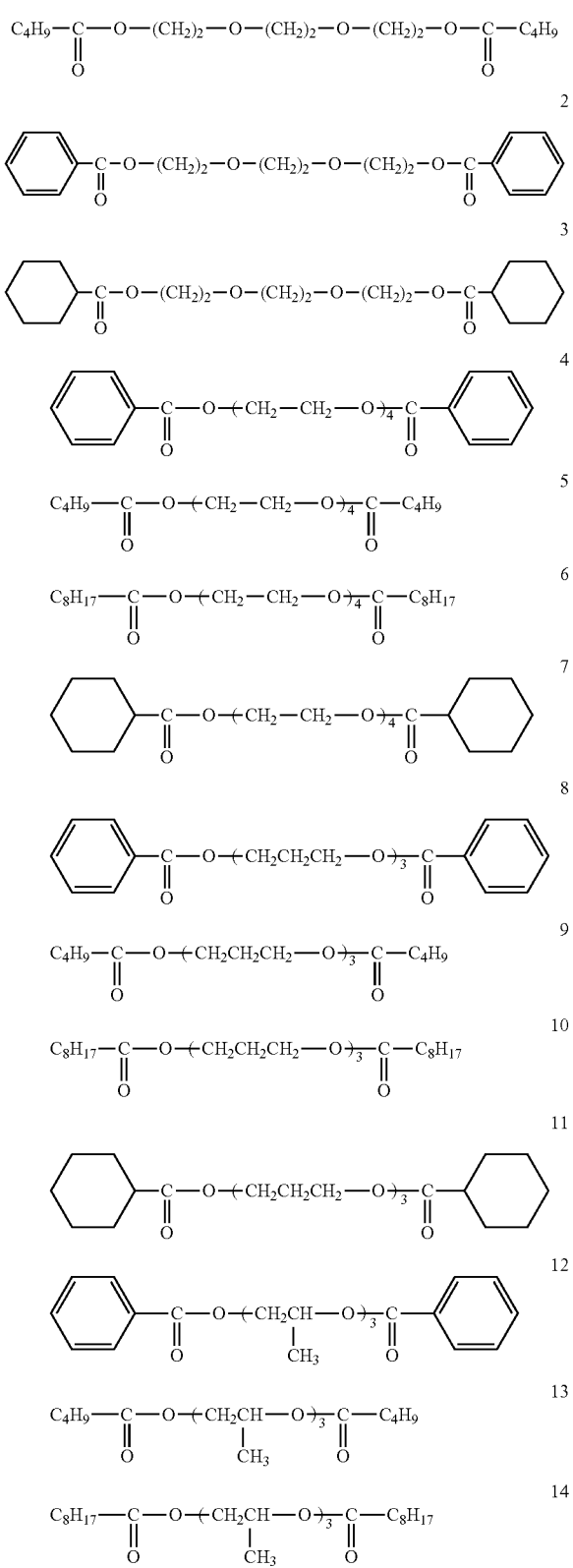

15
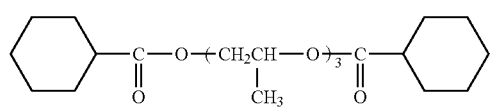
[Chemical Formula 68]
16
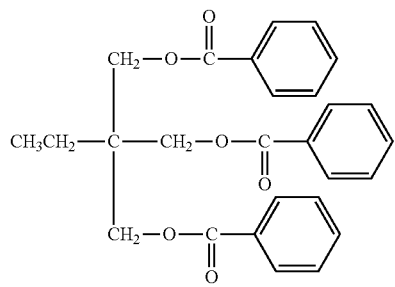
17
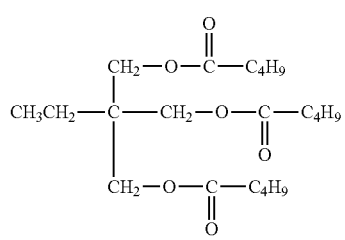
18
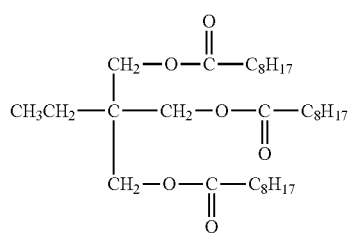
19
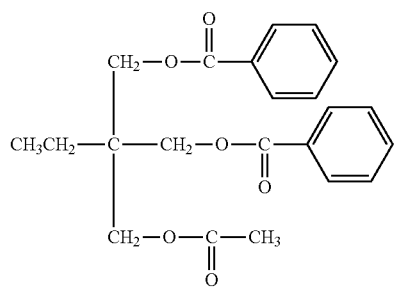
20
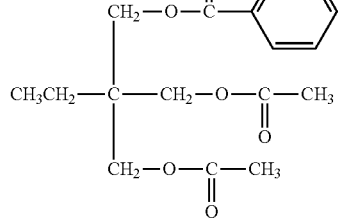
21
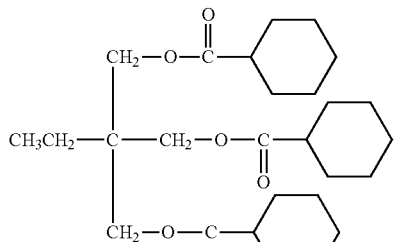
22
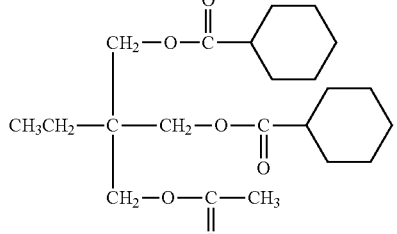
23
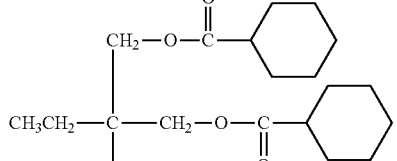
[Chemical Formula 69]
24
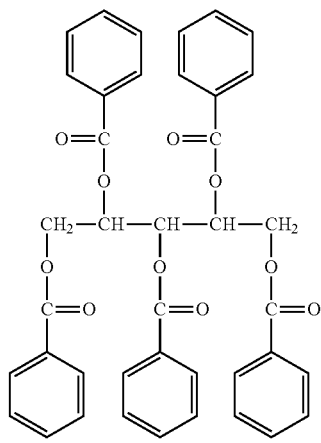
25
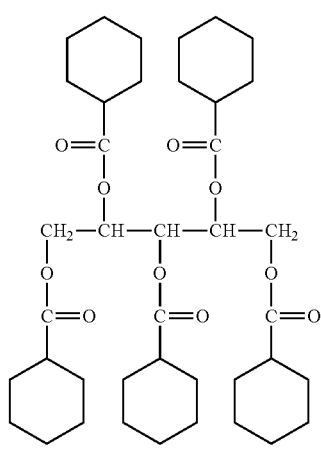

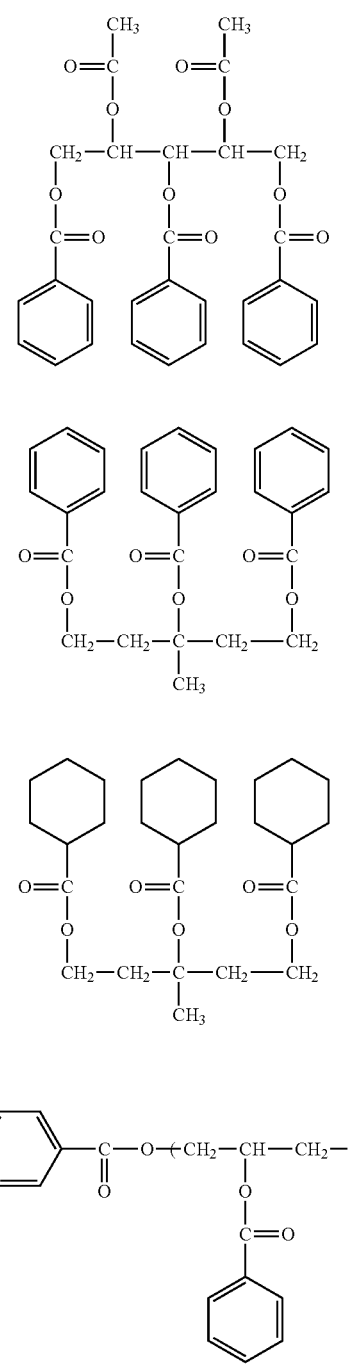

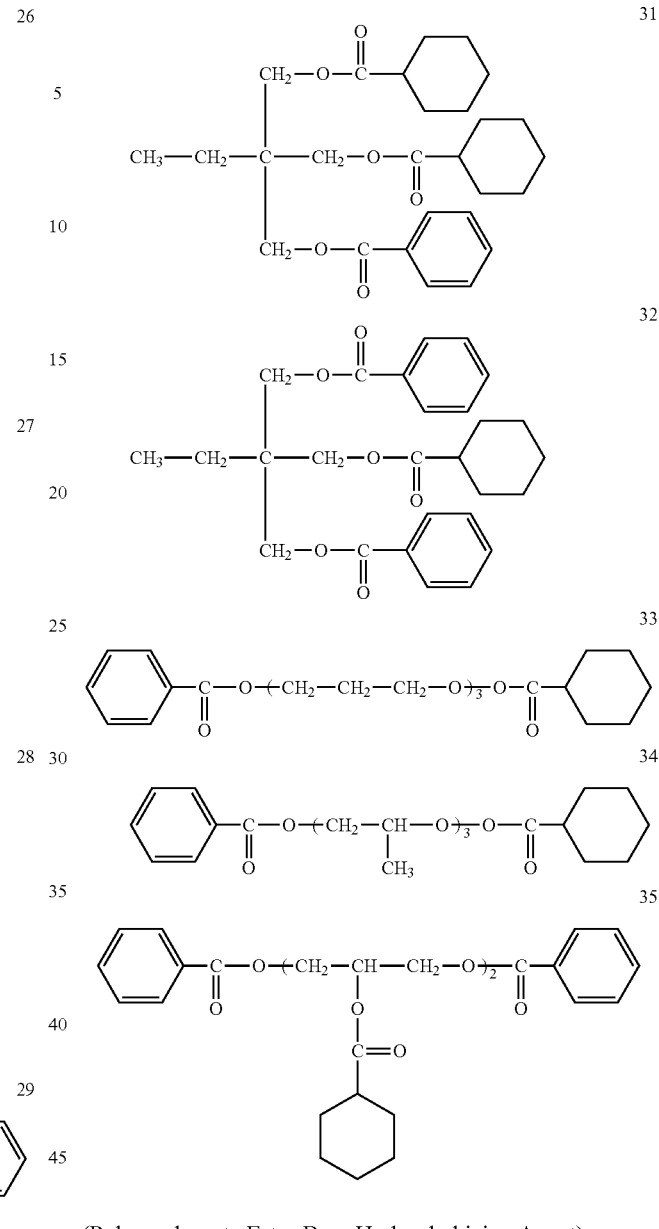

(Polycondensate Ester-Base Hydrophobizing Agent)

Preferably, the polycondensate ester-base hydrophobizing agent is one produced from at least one dicarboxylic acid having an aromatic ring (this may be referred to as an aromatic dicarboxylic acid) and at least one aliphatic diol having a mean carbon number of from 2.5 to 8.0. Also preferred is one produced from a mixture of aromatic dicarboxylic acid and at least one aliphatic dicarboxylic acid, and at least one aliphatic diol having a mean carbon number of from 2.5 to 8.0.

The mean carbon number of the dicarboxylic acid residue is computed separately for the dicarboxylic acid residue and the diol residue.

The value computed by multiplying the composition ratio (molar fraction) of the dicarboxylic acid residue by the constituent carbon number is the mean carbon number. For example, in case where the dicarboxylic acid is composed of adipic acid residue and a phthalic acid residue of 50 mol % each, the mean carbon number thereof is 7.0.

The same shall apply also to the diol residue. The mean carbon number of the diol residue is one computed by multiplying the composition ratio (molar fraction) of the diol residue by the constituent carbon number. For example, in case where the diol residue is composed of 50 mol % ethylene glycol residue and 50 mol % 1,2-propanediol residue, the mean carbon number thereof is 2.5.

Preferably, the number-average molecular weight of the polycondensate ester is from 500 to 2000, more preferably from 600 to 1500, even more preferably from 700 to 1200. When the number-average molecular weight of the polycondensate ester is at least 600, then the ester is poorly volatile and hardly causes film failures and process contamination owing to its evaporation under high-temperature condition in stretching the cellulose ester film. When the number-average molecular weight thereof is at most 2000, then the ester is highly miscible with cellulose ester and therefore hardly bleeds out during film formation and during film stretching under heat.

The number-average molecular weight of the polycondensate ester can be measured and evaluated through gel permeation chromatography. In a case of polyester polyol that is not end-capped, the number-average molecular weight can be computed from the amount of the hydroxyl group per weight thereof (hereinafter this may be referred to as a hydroxyl value). In the invention, the hydroxyl value is determined by measuring the amount of potassium hydroxide (mg) necessary for neutralization of excessive acetic acid after acetylation of polyester polyol.

In case where a mixture of an aromatic dicarboxylic acid and an aliphatic dicarboxylic acid is used as the dicarboxylic acid ingredient, preferably, the mean carbon number of the dicarboxylic acid ingredient is from 5.5 to 10.0, more preferably from 5.6 to 8.

When the mean carbon number is at least 5.5, then a polarizer excellent in durability can be obtained. When the mean carbon number is at most 10, then the miscibility of the mixture with cellulose ester is excellent, therefore preventing the ingredient from bleeding out in the process of forming the cellulose ester film.

An aromatic dicarboxylic acid residue is contained in the polycondensate ester obtained from a diol and a dicarboxylic acid containing an aromatic dicarboxylic acid.

In this description, the residue means the partial structure of the polycondensate ester, indicating the partial structure having the characteristic part of the monomer that forms the polycondensate ester. For example, the dicarboxylic acid residue of a dicarboxylic acid, HOOC—R—COOH is —OC—R—CO—.

Preferably, the aromatic dicarboxylic acid residue ratio in the polycondensate ester for use in the invention is at least 40 mol %, more preferably from 40 mol % to 95 mol %.

When the aromatic dicarboxylic acid residue ratio is at least 40 mol %, then a cellulose phthalate having sufficient optical anisotropy can be obtained, and a polarizer excellent in durability can be thereby obtained. When the ratio is at most 95 mol %, then the miscibility with cellulose ester is excellent, therefore preventing the ingredient from bleeding out in the process of forming the cellulose ester film and in stretching the film under heat.

The aromatic dicarboxylic acid usable in producing the polycondensate ester-base hydrophobizing agent for use in the invention includes, for example, phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid, etc. Preferred are phthalic acid, terephthalic acid and 2,6-naphthalenedicarboxylic acid; more preferred are phthalic acid and terephthalic acid; and even more preferred is terephthalic acid.

In the polycondensate ester, the aromatic dicarboxylic acid used as a mixture thereof forms the aromatic dicarboxylic acid residue therein.

Concretely, the aromatic dicarboxylic acid residue preferably contains at least one of a phthalic acid residue, a terephthalic acid residue and an isophthalic acid residue, more preferably at least one of a phthalic acid residue and a terephthalic acid residue, even more preferably a terephthalic acid residue.

Specifically, when terephthalic acid is used as the aromatic dicarboxylic acid in the form a mixture thereof in forming the polycondensate ester, then it is excellent in miscibility with cellulose acylate therefore providing a cellulose acylate film hardly causing bleeding out in film formation of the cellulose acylate film and in stretching the film under heat. One or more different types of aromatic dicarboxylic acids may be used here; and in case where two or more are used, preferred is a combination of phthalic acid and terephthalic acid.

Combined use of two aromatic dicarboxylic acids of phthalic acid and terephthalic acid is preferred since the polycondensate ester is soft at room temperature and is easy to handle.

The terephthalic acid residue content in the dicarboxylic acid residue in the polycondensate ester is preferably from 40 mol % to 100 mol %.

When the terephthalic acid residue content is at least 40 mol %, then a cellulose acylate film having sufficient optical anisotropy can be obtained.

An aliphatic dicarboxylic acid residue is contained in the polycondensate ester obtained from a diol and a dicarboxylic acid containing an aliphatic dicarboxylic acid.

The aliphatic dicarboxylic acid preferred for use in forming the polycondensate ester-base hydrophobizing agent for use in the invention includes, for example, oxalic acid, malonic acid, succinic acid, maleic acid, fumaric acid, glutaric acid, adipic acid, pimelic acid, suberic acid, azelaic acid, sebacic acid, dodecane-dicarboxylic acid, 1,4-cyclohexane-dicarboxylic acid, etc.

In the polycondensate ester, the aliphatic dicarboxylic acid used as a mixture thereof forms the aliphatic dicarboxylic acid residue therein.

The mean carbon number of the aliphatic dicarboxylic acid residue is preferably from 5.5 to 10.0, more preferably from 5.5 to 8.0, even more preferably from 5.5 to 7.0. When the mean carbon number of the aliphatic dicarboxylic acid residue is at most 10.0, then the heat loss of the compound can be reduced, and surface failures of the film, which are considered to be because of the process contamination owing to bleeding out in drying the cellulose acylate web, can be reduced. When the mean carbon number of the aliphatic dicarboxylic acid residue is at least 5.5, then the polycondensate ester is excellent in miscibility and is therefore favorable as forming few deposits.

Concretely, the aliphatic dicarboxylic acid residue preferably contains a succinic acid residue; and in case where two or more different types of dicarboxylic acids are used, the polycondensate ester preferably contains a succinic acid residue and an adipic acid residue.

Specifically, one or more different types of aliphatic dicarboxylic acids may be used as a mixture thereof in forming the polycondensate ester; and in case where two or more are used, preferred is a combination of succinic acid and adipic acid. In case where one aliphatic dicarboxylic acid is used in forming the polycondensate ester, preferred is use of succinic acid. This is preferred since the mean carbon number of the aliphatic dicarboxylic acid residue can be controlled to a desired value and the polycondensate ester is well miscible with cellulose acylate.

In mixing the ingredients in forming the polycondensate ester in the invention, preferably, two or three different types of dicarboxylic acids are used. In case where two dicarboxylic acids are used, preferred is use of one aliphatic dicarboxylic acid and one aromatic dicarboxylic acid; and in case where three dicarboxylic acids are used, there may be mentioned use of one aliphatic dicarboxylic acid and two aromatic dicarboxylic acids, or use of two aliphatic dicarboxylic acids and one aromatic dicarboxylic acid. This makes it easy to control the mean carbon number of the dicarboxylic acid residue and to control the content of the aromatic dicarboxylic acid residue within a preferred range, therefore enhancing the durability of polarizer.

A diol residue is contained in the polycondensate ester obtained from a diol and a dicarboxylic acid.

In this description, the diol residue of a diol, HO—R—OH is —O—R—O—.

The diol to form the polycondensate ester includes an aromatic diol and an aliphatic diol. Preferably, an aliphatic diol is used in forming the polycondensate ester for use as the hydrophobizing agent in the invention.

Preferably, the polycondensate ester contains an aliphatic diol residue having a mean carbon number of from 2.5 to 7.0. More preferably, the ester contains an aliphatic diol residue having a mean carbon number of from 2.5 to 4.0. When the mean carbon number of the aliphatic diol residue is at most 7.0, then the miscibility of the ester with cellulose acylate is good and therefore bleeding out hardly occurs; and in addition, the heat loss of the compound hardly increases, and surface failures of the film, which are considered to be because of the process contamination in drying the cellulose acylate web, would hardly occur. When the mean carbon number of the aliphatic diol residue at least 2.5, then the ester production would be easy.

As preferred examples of the aliphatic diol for use in forming the polycondensate ester-base hydrophobizing agent for use in the invention, there may be mentioned alkyl diols and alicyclic diols, including, for example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, cyclohexanedimethanol, etc. Preferably, these are used singly or as a mixture of two or more of them along with ethylene glycol.

As the aliphatic diol, more preferred is at least one of ethylene glycol, 1,2-propanediol and 1,3-propanediol, and even more preferred is at least one of ethylene glycol and 1,2-propanediol. In case where two such aliphatic diols are used in producing the polycondensate ester, preferred is a combination of ethylene glycol and 1,2-propanediol. Use of 1,2-propanediol or 1,3-propanediol prevents crystallization of the polycondensate ester.

In the polycondensate ester, a diol residue is formed from the diol used as a mixture thereof.

Preferably, in the polycondensate ester, the diol residue contains at least one of an ethylene glycol residue, a 1,2-propanediol residue and a 1,3-propanediol residue, and more preferably contains an ethylene glycol residue or a 1,2-propanediol residue.

Of the aliphatic diol residue contained in the polycondensate ester, preferably, the ethylene glycol residue accounts for from 10 mol % to 100 mol %, more preferably from 20 mol % to 100 mol %.

The polycondensate ester is not end-capped and is in the form of a diol or a carboxylic acid; however, a monocarboxylic acid or a monoalcohol may be reacted with the ester for end capping.

The monocarboxylic acid for use for end capping is preferably acetic acid, propionic acid, butanoic acid, benzoic acid or the like. The monoalcohol for use for end capping is preferably methanol, ethanol, propanol, isopropanol, butanol, isobutanol or the like, most preferably methanol. When the carbon number of the monocarboxylic acid for use for end-capping the polycondensate ester is at most 7, then the heat loss of the compound does not increase and film surface failures do not occur.

More preferably, the polycondensate ester is not end-capped and a diol residue remains as such at the end of the ester, but more preferably, the ester is end-capped with acetic acid, propionic acid or benzoic acid.

Anyhow, the polycondensate ester for use in the invention may be or may not be end-capped on both ends thereof.

In case where both ends thereof are not capped, the polycondensate ester is preferably a polyester polyol.

One embodiment of the polycondensate ester is a polycondensate ester where the carbon number of the aliphatic diol residue is from 2.5 to 8.0 and both ends of the ester are not capped.

In case where both ends of the polycondensate ester are capped, preferably, the ester is reacted with a monocarboxylic acid for end-capping. In this case, both ends of the polycondensate ester each are a monocarboxylic acid residue. In this description, the monocarboxylic acid residue of a monocarboxylic acid, R—COOH is R—CO—. In case where the polycondensate ester is capped with a monocarboxylic acid at both ends thereof, preferably, the monocarboxylic acid is an aliphatic monocarboxylic acid; and more preferably, the monocarboxylic acid residue is an aliphatic monocarboxylic acid residue having at most 22 carbon atoms, even more preferably an aliphatic monocarboxylic acid having at most 3 carbon atoms. Also preferred is an aliphatic monocarboxylic acid residue having at least 2 carbon atoms, and even more preferred is an aliphatic monocarboxylic acid residue having 2 carbon atoms.

One embodiment of the polycondensate ester is a polycondensate ester where the carbon number of the aliphatic diol residue is from more than 2.5 to 7.0 and both ends of the ester are capped with a monocarboxylic acid residue.

When the carbon number of the monocarboxylic acid residue that caps both ends of the polycondensate ester is at most 3, then the polycondensate ester is poorly volatile and the weight loss in heating thereof does not increase, and therefore the troubles of process contamination and film surface failures could be reduced.

Specifically, aliphatic monocarboxylic acids are preferred for end-capping. More preferred are aliphatic monocarboxylic acids having from 2 to 22 carbon atoms, even more preferred are aliphatic monocarboxylic acids having from 2 to 3 carbon atoms, and especially preferred are aliphatic monocarboxylic acid residues having 2 carbon atoms.

For example, preferred are acetic acid, propionic acid, butanoic acid, benzoic acid and their derivatives, more preferred are acetic acid and propionic acid, and most preferred is acetic acid.

Two or more different types of monocarboxylic acids may be used here for end-capping.

Preferably, the polycondensate ester is end-capped with acetic acid or propionic acid at both ends thereof, and most preferably, both ends of the polycondensate ester each are an acetyl ester residue (also referred to as acetyl residue) through end-capping with acetic acid.

In case where both ends thereof are end-capped, the polycondensate ester could hardly be solid at room temperature and its handlability is good, and in addition, a cellulose acylate film excellent in moisture stability and polarizer durability can be obtained.

Specific examples J-1 to J-38 of the polycondensate ester are shown in Table 5, to which, however, the invention is not limited.

described in JP-A05-155809, 05-155810, 5-197073, 2006-259494, 07-330670, 2006-342227 and 2007-003679 are also usable here.

(Carbohydrate Derivative-Base Hydrophobizing Agent)

As the hydrophobizing agent, also preferred are derivatives of monoses carbohydrates including from 2 to 10 monose units (hereinafter referred to as a carbohydrate derivative-base hydrophobizing agent).

The monose or the polyose preferably constituting the carbohydrate derivative-base hydrophobizing agent is characterized in that the substitutable group (for example, hydroxyl group, carboxyl group, amino group, mercapto group, etc.) in the molecule is substituted. Examples of the

TABLE 5

| | Dicarboxylic Acid | | | Diol | | | |
|---|---|---|---|---|---|---|---|
| | Aromatic Dicarboxylic Acid | Aliphatic Dicarboxylic Acid | Dicarboxylic Acid Molar Ratio | Diol 1 | Diol 2 | Diol Ratio (mol %) | End |
| J-1 | TPA | SA | 45/55 | ethanediol | propanediol | 45/55 | acetyl ester group |
| J-2 | TPA | SA | 50/50 | ethanediol | propanediol | 45/55 | acetyl ester group |
| J-3 | TPA | SA | 55/45 | ethanediol | propanediol | 45/55 | acetyl ester group |
| J-4 | TPA | SA | 65/35 | ethanediol | propanediol | 45/55 | acetyl ester group |
| J-5 | TPA | SA | 55/45 | ethanediol | propanediol | 25/75 | acetyl ester group |
| J-6 | TPA | SA | 55/45 | ethanediol | propanediol | 10/90 | acetyl ester group |
| J-7 | 2,6-NPA | SA | 50/50 | ethanediol | propanediol | 45/55 | acetyl ester group |
| J-8 | 2,6-NPA | SA | 50/50 | ethanediol | propanediol | 45/55 | acetyl ester group |
| J-9 | TPA/PA | SA | 45/5/50 | ethanediol | propanediol | 45/55 | acetyl ester group |
| J-10 | TPA/PA | SA | 40/10/50 | ethanediol | propanediol | 45/55 | acetyl ester group |
| J-11 | TPA | SA/AA | 50/30/20 | ethanediol | propanediol | 45/55 | acetyl ester group |
| J-12 | TPA | SA/AA | 50/20/30 | ethanediol | propanediol | 45/55 | acetyl ester group |
| J-13 | TPA | SA | 50/50 | ethanediol | propanediol | 25/75 | acetyl ester group |
| J-14 | TPA | SA | 55/45 | ethanediol | propanediol | 45/55 | acetyl ester group |
| J-15 | TPA | SA | 55/45 | ethanediol | cyclohexanedimethanol | 45/55 | acetyl ester group |
| J-16 | TPA | SA | 45/55 | ethanediol | propanediol | 45/55 | hydroxyethyl group |
| J-17 | TPA | SA | 50/50 | ethanediol | propanediol | 45/55 | hydroxyethyl group |
| J-18 | TPA | SA | 55/45 | ethanediol | propanediol | 45/55 | hydroxyethyl group |
| J-19 | TPA | SA | 65/35 | ethanediol | propanediol | 45/55 | hydroxyethyl group |
| J-20 | TPA | SA | 55/45 | ethanediol | propanediol | 25/75 | hydroxyethyl group |
| J-21 | TPA | SA | 55/45 | ethanediol | propanediol | 10/90 | hydroxyethyl group |
| J-22 | 2,6-NPA | SA | 50/50 | ethanediol | propanediol | 25/75 | hydroxyethyl group |
| J-23 | 2,6-NPA | SA | 50/50 | ethanediol | propanediol | 25/75 | hydroxyethyl group |
| J-24 | 2,6-NPA | SA | 45/5/50 | ethanediol | propanediol | 25/75 | hydroxyethyl group |
| J-25 | 2,6-NPA | SA | 40/10/50 | ethanediol | propanediol | 25/75 | hydroxyethyl group |
| J-26 | TPA | SA/AA | 50/30/20 | ethanediol | propanediol | 25/75 | hydroxyethyl group |
| J-27 | TPA | SA/AA | 50/20/30 | ethanediol | propanediol | 25/75 | hydroxyethyl group |
| J-28 | TPA | SA | 50/50 | ethanediol | propanediol | 25/75 | hydroxyethyl group |
| J-29 | TPA | SA | 55/45 | ethanediol | propanediol | 25/75 | hydroxyethyl group |
| J-30 | TPA | SA | 55/45 | ethanediol | cyclohexanedimethanol | 25/75 | hydroxyethyl group |
| J-31 | TPA | SA | 55/45 | ethanediol | propanediol | 45/55 | propionyl ester group |
| J-32 | TPA | — | 100/0 | ethanediol | propanediol | 50/50 | hydroxyl group |
| J-33 | TPA | — | 100/0 | ethanediol | propanediol | 40/60 | acetyl ester group |
| J-34 | TPA | SA | 50/50 | ethanediol | propanediol | 45/55 | benzoyl ester group |
| J-35 | TPA | SA | 55/45 | ethanediol | propanediol | 50/50 | hydroxyl group |
| J-36 | TPA | SA | 55/45 | ethanediol | propanediol | 50/50 | acetyl ester group |
| J-37 | TPA | SA | 80/20 | ethanediol | propanediol | 50/50 | hydroxyl group |
| J-38 | TPA | SA | 80/20 | ethanediol | propanediol | 50/50 | acetyl ester group |

Abbreviations in the above Table 5 indicate the following compound:
PA: phthalic acid,
TPA: terephthalic acid,
AA: adipic acid,
SA: succinic acid,
2,6-NPA: 2,6-naphthalenedicarboxylic acid.

The polycondensate ester can be produced with ease according to any of a thermal fusion condensation method of polyesterification or interesterification of a diol with a dicarboxylic acid in a known manner, or a interfacial condensation method of an acid chloride of such an acid with a glycol. The polycondensate ester is described in detail in Koichi Murai's "Plasticizer, Its Theory and Application" (by Miyuki Publishing, 1st edition published on Mar. 1, 1973). The materials structure formed by substitution include an alkyl group, an aryl group, an acyl group, etc. There are mentioned an ether structure formed through substitution of hydroxyl group with an alkyl or aryl group, an ester structure formed through substitution thereof with an acyl group, and an amide structure and an imide structure formed through substitution thereof with an amino group.

Examples of the monose or the carbohydrate containing from 2 to 10 monose units include, for example, erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol, sorbitol, etc.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, sorbitol; more preferred are arabinose, xylose, glucose, fructose, mannose, galactose, maltose, cellobiose, sucrose, β-cyclodextrin, γ-cyclodextrin; and even more preferred are xylose, glucose, fructose, mannose, galactose, maltose, cellobiose, sucrose, xylitol, sorbitol.

Examples of the substituent in the carbohydrate derivative-base hydrophobizing agent include an alkyl group (preferably an alkyl group having from 1 to 22 carbon atoms, more preferably from 1 to 12 carbon atoms, even more preferably from 1 to 8 carbon atoms, for example, a methyl group, an ethyl group, a propyl group, a hydroxyethyl group, a hydroxypropyl group, a 2-cyanoethyl group, a benzyl group, etc.), an aryl group (preferably an aryl group having from 6 to 24 carbon atoms, more preferably from 6 to 18 carbon atoms, even more preferably from 6 to 12 carbon atoms, for example, a phenyl group, a naphthyl group), an acyl group (preferably an acyl group having from 1 to 22 carbon atoms, more preferably from 2 to 12 carbon atoms, even more preferably from 2 to 8 carbon atoms, for example, an acetyl group, a propionyl group, a butyryl group, a pentanoyl group, a hexanoyl group, an octanoyl group, a benzoyl group, a toluoyl group, a phthalyl group, a naphthal group, etc.). Preferred structures substituted with an amino group include an amide structure (preferably an amide having from 1 to 22 carbon atoms, more preferably from 2 to 12 carbon atoms, even more preferably from 2 to 8 carbon atoms, for example, formamide, acetamide, etc.), an imide structure (preferably an imide having from 4 to 22 carbon atoms, more preferably from 4 to 12 carbon atoms, even more preferably from 4 to 8 carbon atoms, for example, succinimide, phthalimide, etc.).

Of those, more preferred are an alkyl group, an aryl group and an acyl group, and even more preferred is an acyl group.

Preferred examples of the carbohydrate derivative-base hydrophobizing agent are mentioned below. However, the carbohydrate derivative-base hydrophobizing agent usable in the invention is not limited to these.

Preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate, etc. More preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate, etc. Even more preferred are maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate, etc.

Preferably, the carbohydrate derivative-base hydrophobizing agent has a pyranose structure or a furanose structure, more preferably a pyranose structure.

As the carbohydrate derivative for use in the invention, especially preferred are the following compounds. However, the carbohydrate derivative usable in the invention is not limited to these. In the following structures, R each independently represents an arbitrary substituents, and multiple R's may be the same or different.

[Chemical Formula 71]

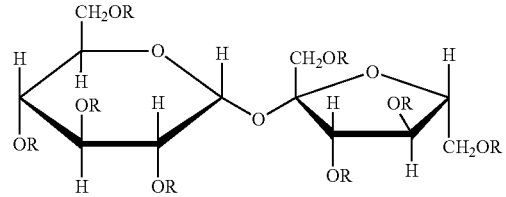

TABLE 6

| Compound | Substituent 1 | | Substituent 2 | | ClogP | Molecular Weight |
| | type | degree of substitution | type | degree of substitution | | |
| --- | --- | --- | --- | --- | --- | --- |
| K-101 | acetyl | 7 | benzyl | 1 | 2.9 | 727 |
| K-102 | acetyl | 6 | benzyl | 2 | 4.4 | 775 |
| K-103 | acetyl | 7 | benzoyl | 1 | 3.0 | 741 |

TABLE 6-continued

| Compound | Substituent 1 type | Substituent 1 degree of substitution | Substituent 2 type | Substituent 2 degree of substitution | ClogP | Molecular Weight |
|---|---|---|---|---|---|---|
| K-104 | acetyl | 6 | benzoyl | 2 | 4.5 | 802 |
| K-105 | benzyl | 2 | none | 0 | 0.6 | 523 |
| K-106 | benzyl | 3 | none | 0 | 2.5 | 613 |
| K-107 | benzyl | 4 | none | 0 | 4.3 | 702 |
| K-108 | acetyl | 7 | phenylacetyl | 1 | 2.7 | 771 |
| K-109 | acetyl | 6 | phenylacetyl | 2 | 4.4 | 847 |

[Chemical Formula 72]

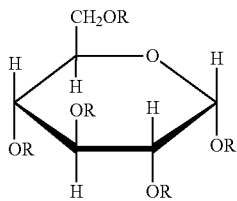

TABLE 7

| Compound | Substituent 1 type | Substituent 1 degree of substitution | Substituent 2 type | Substituent 2 degree of substitution | ClogP | Molecular Weight |
|---|---|---|---|---|---|---|
| K-201 | acetyl | 4 | benzoyl | 1 | 2.2 | 468 |
| K-202 | acetyl | 3 | benzoyl | 2 | 3.9 | 514 |
| K-203 | acetyl | 2 | benzoyl | 3 | 5.4 | 577 |
| K-204 | acetyl | 4 | benzyl | 1 | 2.1 | 454 |
| K-205 | acetyl | 3 | benzyl | 2 | 3.8 | 489 |
| K-206 | acetyl | 2 | benzyl | 3 | 5.4 | 535 |
| K-207 | acetyl | 4 | phenylacetyl | 1 | 2.2 | 466 |
| K-208 | acetyl | 3 | phenylacetyl | 2 | 3.8 | 543 |
| K-209 | acetyl | 2 | phenylacetyl | 3 | 5.5 | 619 |
| K-210 | phenylacetyl | 1 | none | 0 | −0.3 | 298 |
| K-211 | phenylacetyl | 2 | none | 0 | 2.0 | 416 |
| K-212 | phenylacetyl | 3 | none | 0 | 3.8 | 535 |
| K-213 | phenylacetyl | 4 | none | 0 | 6.2 | 654 |
| K-214 | acetyl | 1 | benzoyl | 4 | 6.36 | 639 |
| K-215 | acetyl | 0 | benzoyl | 5 | 8.26 | 701 |

[Chemical Formula 73]

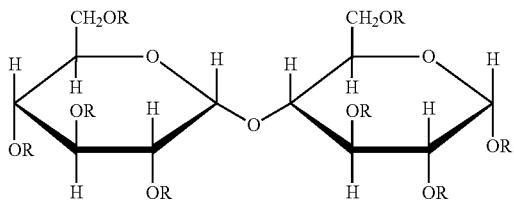

TABLE 8

| Compound | Substituent 1 type | Substituent 1 degree of substitution | Substituent 2 type | Substituent 2 degree of substitution | ClogP | Molecular Weight |
|---|---|---|---|---|---|---|
| K-301 | acetyl | 6 | benzoyl | 2 | 4.5 | 803 |
| K-302 | acetyl | 6 | benzyl | 2 | 4.2 | 775 |
| K-303 | acetyl | 6 | phenylacetyl | 2 | 4.3 | 831 |

TABLE 8-continued

| Compound | Substituent 1 type | Substituent 1 degree of substitution | Substituent 2 type | Substituent 2 degree of substitution | ClogP | Molecular Weight |
|---|---|---|---|---|---|---|
| K-304 | benzoyl | 2 | none | 0 | 0.2 | 551 |
| K-305 | benzyl | 2 | none | 0 | 0.0 | 522 |
| K-306 | phenylacetyl | 2 | none | 0 | 0.0 | 579 |

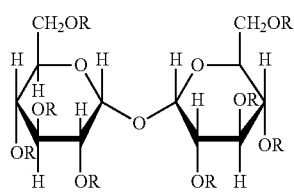

[Chemical Formula 74]

TABLE 9

| Compound | Substituent 1 type | Substituent 1 degree of substitution | Substituent 2 type | Substituent 2 degree of substitution | ClogP | Molecular Weight |
|---|---|---|---|---|---|---|
| K-401 | acetyl | 6 | benzoyl | 2 | 4.5 | 803 |
| K-402 | acetyl | 6 | benzyl | 2 | 4.2 | 775 |
| K-403 | acetyl | 6 | phenylacetyl | 2 | 4.3 | 831 |
| K-404 | benzoyl | 2 | none | 0 | 0.7 | 551 |
| K-405 | benzyl | 2 | none | 0 | 0.4 | 523 |
| K-406 | phenyl ester | 2 | none | 0 | 0.5 | 579 |

(Getting Method)

Regarding the getting method for the carbohydrate derivatives, commercial products thereof are available from Tokyo Chemical, Aldrich, etc.; or commercial carbohydrates may be processed according to known ester derivative production methods (for example, according to the method described in JP-A 8-245678) to give the intended carbohydrate derivatives.

Regarding the getting method for the carbohydrate derivative-base hydrophobizing agent, commercial products thereof are available from Tokyo Chemical, Aldrich, etc.; or commercial carbohydrates may be processed according to known ester derivative production methods (for example, according to the method described in JP-A 8-245678) to give the intended carbohydrate derivative-base hydrophobizing agents.

The amount of the hydrophobizing agent to be added is preferably from 1 to 20% by mas of cellulose acylate. When the amount is at least 1% by mass, then the film could be readily effective for polarizer durability enhancement; and when at most 20% by mass, then the additive could hardly bleed out. More preferably, the amount to be added is from 2 to 15% by mass, even more preferably from 5 to 15% by mass.

The timing when the hydrophobizing agent is added to the cellulose acylate film is not specifically defined, and the agent may be added thereto at any time in film formation. For example, the agent may be added at the time when cellulose acylate is produced, or may be mixed with cellulose acylate in preparing the dope for film formation.

<Cellulose Acylate>

The cellulose acylate for use in the invention is described in detail hereinunder.

The degree of substitution in cellulose acylate means the ratio of acylation of three hydroxyl groups existing in the constitutive unit of cellulose (((β)-1,4-glycoside-bonding glucose). The degree of substitution (degree of acylation) may be computed by determining the bonding fatty acid amount per the constitutive unit mass of cellulose. In the invention, the degree of substitution of cellulose may be computed as follows: The substituted cellulose is dissolved in a solvent such as deuterium-substituted dimethyl sulfoxide or the like, and analyzed for the $^{13}$C-NMR spectrum thereof. The degree of substitution may be computed from the peak intensity ratio of the carbonyl carbon in the acyl group. The remaining hydroxyl group in the cellulose acylate is substituted with any other acyl group than the acyl group that the cellulose acylate itself has, and then determined through $^{13}$C-NMR analysis. The details of the measurement method are described by Tezuka et al. (Carbohydrate, Res., 273 (1995) 83-91).

Preferably, the cellulose acylate for use in the invention has a degree of acylation of from 1.50 to 2.98, more preferably from 2.00 to 2.97.

The acyl group in the cellulose acylate for use in the invention is preferably an acetyl group, a propionyl group or a butyryl group.

A mixed fatty acid ester having two or more different acyl groups is also preferably used for the cellulose acylate in the invention. In this case, the acyl groups are preferably an acetyl group and an acyl group having 3 or 4 carbon atoms. Also preferably, the degree of substitution with acetyl group is less than 2.5, more preferably less than 1.9.

In the invention, two types of cellulose acylates that differ in the substituent and/or the degree of substitution therein may be used as combined or mixed; or films composed of multiple layers of different cellulose acylates may be formed according to a co-casting method or the like to be mentioned below.

The mixed acid ester having a fatty acid acyl group and a substituted or unsubstituted aromatic acyl group, which is described in JP-A 2008-20896, [0023] to [0038], is also preferred for use in the invention.

Preferably, the cellulose acylate for use in the invention has a mass-average degree of polymerization of from 250 to 800, more preferably a mass-average degree of polymerization of from 300 to 600. The cellulose acylate for use in the invention preferably has a number-average molecular weight of from 70000 to 230000, more preferably a number-average molecular weight of from 75000 to 230000, most preferably a number-average molecular weight of from 78000 to 120000.

The cellulose acylate for use in the invention may be produced using an acid anhydride or an acid chloride as the acylating agent. In case where the acylating agent is an acid anhydride, an organic acid (for example, acetic acid) or methylene chloride is used as the reaction solvent. As the catalyst, a protic catalyst such as sulfuric acid may be used. In case where the acylating agent is an acid chloride, a basic compound may be used as the catalyst. A most popular production method on an industrial scale comprises esterifying cellulose with a mixed organic acid component containing an organic acid (acetic acid, propionic acid, butyric acid) or an acid anhydride thereof (acetic anhydride, propionic anhydride, butyric anhydride) corresponding to an acetyl group and other acyl group, thereby producing a cellulose ester.

In the above method, cellulose such as cotton linter or wood pulp is, in many cases, activated with an organic acid such as acetic acid and then esterified with a mixed liquid of the above-mentioned organic acid component in the presence of a sulfuric acid catalyst. The organic acid anhydride component is used generally in an excessive amount over the amount of the hydroxyl group existing in cellulose. In the esterification treatment, hydrolysis reaction (depolymerization reaction) of the cellulose main chain (($\beta$)-1,4-glycoside bond) occurs along with the esterification reaction. When the hydrolysis reaction of the main chain goes on, then the degree of polymerization of the cellulose ester lowers, and the physical properties of the cellulose ester film to be produced worsen. Accordingly, it is desirable that the reaction condition such as the reaction temperature is determined in consideration of the degree of polymerization and the molecular weight of the cellulose ester to be obtained.

<Production Method for Cellulose Acylate Film>

The cellulose acylate film of the invention can be produced according to a solvent casting method. In the solvent casting method, a solution (dope) prepared by dissolving a cellulose acylate in an organic solvent is used for film formation.

Preferably, the organic solvent contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms.

The ethers, the ketones and the esters may have a cyclic structure. A compound having at least any two functional groups (—O—, —CO— and —COO—) of the ethers, the ketones and the esters may also be used as the organic solvent. The organic solvent may have any other functional group such as an alcoholic hydroxyl group. In the organic solvent having at least two different types of functional groups, preferably, the number of the constitutive carbon atoms falls within the preferred range of the number of the constitutive carbon atoms of the solvent having any of the functional groups.

Examples of the ethers having from 3 to 12 carbon atoms include diisopropyl ether, dimethoxymethane, dimethoxyethane, 1,4-dioxane, 1,3-dioxolane, tetrahydrofuran, anisole and phenetol.

Examples of the ketones having from 3 to 12 carbon atoms include acetone, methyl ethyl ketone, diethyl ketone, diisopropyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvent having at least two types of functional groups include 2-ethoxyethyl acetate, 2-methoxyethanol and 2-butoxyethanol.

Preferably, the number of carbon atoms constituting the halogenohydrocarbon having from 1 to 6 carbon atoms is 1 or 2, most preferably 1. Preferably, the halogen of the halogenohydrocarbon is chlorine. The proportion of the hydrogen atoms substituted with halogen in the halogenohydrocarbon is preferably from 25 to 75 mol %, more preferably from 30 to 70 mol %, even more preferably from 35 to 65 mol %, most preferably from 40 to 60 mol %. Methylene chloride is a typical halogenohydrocarbon.

Two or more different types of organic solvents may be mixed for use herein.

The cellulose acylate solution (dope) may be prepared according to an ordinary method of processing at a temperature not lower than 0° C. (ordinary temperature or high temperature). The cellulose acylate solution may be prepared according to a method and an apparatus for dope preparation in an ordinary solvent casting method. In the ordinary method, preferably, a halogenohydrocarbon (especially methylene chloride) is used as the organic solvent.

The amount of the cellulose acylate in the cellulose acylate solution is so controlled that the cellulose acylate could be contained in the solution obtained in an amount of from 10 to 40% by mass. More preferably, the amount of the cellulose acylate is from 10 to 30% by mass. Any additive to be mentioned below may be added to the organic solvent (main solvent).

The cellulose acylate solution may be prepared by stirring a cellulose acylate and an organic solvent at an ordinary temperature (0 to 40° C.). A high-concentration solution may be stirred under pressure and under heat. Concretely, a cellulose acylate and an organic solvent are put into a pressure container and sealed up, and heated with stirring under pressure and under heat at a temperature not lower than the boiling point of the solvent under ordinary pressure at which, however, the solvent does not boil. The heating temperature is generally 40° C. or higher, preferably from 60 to 200° C., more preferably from 80 to 110° C.

The constitutive ingredients may be put into a chamber after previously roughly mixed. They may be put into a chamber sequentially. The chamber must be so designed that the contents could be stirred therein. An inert gas such as nitrogen gas or the like may be injected into the chamber for pressurization. If desired, the increase in the vapor pressure of the solvent by heating may be utilized. As the case may be, the chamber is sealed up and then the constitutive ingredients may be added thereto under pressure.

In case where the chamber is heated, preferably, an external heat source is used. For example, a jacket-type heating unit may be used. As the case may be, a plate pipe heater may be provided outside the chamber, in which a liquid may be circulated to heat the entire chamber.

Preferably, a stirring blade is provided inside the chamber for stirring. Preferably, the stirring blade has a length reaching around the wall of the chamber. Preferably, the end of the stirring blade is provided with a scraper for renewing the liquid film on the wall of the chamber.

The chamber may be provided with indicators such as pressure gauge, thermometer, etc. The ingredients are dissolved in a solvent in the chamber. The prepared dope may be taken out of the chamber after cooled, or after taken out, it may be cooled with a heat exchanger or the like.

The cellulose acylate solution may also be prepared according to a cooling dissolution method. The details of the cooling dissolution method are described in JP-A 2007-86748, [0115] to [0122], which may be herein incorporated by reference.

In the cooling dissolution method, a cellulose acylate can be dissolved even in an organic solvent in which, however, the cellulose acylate would be difficult to dissolve in an ordinary dissolution method. Another advantage of the cooling dissolution method is that, even in a solvent capable of dissolving a cellulose acylate in an ordinary dissolution method, a uniform solution of the cellulose acylate can be rapidly prepared according to the cooling dissolution method.

In the cooling dissolution method, first, a cellulose acylate is gradually added to an organic solvent at room temperature with stirring. Preferably, the amount of the cellulose acylate is so controlled that the cellulose acylate could be contained in an amount of from 10 to 40% by mass of the mixture. More preferably, the amount of the cellulose acylate is from 10 to 30% by mass. Further, any desired additive to be mentioned below may be previously added to the mixture.

Next, the mixture is cooled to −100 to −10° C. (preferably from −80 to −10° C., more preferably from −50 to −20° C., most preferably from −50 to −30° C.). Cooling the mixture may be attained, for example, in a dry ice/methanol bath (−75° C.) or in a cooled diethylene glycol solution (−30 to −20° C.). As cooled, the mixture of cellulose acylate and organic solvent is solidified.

Preferably, the cooling speed is not lower than 4° C./min, more preferably not lower than 8° C./min, most preferably not lower than 12° C./min. The cooling speed is preferably higher, however, the theoretical upper limit thereof is 10000° C./min, the technical upper limit thereof is 1000° C./min, and the practicable upper limit thereof is 100° C./min. The cooling speed is a value computed by dividing the difference between the temperature at which the cooling is started and the final cooling temperature by the time taken from the start of cooling to the final cooling temperature.

Further, when the cooled mixture is heated at 0 to 200° C. (preferably at 0 to 150° C., more preferably at 0 to 120° C., most preferably at 0 to 50° C.), then the cellulose acylate dissolves in the organic solvent. For heating, the system may be left at room temperature, or may be heated in a warm bath.

Preferably, the heating speed is not lower than 4° C./min, more preferably not lower than 8° C./min, most preferably not lower than 12° C./min. The heating speed is preferably higher, however, theoretical upper limit thereof is 10000° C./min, the technical upper limit thereof is 1000° C./min, and the practicable upper limit thereof is 100° C./min. The heating speed is a value computed by dividing the difference between the temperature at which the heating is started and the final heating temperature by the time taken from the start of heating to the final heating temperature.

As in the above, a uniform cellulose acylate solution is obtained. In case where the dissolution is insufficient, the cooling and/or heating operation may be repeated. The matter as to whether or not the dissolution is satisfactory can be determined by merely visually observing the outward appearance of the solution.

In the cooling dissolution method, for preventing the solution from being contaminated with water owing to dew condensation in cooling, preferably used is a closed chamber. During the cooling/heating operation, the system may be pressurized in cooling and may be depressurized in heating, thereby shortening the dissolution time. For pressurization and depressurization, preferably used is a pressure chamber.

When a 20 mas. % solution of cellulose acetate (having a degree of acetylation of 60.9%, and a viscosity-average degree of polymerization of 299) prepared by dissolving the cellulose acetate in methyl acetate according to a cooling dissolution method is analyzed through differential scanning calorimetry (DSC), the solution has a pseudo-phase transition point between a sol state and a gel state at around 33° C., and at a temperature lower than the point, the solution is in a uniform gel state. Accordingly, it is desirable that the solution is kept at a temperature not lower than the pseudo-phase transition temperature thereof, preferably at a temperature of the gel phase transition temperature thereof plus 10° C. or so. However, the pseudo-phase transition point varies depending on the degree of acetylation and the viscosity-average degree of polymerization of the cellulose acetate, on the solution concentration and on the organic solvent used.

A cellulose acylate film is produced from the thus-prepared cellulose acylate solution (dope) according to a solvent casting method. Preferably, a retardation enhancer is added to the dope. The dope is cast onto a drum or a band, on which the solvent is evaporated away to form a film. Before cast, the dope concentration is preferably so controlled that the solid content of the dope could be from 18 to 35%. Preferably, the surface of the drum or the band is mirror-finished. Preferably, the dope is cast onto the drum or the band having a surface temperature of not higher than 10° C.

The drying method in the solvent casting method is described in U.S. Pat. Nos. 2,336,310, 2,367,603, 2,492,078, 2,492,977, 2,492,978, 2,607,704, 2,739,069 and 2,739,070; British Patent 640731 and 736892; JP-B 45-4554 and 49-5614; JP-A 60-176834, 60-203430 and 62-115035. The film on the band or the drum may be dried by applying thereto an air flow or an inert gas flow such as nitrogen or the like.

The formed film may be peeled from the drum or the band, and then dried with high-temperature air of which the temperature is successively varied from 100° C. to 160° C. to thereby remove the residual solvent through vaporization. The method is described in JP-B 5-17844. According to the method, the time from casting to peeling may be shortened. To carry out the method, the dope must be gelled at the surface temperature of the casting drum or band.

Using the prepared cellulose acylate solution (dope), two or more layers may be cast to form a film. In this case, preferably, the cellulose acylate film is formed according to a solvent casting method. The dope is cast onto a drum or a band, and the solvent is evaporated away to form a film thereon.

Before cast, the dope concentration is preferably so controlled that the solid content of the dope could be from 10 to 40% by mass. Preferably, the surface of the drum or the band is mirror-finished.

In case where two or more multiple cellulose acylate solutions are cast, it is possible to cast such multiple cellulose acylate solutions. Via multiple casting mouths arranged at intervals in the support running direction, the cellulose acylate-containing solution may be cast and laminated to form a film. For this, for example, employable are the methods described in JP-A 61-158414, 1-122419 and 11-198285. The cellulose acylate solution may be cast via two casting mouths for film formation. For this, for example, employable are the methods described in JP-B 60-27562, JP-A 61-64724, 61-947245, 61-104813, 61-158413 and 6-134933. Also employable here is a casting method for cellulose acylate film, comprising enveloping a flow of a high-viscosity cellulose acylate solution with a low-viscosity cellulose acylate solution so as to simultaneously extrude out the high/low-viscosity cellulose acylate solutions, as in JP-A 56-162617.

Another method is employable here, in which two casting mouths are used for film formation, a film formed on a support through the first casting mouth is peeled, and another film is cast onto the support-facing side of the previously formed film by second casting thereon. For example, there may be mentioned the method described in JP-B 44-20235.

The same cellulose acylate solution may be cast, or two or more different types of cellulose acylate solutions may be used. In order to make the multiple cellulose acylate layers have various functions, cellulose acylate solutions corresponding to the functions may be extruded out via the respective casting mouths. Further in the invention, the cellulose acylate solution may be cast simultaneously with other functional layers (for example, adhesive layer, dye layer, antistatic layer, antihalation layer, UV absorbent layer, polarizing layer, etc.).

In use of already-existing single-layer liquids, a high-concentration and high-viscosity cellulose acylate solution must be extruded for forming a film having a desired thickness. In such a case, the stability of the cellulose acylate solution is poor and to give solids, thereby often causing various problems of fish eyes or planarity failures. For solving the problems, multiple cellulose acylate solutions are cast via casting mouths to thereby simultaneously extrude high-viscosity solutions onto a support, and as a result, not only an excellent film having a bettered surface planarity can be obtained but also use of such a thick cellulose acylate solution reduces the drying load and the film production speed can be thereby increased.

The cellulose acylate film may contain, as added thereto, an antiaging agent (for example, antioxidant, peroxide decomposing agent, radical inhibitor, metal inactivator, acid scavenger, amine, etc.). The antiaging agent is described in JP-A 3-199201, 5-1907073, 5-194789, 5-271471, 6-107854. The amount of the antiaging agent to be added is preferably from 0.01 to 1% by mass of the solution (dope) to be prepared, more preferably from 0.01 to 0.2% by mass. When the amount thereof is at least 0.01% by mass, the antiaging agent can favorably exhibit its effect; and when at most 1.0% by mass, then the antiaging agent hardly bleeds out on the surface of the film and is favorable. Especially preferred examples of the antiaging agent are butylated hydroxytoluene (BHT) and tribenzylamine (TBA).

Preferably, fine particles are added to the cellulose acylate film as a mat agent. As the fine particles usable in the invention, there may be mentioned silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate and calcium phosphate. As the fine particles, preferred are those containing silicon as reducing the haze of the film, and more preferred is silicon dioxide. Preferably, fine particles of silicon dioxide have a primary mean particle size of at most 20 nm and an apparent specific gravity of at least 70 g/liter. More preferably, the apparent specific gravity of the fine particles is from 90 to 200 g/liter or more, even more preferably from 100 to 200 g/liter or more. Those having a larger apparent specific gravity are preferred as they may form a dispersion having a high concentration and they reduce the haze of the film and reduce the aggregates in the film.

The fine particles form secondary particles generally having a mean particle size of from 0.1 to 3.0 μm, and these fine particles are in the film mainly as aggregates of primary particles thereof and form irregularities having a height of from 0.1 to 3.0 μm on the film surface. Preferably, the secondary mean particle size is from 0.2 μm to 1.5 μm, more preferably from 0.4 μm to 1.2 μm, most preferably from 0.6 μm to 1.1 μm. Regarding the size of the primary and secondary particles, the particles in the film are observed with a scanning electronic microscope, and the diameter of the circle circumscribing around the particle is measured to be the particle size. 200 particles are observed in different sites, and their data are averaged to be the mean particle size.

As the fine particles of silicon dioxide, for example, usable are commercial products of Aerosil R972, R972V, R974, R812, 200, 200V, 300, R202, OX50 and TT600 (all by Nippon Aerosil). Fine particles of zirconium oxide are sold on the market as trade names of Aerosil R976 and R811 (by Nippon Aerosil), and these can be used here.

Of those, Aerosil 200V and Aerosil R972V are fine particles of silicon dioxide having a primary mean particle size of at most 20 nm and having an apparent specific gravity of at least 70 g/liter, and are especially preferred for use herein as significantly effective for lowering the friction factor of an optical film with keeping low turbidity of the film.

In the invention, for obtaining a cellulose acylate film that contains fine particles having a small secondary mean particle size, some methods may be employed in preparing a dispersion of fine particles. For example, there may be employed a method comprising previously preparing a dispersion of fine particles where a solvent and fine particles are stirred and mixed, then dissolving the fine particles dispersion in a small amount of a cellulose acylate solution separately prepared, with stirring, and thereafter mixing the resulting solution with a main solution of cellulose acylate (dope solution). The method is favorable in that the silicon dioxide fine particles are well dispersible and hardly reaggregate in the dispersion. Apart from this, also employable is another method comprising adding a small amount of cellulose ester to a solvent and dissolving it with stirring, then adding fine particles thereto and dispersing them with a disperser to prepare a fine particles-added liquid, and well mixing the fine particles-added liquid with a dope solution with an in-line mixer. The invention is not limited to these methods. Preferably, the concentration of silicon dioxide in dispersing silicon dioxide fine particles in a solvent by mixing therein is from 5 to 30% by mass, more preferably from 10 to 25% by mass, most preferably from 15 to 20% by mass. The dispersion concentration is preferably higher since the liquid turbidity could be low relative to the added amount, and the haze of the formed film could be low and the amount of the aggregates in the film could also be low. The amount of the mat agent fine particles to be in the final cellulose acylate dope solution is preferably from 0.01 to 1.0 g/m$^3$, more preferably from 0.03 to 0.3 g/m$^3$, most preferably from 0.08 to 0.16 g/m$^3$.

Lower alcohols may be used as the solvent, for example, methyl alcohol, ethyl alcohol, propyl alcohol, isopropyl alcohol, butyl alcohol, etc. The other solvent than the lower alcohol is not specifically defined. Preferably, the solvent used in cellulose ester film formation is used.

The process from casting to post-drying may be carried out in an air atmosphere or in an inert gas atmosphere of nitrogen gas or the like. The winder to be used in producing the cellulose acylate film in the invention may be any ordinary one, and the film may be wound up according to a winding method of a constant tension method, a constant torque method, a taper tension method or a programmed tension control method where the internal stress is kept constant.

(Stretching Treatment)

The cellulose acylate film of the invention may be stretched. After stretched, the cellulose acylate film may be given a desired retardation. The stretching direction of the cellulose acylate film may be any of the lateral direction or the machine direction of the film.

A lateral stretching method is described, for example, in JP-A 62-115035, 4-152125, 4-284211, 4-298310, 11-48271.

The film is stretched under heat. The film may be stretched in drying treatment, and when a solvent remains in the film, the stretching is effective. In machine-direction stretching, for example, the speed of the film conveying rollers may be so controlled that the film winding speed could be higher than the film peeling speed, whereby the film is stretched. In lateral stretching, the film may be conveyed while both sides of the film are held with a tenter and the tenter width is gradually broadened to thereby stretch the film. After dried, the film may be stretched with a stretcher (preferably in a mode of monoaxial stretching with a long stretcher).

Preferably, the cellulose acylate film of the invention is stretched at a temperature of from (Tg−5° C.) to (Tg+40° C.) where Tg means the glass transition temperature of the cellulose acylate film, more preferably from Tg to (Tg+35° C.), even more preferably from (Tg+5° C.) to (Tg+30° C.). When the film is a dry film, preferably, it is stretched at from 130° C. to 200° C.

In case where the film is stretched while the dope solvent still remains therein after casting, the film may be stretched at a temperature lower than the temperature at which the dry film is stretched, and in this case, preferably, the wet film is stretched at from 100° C. to 170° C.

The draw ratio in stretching the cellulose acylate film of the invention (the rate of elongation relative to the unstretched film) is preferably from 1% to 200%, more preferably from 5% to 150%. Especially preferably, the film is stretched by from 1% to 200% in the lateral direction, more preferably by from 5% to 150%, even more preferably by from 30 to 45%.

The drawing speed is preferably from 1%/min to 300%/min, more preferably from 10%/min to 300%/min, most preferably from 30%/min to 300%/min.

Preferably, the stretched cellulose acylate film of the invention is produced through a step of stretching the film being produced to a maximum draw ratio followed by keeping it at a draw ratio lower than the maximum draw ratio (hereinafter this may be referred to as "relaxation step"). Preferably, the draw ratio in the relaxation step is from 50% to 99% of the maximum draw ratio, more preferably from 70% to 97%, most preferably from 90% to 95%. Preferably, the time for the relaxation step is from 1 second to 120 seconds, more preferably from 5 seconds to 100 seconds.

The production method for the cellulose acylate film of the invention preferably comprises a shrinking step of shrinking the film being produced with holding it in the lateral direction.

In the production method including the stretching step of stretching the film in the lateral direction thereof and the shrinking step of shrinking the film in the film traveling direction (machine direction), the film may be shrunk in the machine direction by holding it with a pantograph-type or linear motor-type tenter and gradually narrowing the distance between the clips while the film is stretched in the lateral direction and is shrunk in the machine direction.

In the above-mentioned method, the stretching step and the shrinking step are attained at least partly at the same time.

As the stretching apparatus for stretching the film in any one direction of the machine direction or the lateral direction and simultaneously shrinking it in the other direction to thereby increase the thickness of the film, preferred for use herein is Ichikin's FITZ. The apparatus is described in JP-A 2001-38802.

The draw ratio in the stretching step and the shrinkage ratio in the shrinking step may be defined suitably depending on the intended in-plane retardation Re and thickness-direction retardation Rth of the film to be produced.

Preferably, the draw ratio in the stretching step is at least 10% and the shrinkage ratio in the shrinking step is at least 5%.

More preferably, in the production step, the stretching step of stretching the film being produced by at least 10% in the lateral direction is combined with the shrinking step of shrinking the film by at least 5% in the machine direction with holding the film in the lateral direction thereof.

The shrinking ratio as referred to in the invention means the ratio of the length of the film shrunk in the shrinking direction to the length of the film not shrunk.

Preferably, the shrinkage ratio is from 5 to 40%, more preferably from 10 to 30%.

<Properties of Cellulose Acylate Film>
(Retardation)

The properties of the cellulose acylate film of the invention are described in detail hereinunder.

Preferably, the cellulose acylate film of the invention satisfies the relation of the following formulae (1) to (4):

$$0 \text{ nm} \leq Re < 300 \text{ nm} \qquad \text{Formula (1)}$$

$$-50 \text{ nm} < Rth < 400 \text{ nm} \qquad \text{Formula (2)}$$

$$0.1\% \leq \{(Re \text{ at } 25°\text{ C. and relative humidity } 10\%) - (Re \text{ at } 25°\text{ C. and relative humidity } 80\%)\}/(Re \text{ at } 25°\text{ C. and relative humidity } 60\%) \leq 20\% \qquad \text{Formula (3)}$$

$$0.1\% \leq \{(Rth \text{ at } 25°\text{ C. and relative humidity } 10\%) - (Rth \text{ at } 25°\text{ C. and relative humidity } 80\%)\}/(Rth \text{ at } 25°\text{ C. and relative humidity } 60\%) \leq 20\% \qquad \text{Formula (4)}$$

In the formula (1), Re is more preferably from 0 nm to 200 nm, more preferably from 0 nm to 150 nm.

In the formula (2), Rth is more preferably from −30 nm to 350 nm, more preferably from −10 nm to 300 nm.

In the formula (3), the value of {(Re at 25° C. and relative humidity 10%)−(Re at 25° C. and relative humidity 80%)}/(Re at 25° C. and relative humidity 60%) is more preferably from 0.1% to 10%.

In the formula (4), the value of {(Rth at 25° C. and relative humidity 10%)−(Rth at 25° C. and relative humidity 80%)}/(Rth at 25° C. and relative humidity 60%) is more preferably from 0.1% to 10%.

Using the cellulose film, of which the Re humidity dependence and the Rth humidity dependence are defined each to fall within the above range, provides a liquid-crystal display device free from a problem of light leakage even in lighting up under high humidity for a long time.

In this description, Re (λ) and Rth (λ) each indicate the in-plane retardation and the thickness-direction retardation, respectively, at a wavelength λ. Unless otherwise specifically indicated in this description, Re and Rth are Re and Rth at a wavelength of 548 nm. Re(λ) of a film can be measured by applying to the film, a light having a wavelength of λ nm in the film normal direction, using KOBRA 21ADH or WR (by Oji Scientific Instruments).

In case where the film to be analyzed is expressed as a monoaxial or biaxial index ellipsoid, Rth (λ) thereof may be computed as follows:

With the in-plane slow axis (determined by KOBRA 21ADH or WR) taken as the tilt axis (rotation axis) of the film (in case where the film has no slow axis, the rotation axis of the film may be in any in-plane direction of the film), Re(λ) of the film is measured at 6 points in all thereof, from the normal direction of the film up to 50 degrees on one side relative to the normal direction thereof at intervals of 10 degrees, by applying a light having a wavelength of λ nm from the tilted direction of the film. Based on the thus-determined retardation data, the assumptive mean refractive index and the inputted film thickness, Rth (λ) of the film is computed with KOBRA 21ADH or WR.

In the above, when the film has a direction in which the retardation thereof is zero at a certain tilt angle relative to the in-plane slow axis thereof in the normal direction taken as a rotation axis, the sign of the retardation value of the film at the tilt angle larger than that tilt angle is changed to negative prior to computation with KOBRA 21ADH or WR.

Apart from this, Rth may also be measured as follows: With the slow axis taken as the tilt axis (rotation axis) of the film (in case where the film has no slow axis, the rotation axis of the film may be in any in-plane direction of the film), the retardation is measured in any desired two tilt directions, and based on the thus-determined retardation data, the assumptive mean refractive index and the inputted film thickness, Rth is computed according to the following formulae (21) and (22).

[Numerical Formula 1]

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (21)

Note:

Re (θ) means the retardation of the film in the direction tilted by an angle θ from the normal direction to the film. nx in the formula (21) means the in-plane refractive index of the film in the slow axis direction; ny means the in-plane refractive index of the film in the direction perpendicular to nx; nz means the refractive index in the direction perpendicular to nx and ny. d means the film thickness.

$$Rth=((nx+ny)/2-nz)\times d$$ Formula (22)

In case where the film to be analyzed is not expressed as a monoaxial or biaxial index ellipsoid, or that is, when the film does not have an optical axis, Rth (λ) thereof may be computed as follows:

With the in-plane slow axis (determined by KOBRA 21ADH or WR) taken as the tilt axis (rotation axis) of the film, Re (λ) of the film is measured at 11 points in all thereof, in a range of from −50 degrees to +50 degrees relative to the film normal direction thereof at intervals of 10 degrees, by applying a light having a wavelength of λ nm from the tilted direction of the film. Based on the thus-determined retardation data, the assumptive mean refractive index and the inputted film thickness, Rth(λ) of the film is computed with KOBRA 21ADH or WR.

In the above measurement, for the assumptive mean refractive index, referred to are the data in Polymer Handbook (John Wiley & Sons, Inc.) or the data in the catalogues of various optical films. Films of which the mean refractive index is unknown may be analyzed with an Abbe's refractiometer to measure the mean refractive index thereof. Data of the mean refractive index of some typical optical films are mentioned below. Cellulose acylate (1.48), cycloolefin polymer (1.52), polycarbonate (1.59), polymethyl methacrylate (1.49), polystyrene (1.59). With the assumptive mean refractive index and the film thickness inputted thereinto, Kobra 21ADH or WR can compute nx, ny and nz. From the thus-computed data nx, ny and nz, Nz=(nx−nz)/(nx−ny) is computed.

(Thickness of Cellulose Acylate Film)

Preferably, the thickness of the cellulose acylate film of the invention is from 30 μm to 100 μm, more preferably from 30 μm to 80 μm, most preferably from 30 μm to 60 μm.

(Glass Transition Temperature of Cellulose Acylate Film)

The glass transition temperature is measured according to the following method. A sample of the cellulose acylate film of the invention, 24 mm×36 mm is conditioned at 25° C. and at a relative humidity of 60% for at least 2 hours, and using a dynamic viscoelastometer (Vibron DVA-225, by ITK) at a sample length between grips of 20 mm, at a heating rate of 2° C./min in a temperature range of from 30° C. to 200° C. and at a frequency 1 Hz. The storage modulus is plotted on the vertical logarithmic axis and the temperature on the linear horizontal axis. The glass transition temperature Tg is determined according to the method described in FIG. 3 of JIS K7121-1987, relative to the rapid decrease in the storage modulus observed in transition of the storage modulus from the solid region to the glass transition region.

(Water Content of Cellulose Acylate Film)

Preferably, the equilibrium water content of the cellulose acylate film of the invention at 25° C. and at a relative humidity of 80% is from 0 to 5.0%, more preferably from 0.1 to 4.0%. When the equilibrium water content thereof is at most 5.0%, then the depression of the glass transition temperature of the cellulose acylate film owing to the plasticization effect thereof with water may be small and is therefore favorable from the viewpoint of preventing the polarization performance degradation under high-temperature and high-humidity environments.

The water content is measured according to a Karl-Fischer method, in which a sample of the cellulose acylate film of the invention, 7 mm×25 mm is analyzed with a moisture content meter and a sample drier (CA-03, VA-05, both by Mitsubishi Chemical). The amount of water (g) is divided by the weight of the sample (g) to determine the water content of the film.

<Saponification Treatment>

Through alkali saponification treatment, the cellulose acylate film of the invention is given adhesiveness to a material of polarizing element such as polyvinyl alcohol, and can be used as a polarizer protective film. The saponification method is described in JP-A 2007-86748, [0211] and [0212]; and a method for producing the polarizing element for polarizer and the optical properties of polarizer are described in the same patent reference, [0213] to [0255]. Based on these descriptions, a polarizer can be produced where the film of the invention is used as a protective film.

For example, the cellulose acylate film of the invention is alkali-saponified preferably in a cycle of dipping the film surface in an alkali solution, then neutralizing it with an acid solution, and washing with water and drying it. The alkali solution includes a potassium hydroxide solution and a sodium hydroxide solution, in which the hydroxide ion concentration is preferably within a range of from 0.1 to 5.0 mol/L, more preferably from 0.5 to 4.0 mol/L. The alkali solution temperature is preferably within a range of from room temperature to 90° C., more preferably from 40 to 70° C.

[Polarizer]

A polarizer generally comprises a polarizing element and two transparent protective films arranged on both sides thereof. As one protective film, the cellulose acylate film of the invention may be used. The other protective film may be an ordinary cellulose acylate film. The polarizing element includes an iodine-based polarizing element, a dye-based polarizing element that uses a dichroic dye, and a polyene-based polarizing element. The iodine-based polarizing element and the dye-based polarizing element are produced generally using a polyvinyl alcohol film. In case where the cellulose acylate film of the invention is used as a polarizer protective film, the method for producing the polarizer is not specifically defined, and the polarizer may be produced in an ordinary method. Employable is a method that comprises alkali-saponifying a formed cellulose acylate film and sticking it to both surfaces of a polarizing element produced by dipping and stretching a polyvinyl alcohol film in an iodine solution, using an aqueous, completely-saponified polyvinyl alcohol solution. In place of the alkali treatment, easy adhesion treatment may be employed, as in JP-A 6-94915, 6-118232. As the adhesive for sticking the processed surface of the protective film and the polarizing element, for example, usable are polyvinyl alcohol adhesives such as polyvinyl alcohol, polyvinyl butyral, etc.; and vinyl latexes of butyl acrylate, etc. The polarizer is composed of a polarizing element and a protective film to protect both sides thereof, in which a protect film may be stuck to one surface of the polarizer and a separate film may be stuck to the opposite surface thereof. The protect film and the separate film are used for the purpose of protecting the polarizer in shipping and in product inspection. In this case, the protect film is stuck for the purpose of protecting the surface of the polarizer, and is used on the opposite side of the polarizer to the side thereof to be stuck to a liquid-crystal plate. The separate film is used for the purpose of covering the adhesive layer of the polarizer to be stuck to a liquid-crystal plate, and is used on the side of the polarizer to be stuck to a liquid-crystal plate.

Regarding the method of sticking the cellulose acylate film of the invention to a polarizing element, preferably, the two are so arranged that the transmission axis of the polarizing element is substantially parallel to the slow axis of the cellulose acylate film of the invention.

In the liquid-crystal display device of the invention, preferably, the transmission axis of the polarizer is substantially parallel to the slow axis of the cellulose acylate film of the invention. The wording, "substantially parallel" as referred to herein means that the declination between the direction of the main refractive index nx of the cellulose acylate film of the invention and the direction of the transmission axis of the polarizer are both within a range of 5°, preferably within a range of 1°, more preferably within a range of 0.5°. In case where the declination is larger than 1°, then it is unfavorable since the polarizability of the polarizer lowers under cross-Nicol therefore causing light leakage.

The cross transmittance CT of the polarizer is measured with UV3100PC (by Shimadzu). The polarizer is analyzed within a range of from 380 nm to 780 nm. One sample is tested in the same manner for a total of 10 times, and the data are averaged.

In the polarizer durability test, (1) the polarizer alone and (2) a test sample prepared by sticking the polarizer to glass with an adhesive are tested in the manner mentioned below. The test of the polarizer alone (1) is as follows: Two polarizing elements are prepared and combined perpendicularly with the cellulose acylate film sandwiched therebetween, and two such samples are prepared. The test of the sample prepared by sticking the polarizer to glass with an adhesive (2) is as follows: The polarizer is stuck to glass in such a manner that the cellulose acylate film of the invention could face the glass side, and two such samples (about 5 cm×5 cm) are prepared. For measuring the cross transmittance thereof, the sample was so set that the film side thereof could face a light source. Two samples are separately analyzed, and the data are averaged to give the cross transmittance of the sample. In Examples of the invention given below, the test method (2) of the above-mentioned test methods (1) and (2) was employed.

Regarding the polarization performance, the preferred range of the cross transmission CT is $CT \leq 2.0$, more preferably $CT \leq 1.3$ (unit, %).

In the polarizer durability test, the variation of the found data is preferably smaller. Preferably, the polarizer of the invention satisfies at least one or more of the following formulae (j) and (k) in which ACT240(%) means the variation of the cross transmittance of the polarizer statically kept at 60° C. and at a relative humidity of 90% for 240 hours, and ΔCT1000(%) means the variation of the cross transmittance thereof statically kept at 60° C. and at a relative humidity of 95% for 240 hours:

$$-0.5 \leq \Delta CT240 \leq 0.5 \quad (j)$$

$$-0.5 \leq \Delta CT1000 \leq 0.5 \quad (k)$$

In this, the variation is a value computed by subtracting the measured value before the test from the measured value after the test.

When the polarizer satisfies the above-mentioned formula (j) or (k), then it is favorable since the stability of the polarizer can be secured in long-term use or storage in high-temperature and high-humidity environments.

<Functionalization of Polarizer>

The polarizer of the invention may be favorably used as a functionalized polarizer, as combined with an optical film having a functional layer, such as an antireflection film, a brightness-improving film, a hard coat layer, a front scattering layer, an antiglare layer or the like, for the purpose of improving the visibility of displays. The antireflection film, the brightness-improving film and other functional optical films as well as the hard coat layer, the front scattering layer and the antiglare layer for functionalization are described in JP-A 2007-86748, [0257] to [0276], and based on these descriptions, the functionalized polarizers may be produced.

(Antireflection Film)

The polarizer of the invention may be used, as combined with an antireflection film. As the antireflection film, usable here is any of a film merely given a single layer of a low-refractivity material such as a fluoropolymer or the like and having a reflectivity of 1.5% or so, or a film utilizing multi-layer interference of thin films and having a reflectivity of at most 1%. In the invention, preferred is use of a configuration produced by laminating a low-refractivity layer and at least one layer having a higher refractivity than that of the low-refractivity layer (that is, a high-refractivity layer, a middle-refractivity layer) on a transparent support. In addition, also preferred for use herein are the antireflection films described in Nitto Technical Report, Vol. 38, No. 1, May 2000, pp. 26-28, and in JP-A 2002-301783.

The layers satisfy the following relationship in point of the refractivity thereof.

> Refractive index of high-refractivity layer>refractive index of middle-refractivity layer>refractive index of transparent support>refractive index of low-refractivity layer As the transparent support for use in the antireflection film, preferably used is the same transparent polymer film as that to be used for the protective film for polarizing element mentioned above.

Preferably, the refractive index of the low-refractivity layer is from 1.20 to 1.55, more preferably from 1.30 to 1.50. Preferably, the low-refractivity layer is used as the outermost layer having abrasion resistance and fouling resistance. For enhancing the abrasion resistance of the layer, preferably used is a material of a silicone-containing compound having a silicone group or a fluorine-containing compound containing fluorine or the like to thereby impart lubricity to the surface of the layer.

As the fluorine-containing compound, for example, preferably used here are the compounds described in JP-A 9-222503, [0018] to [0026], JP-A 11-38202, [0019] to [0030], JP-A 2001-40284, [0027] to [0028], JP-A 2000-284102, etc.

As the silicone-containing compound, preferred are compounds having a polysiloxane structure; however, reactive silicones (for example, Silaplane by Chisso, and polysiloxane having a silanol group at both ends thereof (JP-A 11-258403)) and the like are also usable here. An organic metal compound such as a silane coupling agent and a specific, fluorohydrocarbon group-containing silane coupling agent may be cured through condensation in the presence of a catalyst (compounds described in JP-A 58-142958, 58-147483, 58-147484, 9-157582, 11-106704, 2000-117902, 2001-48590, 2002-53804, etc.).

Preferably, the low-refractivity layer may contain, as other additives than the above added thereto, a filler (for example, low-refractivity inorganic compounds having a primary particle size of from 1 to 150 nm, such as silicon dioxide (silica), fluorine-containing particles (magnesium fluoride, calcium fluoride, barium fluoride), etc.; organic fine particles described in JP-A 11-3820, [0020] to [0038], etc.), a silane coupling agent, a lubricant, a surfactant, etc.

The low-refractivity layer may be formed according to a vapor phase method (vacuum evaporation method, sputtering method, ion plating method, plasma CVD method, etc.); however, the layer is preferably formed according to a coating method as indispensable. As the coating method, preferred are a dip coating method, an air knife coating method, a curtain coating method, a roller coating method, a wire bar coating method, a gravure coating method, a microgravure coating method.

Preferably, the thickness of the low-refractivity layer is from 30 to 200 nm, more preferably from 50 to 150 nm, most preferably from 60 to 120 nm.

Preferably, the middle-refractivity layer and the high-refractivity layer each are so designed that ultrafine particles of a high-refractivity inorganic compound having a mean particle size of at most 100 nm are dispersed in the matrix material thereof. As the fine particles of a high-refractivity inorganic compound, preferably used here are inorganic compounds having a refractive index of at least 1.65, for example, oxides of Ti, Zn, Sb, Sn, Zr, Ce, Ta, La, In or the like, as well as composite oxides containing such metal atoms, etc.

The ultrafine particles may used in various embodiments where the particles are surface-treated with a surface-treating agent (e.g., silane coupling agent or the like as in JP-A 11-295503, 11-153703, 2000-9908; anionic compound or organic metal coupling agent as in JP-A 2001-310432), or the particles have a core/shell structure in which a high-refractivity particle is a core (for example, as in JP-A 2001-166104), or the particles are combined with a specific dispersant (for example, as in JP-A 11-153703, U.S. Pat. No. 6,210,858B1, JP-A 2002-2776069), etc.

As the matrix material, usable here are heretofore known thermoplastic resins, curable resin films, etc. Also usable are polyfunctional materials as in JP-A 2000-47004, 2001-315242, 2001-31871, 2001-296401, etc.; curable films obtained from metal alkoxide compounds as in JP-A 2001-293818, etc.

Preferably, the refractive index of the high-refractivity layer is from 1.70 to 2.20. Preferably, the thickness of the high-refractivity layer is from 5 nm to 10 μm, more preferably from 10 nm to 1 μm.

The refractive index of the middle-refractivity layer is so controlled as to fall between the refractive index of the low-refractivity layer and the refractive index of the high-refractivity layer. Preferably, the refractive index of the middle-refractivity layer is from 1.50 to 1.70.

Preferably, the haze of the antireflection layer is at most 5%, more preferably at most 3%. Preferably, the strength of the film is on a level of H or more in the pencil hardness test according to JIS K5400, more preferably 2H or more, most preferably 3H or more.

(Brightness-Improving Film)

The polarizer of the invention can be used, as combined with a brightness-improving film. The brightness-improving film has a function of separating a circularly-polarized light or a linearly-polarized light, and as arranged between polarizer and backlight, the film reflects or scatters one circularly-polarized light or linear-polarized light, backward to the backlight side. The polarization state of the re-reflected light from the backlight side is partly changed, and when again running toward the brightness-improving film and the polarizer, the light partly passes through it; and after repetition of the step, the light utilization ratio increases and the front brightness increases up to about 1.4 times. As the brightness-improving film, known is an anisotropic reflection-type film and an anisotropic scattering-type film, any of which can be combined with the polarizer of the invention.

As the anisotropic reflection-type film, known is a brightness-improving film of a type in which multiple monoaxially-stretched films and unstretched films are laminated severalfold to thereby increase the refractivity difference in the stretching direction and which therefore has refractivity anisotropy and transmittance anisotropy. Regarding the film of the type, known are multilayer-type films utilizing the principle of dielectric mirror (as in WO95/17691, WO95/17692, WO95/17699) and cholesteric liquid-crystal-based films (as in EP 606940A2, JP-A 8-271731). As the multilayer-type brightness-improving film utilizing the principle of dielectric mirror, DBEF-E, DBEF-D and DBEF-M (all by 3M) are preferably used in the invention; and as the cholesteric liquid-crystal-based brightness-improving film, NIPOCS (by Nitto Denko) is preferably used in the invention. For NIPOCS, referred to is Nitto Technical Report, Vol. 38, No. 1, May 2000, pp. 19-21.

Also preferred in the invention is a combined use with an anisotropic scattering-type brightness-improving film prepared by blending a positive intrinsic birefringent polymer and a negative intrinsic birefringent polymer followed by monoaxially stretching the film of the blend, as in WO97/32223, WO97/32224, WO97/32225, WO97/32226, and JP-A 9-274108, 11-174231. As the anisotropic scattering-type brightness-improving film, preferred is DRPF-H (by 3M).

(Other Functional Optical Films)

Preferably, the polarizer of the invention is used, as combined with an functional optical film having a hard coat layer, a front scattering layer, an antiglare layer, a gas-barrier layer, a lubricant layer, an antistatic layer, an undercoat layer, a protective layer, etc. Also preferably, the functional layer is used, as mutually complexed in one and the same layer with the antireflection layer, the optical anisotropic layer or the like of the antireflection film mentioned above. The functional layer may be arranged on any one side of the polarizing element side of the polarizer or the side thereof opposite to the polarizing element side (the side nearer to the air-facing side), or on both sides thereof.

(Hard Coat Layer)

Preferably, the polarizer of the invention is combined with a functional optical film, which comprises a transparent support and a hard coat layer formed on the surface of the support, for the purpose of imparting mechanical strength such as abrasion resistance or the like thereto. In case where the hard coat layer is applied to the above-mentioned antireflection film, preferably, the layer is provided between the transparent support and the high-refractivity layer.

Preferably, the hard coat layer is formed through crosslinking reaction or polymerization reaction of a curable compound by light and/or heat. As the curable functional group, preferred is a photopolymerizing functional group, or a hydrolyzable functional group-containing organic metal compound or an organic alkoxysilyl compound is preferred. As the specific constitutive composition for the hard coat layer, for example, preferably used here are those described in JP-A 2002-144913 and 2000-9908, WO00/46617, etc.

Preferably, the thickness of the hard coat layer is from 0.2 µm to 100 µm.

Preferably, the strength of the hard coat layer is on a level of at least H in the pencil hardness test according to JIS K5400, more preferably at least 2H, most preferably at least 3H. Also preferably, the abrasion loss of the test piece before and after the taper test according to JIS K5400 is smaller.

As the material to form the hard coat layer, usable are ethylenic unsaturated group-containing compounds, and ring-opening polymerizing group-containing compounds. One or more these compounds may be used here either singly or as combined. Preferred examples of the ethylenic unsaturated group-containing compounds are polyol polyacrylates such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate, dipentaerythritol hexaacrylate, etc.; epoxy acrylates such as bisphenol A diglycidyl ether diacrylate, hexanediol diglycidyl ether diacrylate, etc.; urethane acrylates to be obtained through reaction of polyisocyanate and hydroxyl group-containing acrylate such as hydroxyethyl acrylate, etc. As commercial products, theremaybementionedEB-600, EB-40, EB-140, EB-1150, EB-1290K, IRR214, EB-2220, TMPTA, TMPTMA (all by Daicel UCB), UV-6300, UV-1700B (both by Nippon Gohsei), etc.

Preferred examples of the ring-opening polymerizing group-containing compounds are glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl tris-hydroxyethyl isocyanurate, sorbitol tetraglycidyl ether, pentaerythritol tetraglycidyl ether, cresol/novolak resin polyglycidyl ether, phenol/novolak resin polyglycidyl ether, etc.; alicyclic epoxy compounds such as Celoxide 2021P, Celoxide 2081, Epolead GT-301, Epolead GT-401, EHPE 3150CE (all by Daicel Chemical), phenol/novolak resin polycyclohexyl epoxymethyl ether, etc.; oxetanes such as OXT-121, OXT-221, OX-SQ, PNOX-1009 (all by To a Gosei), etc. In addition, also usable as the hard coat layer are polymer of glycidyl (meth)acrylate, or copolymer thereof with monomer copolymerizable with glycidyl (meth)acrylate.

It is also preferred to add to the hard coat layer, fine particles of oxide with silicon, titanium, zirconium, aluminium or the like, as well as crosslinked fine particles, for example, crosslinked organic fine particles of polyethylene, polystyrene, poly(meth)acrylate, polydimethylsiloxane, etc., or crosslinked rubber fine particles of SBR, NBR, etc., for the purpose of reducing the curing shrinkage of the layer, enhancing the adhesiveness of the layer to substrate and preventing the hard coat layer-having product in the invention from curling.

Preferably, the mean particle size of these crosslinked fine particles is from 1 nm to 20000 nm. The shape of the crosslinked fine particles may be spherical, rod-like, needle-like or tabular with no specific limitation thereon. Preferably, the amount of the fine particles to be added is at most 60% by volume of the cured hard coat layer, more preferably at most 40% by volume.

In case where the inorganic fine particles mentioned above are added to the hard coat layer, it is desirable to treat the surfaces of the particles with a surface-treating agent that contains a metal such as silicon, aluminium, titanium or the like and has a functional group such as an alkoxide group, a carbonic acid group, a sulfonic acid group, a phosphonic acid group or the like, since the particles generally have poor affinity with binder polymer.

Preferably, the hard coat layer is cured by heat or active energy rays; and above all, more preferred is use of active energy rays such as radiation rays, gamma rays, alpha rays, electron beams, UV rays, etc. In consideration of safety and productivity, more preferred is use of electron beams or UV rays. In case where the layer is cured by heat, the heating temperature is preferably not higher than 140° C. in consideration of the heat resistance of the plastics themselves, more preferably not higher than 100° C.

(Front Scattering Layer)

The front scattering layer is used for improving the viewing angle characteristics (color shift and brightness distribution) in all directions when the polarizer of the invention is applied to liquid-crystal display devices. In the invention, preferably, the front scattering layer is so designed that fine particles having a different refractive index are dispersed in a binder, for which, for example, employable are the configurations in JP-A 11-38208 where the front scattering coefficient is specifically defined, in JP-A 2000-199809 where the relative refractivity between transparent resin and fine particles is defined to fall within a specific range, in JP-A 2002-107512 where the haze value is defined to be at least 40%, etc. Also preferred is use of the polarizer of the invention as combined with "Lumisty" described in Sumitomo Chemical's Technical Report "Photofunctional Film", pp. 31-39, for the purpose of controlling the viewing angle characteristics of haze.

(Antiglare Layer)

The antiglare layer is used for preventing reflected light from scattering to cause glaring or background reflections. The antiglare function is attained by roughening the outermost surface (panel side) of liquid-crystal display devices. Preferably, the haze of the optical film having such an antiglare function is from 3 to 30%, more preferably from 5 to 20%, most preferably from 7 to 20%.

As the method of roughening the film surface, for example, preferred is a method of adding fine particles to the film to thereby roughen the film surface (for example, as in JP-A 2000-271878), a method of adding a small amount (from 0.1 to 50% by mass) of relatively large particles (having a particle size of from 0.05 to 2 µm) to thereby roughen the film surface (for example, as in JP-A2000-281410, 2000-95893, 2001-100004, 2001-281407), a method of physically transferring irregularities onto the film surface (for example, as an embossing method, as in JP-A 63-278839, 11-183710, 2000-275401), etc.

[Liquid-Crystal Display Device]

Next described is the liquid-crystal display device of the invention.

FIG. 1 is a schematic view showing an example of the liquid-crystal display device of the invention. In FIG. 1, the liquid-crystal display device 10 comprises a liquid-crystal cell that comprises the liquid-crystal layer 5 and, as arranged on and below the layer, the liquid-crystal cell upper electrode substrate 3 and the liquid-crystal cell lower electrode substrate 6, and the upper polarizer 1 and the lower polarizer 8 arranged on both sides of the liquid-crystal cell. A color filer may be arranged between the liquid-crystal cell and each polarizer. In case where the liquid-crystal display device 10 is a transmission-type device, a backlight with a light source of a cold cathode or hot cathode fluorescent tube, a light-emitting diode, a field emission element or an electroluminescent element is arranged on the back of the device.

The upper polarizer 1 and the lower polarizer 8 each are so laminated that the polarizing element therein is sandwiched between two protective films, and in the liquid-crystal display device 10 of the invention, preferably, the protective film on the liquid-crystal cell side of one polarizer has the characteristics of the above-mentioned formulae (1) to (4). Preferably, the liquid-crystal display device 10 of the invention is so designed that a transparent protective film, the polarizing element and the cellulose acylate film of the invention are laminated in that order from the outer side of the device (from the side remoter from the liquid-crystal cell).

The liquid-crystal display device 10 includes an image direct-viewing type, an image projection type and a light modulation type. The invention is effective for an active-matrix liquid-crystal display device that uses a 3-terminal or 2-terminal semiconductor device such as TFT or MIM. Needless-to-say, the invention is also effective for a passive-matrix liquid-crystal display device such as typically an STN mode referred to as a time-division driving system.

(VA Mode)

Preferably, the liquid-crystal cell in the liquid-crystal display device of the invention is a VA-mode cell.

In the VA-mode cell, liquid-crystal molecules having a negative dielectric anisotropy and having $\Delta n=0.813$ and $\Delta \epsilon=-4.6$ or so are aligned by rubbing between the upper and lower substrates, and the director, or that is, the tilt angle that indicates the alignment direction of the liquid-crystal molecules is about 89°. In FIG. 1, the thickness d of the liquid-crystal layer 5 is preferably 3.5 μm or so. Depending on the level of the product $\Delta$nd of the thickness d and the refractivity anisotropy $\Delta$n, the brightness at the time of white level of display varies. Accordingly, for obtaining the maximum brightness, the thickness of the liquid-crystal layer is defined to fall within a range of from 0.2 μm to 0.5 μm.

The upper polarizer 1 and the lower polarizer 8 between which the liquid-crystal cell is sandwiched are so laminated that the absorption axis 2 of the former is nearly perpendicular to the absorption axis 9 of the latter. Inside the alignment film of each of the liquid-crystal cell upper electrode substrate 3 and the liquid-crystal cell lower electrode substrate 6, formed is a transparent electrode (not shown). In a non-driving condition where no driving voltage is applied to the electrode, the liquid-crystal molecules in the liquid-crystal layer 5 are aligned nearly perpendicularly to the substrate face, and therefore in the condition, the polarization condition of the light passing through the liquid-crystal panel changes little. Specifically, the liquid-crystal display device realizes an ideal black display in the non-driving condition. As opposed to this, in a driving condition, the liquid-crystal molecules are tilted in the direction parallel to the substrate face, and in this condition, the polarization condition of the light passing through the liquid-crystal panel is changed by the thus-tilted liquid-crystal molecules. In other words, the liquid-crystal display device presents a white display in the driving condition. In FIG. 1, the reference numerals 4 and 7 indicate the alignment control direction.

In the device, an electric field is applied between the upper and lower substrates, and therefore, preferred is use of a liquid-crystal material having a negative dielectric anisotropy in which the liquid-crystal molecules respond perpendicularly to the electric field direction. In case where an electrode is arranged on one substrate and where an electric field is applied in the lateral direction that is parallel to the substrate, a liquid-crystal material having a positive dielectric anisotropy is used.

In a VA-mode liquid-crystal display device, a chiral agent that is generally used in a TN-mode liquid-crystal display device is used little as degrading the dynamic responsive characteristic of the device, but may be used therein for reducing alignment failure.

The VA-mode device is characterized by high-speed response and high contrast. The VA-mode device may have a high contrast in the front direction but is problematic in that the contrast thereof worsens in oblique directions. At the time of black level of display, the liquid-crystal molecules are aligned perpendicularly to the substrate face. In this condition, when the device is seen in the front direction, there occurs little birefringence of the liquid-crystal molecules therein and therefore the transmittance is low and the contrast is high. However, when seen in oblique directions, there occurs birefringence of the liquid-crystal molecules in the device. Moreover, the crossing angle of the absorption axes of the upper and lower polarizers is 90°, or that is, the absorption axes of the two cross at right angles in the front direction; however, in oblique directions, the crossing angle is larger than 90°. Because of these two factors, there occurs light leakage in oblique directions and the contrast is thereby lowered. To solve this problem, the cellulose acylate film of the invention is disposed as an optically compensatory sheet (retardation film).

At the time of white level of display, the liquid-crystal molecules in the device are tilted, but in the direction opposite to the tilt direction, the birefringence level of the liquid-crystal molecules varies in oblique observation, therefore causing difference in brightness and color tone. To solve this problem, preferably employed is a multidomain structure in which one pixel of the liquid-crystal display device is divided into multiple regions.

(Multidomain)

For example, in a VA system, the liquid-crystal molecules are given an electric field and are tilted in different multiple regions in one pixel whereby the viewing angle characteristics are averaged. For dividing the alignment in one pixel, a slit may be formed in the electrode or a projection may be formed therein to thereby change the electric field direction or change the electric field density in different sites. For obtaining uniform viewing angle characteristics in all directions, the number of divisions may be increased. For example, 4 divisions or 8 divisions or more may give almost uniform viewing angle characteristics. In particular, a 8-division system is preferred since the polarizer absorption axis can be defined in any desired angle therein.

In the alignment division region boundary, the liquid-crystal molecules hardly respond. Accordingly, in a normally black display, the black level of display can be maintained, therefore causing a problem of brightness depression.

Accordingly, a chiral agent may be added to the liquid-crystal material to reduce the boundary region.

EXAMPLES

The characteristics of the invention are described more concretely with reference to Examples and Comparative Examples given below. In the following Examples, the material used, its amount and ratio, the details of the treatment and the treatment process may be suitably modified or changed not overstepping the sprit and the scope of the invention. Accordingly, the invention should not be limitatively interpreted by the Examples mentioned below.

Example 1

Production of Cellulose Acylate Film (Preparation of Cellulose Acylate Solution)

The following ingredients were put into a mixing tank and dissolved by stirring to prepare a cellulose acylate solution 1.

| Composition of Cellulose Acetate Solution 1 | |
|---|---|
| Cellulose Acylate having a degree of acetyl substitution of 2.76 and a degree of polymerization of 350 | 100.0 parts by mass |
| Polyalcohol ester 4 | 10.0 parts by mass |
| Methylene chloride (first solvent) | 402.0 parts by mass |
| Methanol (second solvent) | 60.0 parts by mass |

[Chemical Formula 75]

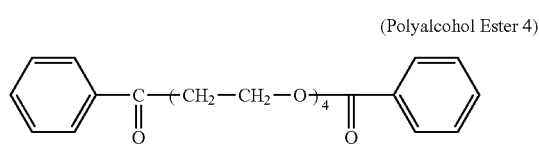

(Polyalcohol Ester 4)

(Preparation of Mat Agent Solution 2)

The following ingredients were put into a disperser and dissolved by stirring to prepare a mat agent solution 2.

| Composition of Mat Agent Solution 2 | |
|---|---|
| Silica particles having a mean particle size of 20 nm (AEROSIL R972, by Nippon Aerosil) | 2.0 parts by mass |
| Methylene chloride (first solvent) | 75.0 parts by mass |
| Methanol (second solvent) | 12.7 parts by mass |
| Cellulose acylate solution 1 mentioned above | 10.3 parts by mass |

(Preparation of Hydrogen-Bonding Compound Solution 3)

The following ingredients were put into a mixing tank and dissolved by stirring under heat to prepare a hydrogen-bonding compound solution 3.

| Composition of Hydrogen-Bonding Compound Solution 3 | |
|---|---|
| Hydrogen-bonding compound (A-16) | 20.0 parts by mass |
| Methylene chloride (first solvent) | 67.2 parts by mass |
| Methanol (second solvent) | 10.0 parts by mass |
| Cellulose acylate solution 1 mentioned above | 12.8 parts by mass |

[Chemical Formula 76]

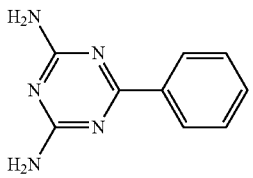

Hydrogen-Bonding Compound (A-11)

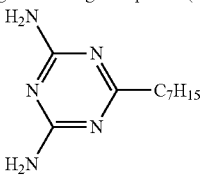

Hydrogen-Bonding Compound (A-13)

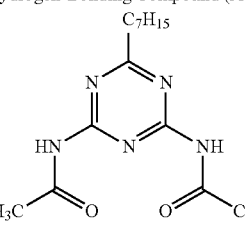

Hydrogen-Bonding Compound (A-16)

TABLE 10

| | Humidity Dependence Improver | | | | |
|---|---|---|---|---|---|
| type | donor number + acceptor number | molecular weight | molecular weight/(donor number + acceptor number) | number of whole aromatic ring structure | amount added* |
| (A-11) | 5 | 187 | 37 | 1 | 8.0 |
| (A-13) | 5 | 209 | 42 | 1 | 6.0 |
| (A-16) | 7 | 360 | 51 | 2 | 4.0 |

*Amount added (part by mass) relative to 100 parts by mass of cellulose acylate.

1.3 parts by mass of the mate agent solution 2 and 3.1 parts by mass of the hydrogen-bonding compound solution 3 were, after separately filtered, mixed using an in-line mixer, and 95.6 parts by mass of the cellulose acylate solution 1 was added thereto and mixed with the in-line mixer. The mixed solution was cast, using a band caster, and dried at 100° C. to have a residual solvent amount of 40%, and the film was peeled. When the residual solvent content therein reached 20%, the peeled film was laterally stretched at a draw ratio of 35% using a tenter at an atmospheric temperature of 140° C., and the kept at 130° C. for 3 minutes. Next, the film was unclipped and dried at 130° C. for 30 minutes. Thus produced, this is a cellulose acylate film of Example 1. The residual solvent amount in the thus-produced cellulose acylate film was 0.1%, and the film thickness was 60 μm.

Examples 2 to 10, Comparative Examples 1 to 14

Production of Cellulose Acylate Films of Examples 2 to 10 and Comparative Examples 1 to 14

Cellulose acylate films of Examples 2 to 10 and Comparative Examples 1 to 14 were produced in the same manner as in Example 1, except that the degree of substitution of the cellulose acetate, the type and the amount of the additive, the stretching temperature, the draw ratio in stretching and the film thickness in Example 1 were changed as in Tables 11 to 14 below.

In the following Tables 11 to 14, the amount of the additive is in terms of part by mass relative to 100 parts by mass of the cellulose acylate resin.

Thus produced, the cellulose acylate films of Examples 1 to 10 and Comparative Examples 1 to 14 were analyzed for Re and Rth thereof at a wavelength of 548 nm, at 25° C. and at a relative humidity of 10%, 60% and 80%, using an automatic birefringence meter (KOBRA-WR, by Oji Scientific Instruments).

From the found data of Re and Rth, the Re humidity dependence and the Rth humidity dependence of the films were obtained through computation as follows.

Re humidity dependence={(Re at 25° C. and at relative humidity 10%)−(Re at 25° C. and at relative humidity 80%)}/(Re at 25° C. and at relative humidity 60%).

Rth humidity dependence={(Rth at 25° C. and at relative humidity 10%)−(Rth at 25° C. and at relative humidity 80%)}/(Rth at 25° C. and at relative humidity 60%).

The obtained results are shown in Tables 11 to 14 below.

[Saponification Treatment of Cellulose Acylate Film]

The cellulose acylate film of Example 1 produced in the above was dipped in an aqueous solution of 2.3 mol/L sodium hydroxide at 55° C. for 3 minutes. This was washed in a water-washing bath at room temperature, and then neutralized with 0.05 mol/L sulfuric acid at 30° C. Again this was washed with a water-washing bath at room temperature and then dried with hot air at 100° C. Accordingly, the surface of the cellulose acylate film of Example 1 was saponified.

[Production of Polarizer]

A stretched polyvinyl alcohol film was made to adsorb iodine to prepare a polarizing element.

Using a polyvinyl alcohol adhesive, the saponified cellulose acylate film of Example 1 was stuck to one side of the polarizing element. A commercially-available cellulose triacetate film (Fujitac TD80UF by FUJIFILM) was saponified in the same manner as above, and using a polyvinyl alcohol adhesive, the thus-saponified cellulose triacetate film was stuck to the other side of the polarizing element to which the cellulose acylate film of Example 1 had been stuck.

In this, the polarizing element and the cellulose acylate film of Example 1 were so arranged that the transmission axis of the former could be parallel to the slow axis of the latter. In addition, the polarizing element and the commercially-available cellulose triacetate film were also so arranged that the transmission axis of the former could be perpendicular to the slow axis of the latter.

In that manner, a polarizer of Example 1 was produced.

Also in the same manner as in Example 1, the cellulose acylate films of Examples 2 to 10 and the cellulose acylate films of Comparative Examples 1 to 14 were saponified and used in producing polarizers, thereby producing polarizers of Examples 2 to 10 and polarizers of Comparative Examples 1 to 14.

(Evaluation of Polarizer Durability)

The polarizers of Examples 1 to 10 and Comparative Examples 1 to 14 produced in the above were analyzed for the cross transmittance thereof at a wavelength of 410 nm, according to the method described hereinabove.

Next, the polarizers of Examples 1, 2 and 6 and Comparative Examples 1 to 3, 7, 8, 11 and 13 were stored in an environment at 60° C. and at a relative humidity of 95% for 1000 hours, and their cross transmittance was measured. The cross transmittance change before and after the storage was computed and referred to as a polarizer durability (1). The results are shown in Table 11 and Table 13 below.

On the other hand, the other polarizers were stored in an environment at 60° C. and at a relative humidity of 90% for 240 hours, and their cross transmittance was measured. Similarly, the cross transmittance change before and after the storage was computed and referred to as a polarizer durability (2). The results are shown in Table 12 and Table 14 below.

TABLE 11

| | Degree of Acyl Substitution of Cellulose Acylate | | | Hydrophobizing Agent | | Hydrogen-Bonding Compound | | | | | |
|---|---|---|---|---|---|---|---|---|---|---|---|
| | acetyl | propionyl | total degree of acyl substitution | type | amount added (mas. pt.) | donor type | number + acceptor number | molecular weight | moecular weight/ (donor number + acceptor number) | number of whole aromatic ring structure | ClogP | amount added (mas. pt.) |
| Example 1 | 2.76 | 0 | 2.76 | polyalcohol ester 4 | 10 | A-16 | 7 | 360 | 51 | 2 | 5.1 | 4.0 |
| Example 2 | 2.76 | 0 | 2.76 | glycerol tribenzoate | 10 | A-16 | 7 | 360 | 51 | 2 | 5.1 | 4.0 |
| Comparative Example 1 | 2.76 | 0 | 2.76 | glycerol tribenzoate | 10 | | | | none | | | |
| Comparative Example 2 | 2.76 | 0 | 2.76 | none | | A-16 | 7 | 360 | 51 | 2 | 5.1 | 4.0 |
| Comparative Example 3 | 2.76 | 0 | 2.76 | triphenyl phosphate | 10 | A-16 | 7 | 360 | 51 | 2 | 5.1 | 4.0 |

| | Stretching Condition | | Film | | | | | Polarizer | Polarizer |
|---|---|---|---|---|---|---|---|---|---|
| | Temperature (° C.) | draw ratio (%) | Thickness (µm) | Re (nm) | Rth (nm) | Re Humidity Dependence | Rth Humidity Dependence | Durability (1) | Durability (2) |
| Example 1 | 140 | 35 | 60 | 42 | 110 | 16% | 14% | 0.5% | — |
| Example 2 | 140 | 35 | 60 | 44 | 116 | 14% | 13% | 0.6% | — |
| Comparative Example 1 | 140 | 35 | 60 | 20 | 71 | 70% | 40% | 0.6% | — |

TABLE 11-continued

| | | | | | | | | | |
|---|---|---|---|---|---|---|---|---|---|
| Comparative Example 2 | 140 | 35 | 60 | 37 | 100 | 24% | 20% | 1.2% | — |
| Comparative Example 3 | 140 | 35 | 60 | 39 | 100 | 20% | 18% | 0.8% | — |

TABLE 12

| | Degree of Acyl Substitution of Cellulose Acylate | | | Hydrophobizing Agent | | Hydrogen-Bonding Compound | | | | | | |
|---|---|---|---|---|---|---|---|---|---|---|---|---|
| | | | | | | donor | | molecular weight/ (donor | number of whole | | | |
| | acetyl | propionyl | total degree of acyl substitution | type | amount added (mas. pt.) | type | number + acceptor number | molecular weight | number + acceptor number) | aromatic ring structure | ClogP | amount added (mas. pt.) |
| Example 3 | 2.42 | 0 | 2.42 | polycondensate ester A31 | 15 | A-11 | 5 | 187 | 37 | 1 | 2.2 | 8.0 |
| Example 4 | 2.42 | 0 | 2.42 | polycondensate ester A32 | 15 | A-11 | 5 | 187 | 37 | 1 | 2.2 | 8.0 |
| Example 5 | 2.42 | 0 | 2.42 | polycondensate ester A33 | 15 | A-11 | 5 | 187 | 37 | 1 | 2.2 | 8.0 |
| Comparative Example 4 | 2.42 | 0 | 2.42 | none | | A-11 | 5 | 187 | 37 | 1 | 2.2 | 8.0 |
| Comparative Example 5 | 2.42 | 0 | 2.42 | polycondensate ester A31 | 15 | | | none | | | | |
| Comparative Example 6 | 2.42 | 0 | 2.42 | triethyl citrate | 15 | A-11 | 5 | 187 | 37 | 1 | 2.2 | 8.0 |

| | Stretching Condition | | Film | | | | | Polarizer | Polarizer |
|---|---|---|---|---|---|---|---|---|---|
| | Temperature (° C.) | draw ratio (%) | Thickness (μm) | Re (nm) | Rth (nm) | Re Humidity Dependence | Rth Humidity Dependence | Durability (1) | Durability (2) |
| Example 3 | 180 | 35 | 65 | 85 | 240 | 4% | 4% | — | 0.5% |
| Example 4 | 180 | 35 | 65 | 71 | 220 | 6% | 7% | — | 0.5% |
| Example 5 | 180 | 35 | 65 | 65 | 201 | 8% | 9% | — | 0.5% |
| Comparative Example 4 | 180 | 35 | 65 | 54 | 170 | 10% | 11% | — | 0.8% |
| Comparative Example 5 | 180 | 35 | 65 | 66 | 168 | 15% | 16% | — | 0.4% |
| Comparative Example 6 | 180 | 35 | 65 | 45 | 145 | 12% | 13% | — | 0.7% |

TABLE 13

| | Degree of Acyl Substitution of Cellulose Acylate | | | Hydrophobizing Agent | | Hydrogen-Bonding Compound | | | | | | |
|---|---|---|---|---|---|---|---|---|---|---|---|---|
| | | | | | | donor | | molecular weight/ (donor | number of whole | | | |
| | acetyl | propionyl | total degree of acyl substitution | type | amount added (mas. pt.) | type | number + acceptor number | molecular weight | number + acceptor number) | aromatic ring structure | ClogP | amount added (mas. pt.) |
| Example 6 | 2.87 | 0 | 2.87 | pentaerythritol tribenzoate | 10 | A-13 | 5 | 209 | 42 | 1 | 3.2 | 6.0 |
| Comparative Example 7 | 2.87 | 0 | 2.87 | none | | A-13 | 5 | 209 | 42 | 1 | 3.2 | 6.0 |
| Comparative Example 8 | 2.87 | 0 | 2.87 | pentaerythritol tribenzoate | 10 | | | none | | | | |

| | Stretching Condition | | Film | | | | | Polarizer | Polarizer |
|---|---|---|---|---|---|---|---|---|---|
| | Temperature (° C.) | draw ratio (%) | Thickness (μm) | Re (nm) | Rth (nm) | Re Humidity Dependence | Rth Humidity Dependence | Durability (1) | Durability (2) |
| Example 6 | 120 | 4 | 75 | 1 | 60 | 1% | 17% | 0.5% | — |
| Comparative Example 7 | 120 | 4 | 75 | 2 | 55 | 2% | 25% | 0.9% | — |
| Comparative Example 8 | 120 | 4 | 75 | 1 | 40 | 2% | 55% | 0.4% | — |

TABLE 14

| | Degree of Acyl | | | Hydrophobizing Agent | | Hydrogen-Bonding Compound | | | | | | |
|---|---|---|---|---|---|---|---|---|---|---|---|---|
| | Substitution of Cellulose Acylate | | | | | donor | | molecular weight/(donor | number of whole | | | |
| | acetyl | propionyl | total degree of acyl substitution | type | amount added (mas. pt.) | type | number + acceptor number | molecular weight | number + acceptor number) | aromatic ring structure | ClogP | amount added (mas. pt.) |
| Example 7 | 1.50 | 0.85 | 2.35 | saccharose benzoate | 6 | A-16 | 7 | 360 | 51 | 2 | 5.1 | 6.0 |
| Example 8 | 1.50 | 0.85 | 2.35 | glucose benzoate | 6 | A-16 | 7 | 360 | 51 | 2 | 5.1 | 6.0 |
| Example 9 | 1.50 | 0.85 | 2.35 | galactose benzoate | 6 | A-16 | 7 | 360 | 51 | 2 | 5.1 | 6.0 |
| Example 10 | 1.50 | 0.85 | 2.35 | maltose benzoate | 6 | A-16 | 7 | 360 | 51 | 2 | 5.1 | 6.0 |
| Comparative Example 9 | 1.50 | 0.85 | 2.35 | none | | A-16 | 7 | 360 | 51 | 2 | 5.1 | 6.0 |
| Comparative Example 10 | 1.50 | 0.85 | 2.35 | saccharose benzoate | 6 | none | | | | | | |

| | Stretching Condition | | Film | | | | | Polarizer | Polarizer |
|---|---|---|---|---|---|---|---|---|---|
| | Temperature (° C.) | draw ratio (%) | Thickness (μm) | Re (nm) | Rth (nm) | Re Humidity Dependence | Rth Humidity Dependence | Durability (1) | Durability (2) |
| Example 7 | 135.0 | 40 | 45 | 50 | 120 | 10% | 12% | — | 0.3% |
| Example 8 | 135.0 | 40 | 45 | 51 | 121 | 11% | 13% | — | 0.3% |
| Example 9 | 135.0 | 40 | 45 | 49 | 118 | 9% | 11% | — | 0.3% |
| Example 10 | 135.0 | 40 | 45 | 47 | 115 | 10% | 10% | — | 0.3% |
| Comparative Example 9 | 135 | 40 | 45 | 48 | 120 | 15% | 16% | — | 0.6% |
| Comparative Example 10 | 135 | 40 | 45 | 49 | 126 | 22% | 20% | — | 0.3% |

From the results in Table 11 to Table 14, it is known that, of the polarizers using the cellulose acylate film of the invention, the environmental humidity-dependent Re and Rth change is small and that, after aged in high-temperature and high-humidity environments, the polarizers deteriorate little, as compared with the polarizers using the cellulose acylate film which is the same as that of the cellulose acylate resin in the above film in point of the degree of acyl substitution, which does not contain the hydrophobizing agent falling within the scope of the invention and which contains the hydrogen-bonding compound falling within the scope of the invention (or that is, Comparative Examples 2 to 4, 6, 7 and 9). In addition, it is also known that the polarizers using the cellulose acylate film of the invention are noticeably improved in point of the resistance to environmental humidity-dependent Re and Rth change while they maintain the polarizer durability thereof as such, as compared with the polarizers using the cellulose acylate film which is the same as that of the cellulose acylate resin in the above film in point of the degree of acyl substitution, which contains the hydrophobizing agent falling within the scope of the invention and which does not contain the hydrogen-bonding compound falling within the scope of the invention (or that is, Comparative Examples 1, 5, 8 and 10). Further, it is also known that the polarizers using the cellulose acylate film of the invention are noticeably improved in point of the resistance to environmental humidity-dependent Re and Rth change while they maintain the polarizer durability thereof as such, as compared with the polarizers of Comparative Examples 11 to 14 using the cellulose acylate film to which neither a hydrophobizing agent nor a hydrogen-bonding compound is added. In addition, when Comparative Examples 11 to 14 are compared with Comparative Examples of another embodiment where only a hydrophobizing agent is added, or with Comparative Examples of another embodiment where only a hydrogen-bonding compound is added, it is known that addition of any one of those additives is insufficient for the improvement.

Specifically, it is known that, of the polarizers using the cellulose acylate film of the invention, the environmental humidity-dependent retardation change is small and that, when the film is stuck to a polarizer and when aged in high-temperature and high-humidity environments, the film can prevent the deterioration of the polarizing element.

Example 11

Production of Liquid-Crystal Display Device

Two polarizers were peeled away from a commercially-available liquid-crystal television (SONY's Bravia J5000), and the polarizer of the invention comprising the cellulose acylate film of Example 8 was stuck to the viewers' side and the backlight side of the device, using an adhesive, in such a manner that the cellulose acylate film of Example 8 could face the liquid-crystal cell in the device. Thus, one polarizer was stuck each to the viewers' side and the backlight side of the device. In this, the transmission axis of the viewers' side polarizer was set in the vertical direction while the transmission axis of the backlight side polarizer was in the horizontal direction, thus in cross-Nicol configuration. Thus produced, the liquid-crystal display devices of the invention are good in that, even when the environmental humidity is changed and even when the devices are watched in oblique directions, the contrast change and the color shift are both small, and in addition, even when the devices are used in high-temperature and high-humidity environments for a longtime, the contrast depression thereof is small.

Example 401

Preparation of Cellulose Acylate

A cellulose acylate was produced according to the method described in JP-A 10-45804 and 08-231761, and analyzed for the degree of substitution thereof. Concretely, as a catalyst, sulfuric acid (7.8 parts by mass relative to 100 parts by mass of cellulose) was added to cellulose, and a carboxylic acid to be the starting material for the acyl substituent was added thereto for acylation at 40° C. In this, the type and the amount of the carboxylic acid were changed to thereby change and control the type of the acyl group and the degree of substitution. After the acylation, the system was ripened at 40° C. Further, the cellulose acylate was washed with acetone to remove the low-molecular fraction therefrom.

(Preparation of Cellulose Acylate Solution C01 for Low-Substitution Layer)

The following ingredients were put into a mixing tank and dissolved by stirring to prepare a cellulose acylate solution having a solid concentration of 22% by mass. The viscosity of the cellulose acylate solution was 60 Pa·s.

| | |
|---|---|
| Cellulose acetate (having a degree of substitution of 2.45) | 100.0 parts by mass |
| Polycondensate polyester J-35 | 16.0 parts by mass |
| Hydrogen-bonding compound | 3.0 parts by mass |
| Methylene chloride | 365.5 parts by mass |
| Methanol | 54.6 parts by mass |

The polycondensate polyester A-35 is terephthalic acid/succinic acid/propylene glycol/ethylene glycol copolymer (copolymerization ratio [mol %]=27.5/22.5/25/25).

(Preparation of Cellulose Acylate Solution S01 for High-Substitution Layer)

The following ingredients were put into a mixing tank and dissolved by stirring to prepare a cellulose acylate solution. The amount of the solvent (methylene chloride and methanol) was so controlled that the solid concentration in the cellulose acylate solution could be as in Table 2 below.

| | |
|---|---|
| Cellulose acetate (having a degree of substitution of 2.79) | 100.0 parts by mass |
| Polycondensate polyester J-35 | 19.0 parts by mass |
| Silica fine particles R972 (by Nippon Aerosil) | 0.15 parts by mass |
| Methylene chloride | 395.0 parts by mass |
| Methanol | 59.0 parts by mass |

The solid concentration in the obtained cellulose acylate solution S01 for high-substitution layer was 20.0% by mass, and the viscosity thereof was 30 Pa·s.

(Production of Polarizer Protective Film 401)

The cellulose acylate solution $CO_1$ for low-substitution layer was cast to form a layer having a thickness of 56 μm and the cellulose acylate solution S01 for high-substitution layer was cast to form a skin A layer and a skin B layer each having a thickness of 2 μm. The formed web (film) was peeled from the band and clipped, and while the residual solvent amount in the film was from 20 to 5% by mass of the entire mass of the film, this was laterally stretched by 1.08 times at 140° C. using a tenter. Next, the film was unclipped, dried at 130° C. for 20 minutes, and further using a tenter, this was again laterally stretched by 1.2 times at 180° C., thereby producing a polarizer protective film 401 of the invention.

The residual solvent amount was computed according to the following formula:

Residual Solvent Amount (% by mass)=$\{(M-N)/N\} \times 100$, wherein M indicates the mass of the web at an arbitrary time, and N indicates the mass of the same web after dried at 120° C. for 2 hours.

Examples 402 to 420, and Comparative Examples 501 to 508, 511 and 512

Polarizer protective films of Examples 402 to 420 and polarizer protective films of Comparative Examples 501 to 508, 511 and 512 were produced in the same manner as in Example 401, except that the type of the hydrophobizing agent and/or the type of the hydrogen-bonding compound to be added to the cellulose acylate solution for low-substitution layer in Example 401 were changed to those in Table 15.

In Table 15, the compound U-6 did not dissolve in the dope in Comparative Example 507.

TABLE 15

| Number of Cellulose Acylate Film | Hydrophobizing Agent type | amount added* | Hydrogen-Bonding Compound type | donor number + acceptor number | molecular weight | molecular weight/(donor number + acceptor number) | number of whole aromatic ring structure | ClogP | amount added* | Remarks |
|---|---|---|---|---|---|---|---|---|---|---|
| 401 | polycondensate ester J-35 | 15.0 | A-11 | 5 | 187 | 37 | 1 | 2.2 | 2.0 | the invention |
| 402 | polycondensate ester J-35 | 15.0 | A-35 | 7 | 362 | 52 | 3 | 4.8 | 2.0 | the invention |
| 403 | polycondensate ester J-35 | 15.0 | C-116 | 8 | 409 | 51 | 3 | 3.0 | 2.0 | the invention |
| 404 | polycondensate ester J-35 | 15.0 | C-143 | 8 | 376 | 47 | 3 | 3.6 | 2.0 | the invention |

TABLE 15-continued

| Number of Cellulose Acylate Film | Hydrophobizing Agent type | amount added* | Hydrogen-Bonding Compound |||||| amount added* | Remarks |
| | | | type | donor number + acceptor number | molecular weight | molecular weight/(donor number + acceptor number) | number of whole aromatic ring structure | ClogP | | |
| --- | --- | --- | --- | --- | --- | --- | --- | --- | --- | --- |
| 405 | polycondensate ester J-35 | 15.0 | D-103 | 7 | 258 | 37 | 2 | 1.8 | 2.0 | the invention |
| 406 | polycondensate ester J-35 | 15.0 | D-104 | 7 | 258 | 37 | 2 | 1.8 | 2.0 | the invention |
| 407 | polycondensate ester J-35 | 15.0 | E-203 | 6 | 362 | 60 | 3 | 4.6 | 2.0 | the invention |
| 408 | polycondensate ester J-35 | 15.0 | E-207 | 7 | 377 | 54 | 3 | 4.1 | 2.0 | the invention |
| 409 | polycondensate ester J-35 | 15.0 | F-111 | 7 | 320 | 46 | 2 | 3.5 | 2.0 | the invention |
| 410 | polycondensate ester J-35 | 15.0 | H-104 | 6 | 240 | 40 | 2 | 1.3 | 2.0 | the invention |
| 501 | polycondensate ester J-35 | 15.0 | none | — | — | — | — | — | — | comparative example |
| 502 | polycondensate ester J-35 | 15.0 | U-1 | 6 | 412 | 69 | 4 | 7.0 | 2.0 | comparative example |
| 503 | polycondensate ester J-35 | 15.0 | U-2 | 6 | 354 | 59 | 4 | 6.2 | 2.0 | comparative example |
| 504 | polycondensate ester J-35 | 15.0 | U-3 | 6 | 355 | 59 | 4 | 6.2 | 2.0 | comparative example |
| 505 | polycondensate ester J-35 | 15.0 | U-4 | 4 | 264 | 66 | 1 | 6.3 | 2.0 | comparative example |
| 506 | polycondensate ester J-35 | 15.0 | U-5 | 6 | 390 | 65 | 0 | −1.5 | 2.0 | comparative example |
| 507 | polycondensate ester J-35 | 15.0 | U-6 | 5 | 135 | 27 | 1 | −0.5 | 2.0 | comparative example |
| 508 | none | 0.0 | A-35 | 7 | 362 | 52 | 3 | 4.8 | 2.0 | comparative example |
| 411 | carbohydrate derivative K-1 | 8.0 | A-11 | 5 | 187 | 37 | 1 | 2.2 | 4.0 | the invention |
| 412 | carbohydrate derivative K-1 | 8.0 | A-35 | 7 | 362 | 52 | 3 | 4.8 | 4.0 | the invention |
| 412 | carbohydrate derivative K-1 | 8.0 | C-116 | 8 | 409 | 51 | 3 | 3.0 | 4.0 | the invention |
| 412 | carbohydrate derivative K-1 | 8.0 | C-143 | 8 | 376 | 47 | 3 | 3.6 | 4.0 | the invention |
| 412 | carbohydrate derivative K-1 | 8.0 | D-103 | 7 | 258 | 37 | 2 | 1.8 | 4.0 | the invention |
| 412 | carbohydrate derivative K-1 | 8.0 | D-104 | 7 | 258 | 37 | 2 | 1.8 | 4.0 | the invention |
| 412 | carbohydrate derivative K-1 | 8.0 | E-203 | 6 | 362 | 60 | 3 | 4.6 | 4.0 | the invention |
| 412 | carbohydrate derivative K-1 | 8.0 | E-207 | 7 | 377 | 54 | 3 | 4.1 | 4.0 | the invention |
| 412 | carbohydrate derivative K-1 | 8.0 | F-111 | 7 | 320 | 46 | 2 | 3.5 | 4.0 | the invention |
| 412 | carbohydrate derivative K-1 | 8.0 | H-104 | 6 | 240 | 40 | 2 | 1.3 | 4.0 | the invention |
| 511 | carbohydrate derivative K-1 | 8.0 | | — | — | — | — | — | 0.0 | comparative example |
| 512 | carbohydrate derivative K-1 | 0.0 | A-35 | 7 | 362 | 52 | 3 | 4.8 | 4.0 | comparative example |

[Chemical Formula 77]

Compound T

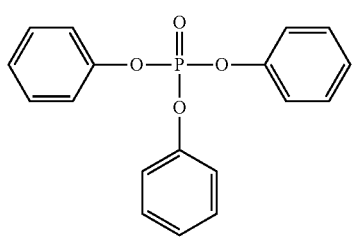

Compound U-1

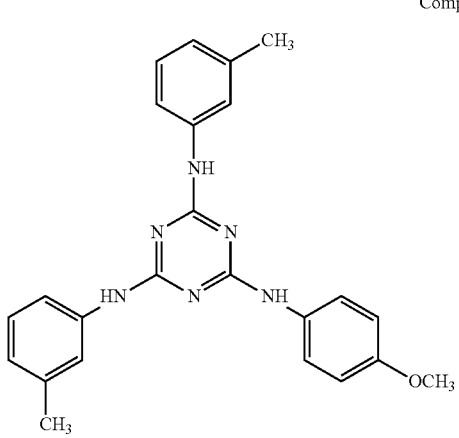

Compound U-2

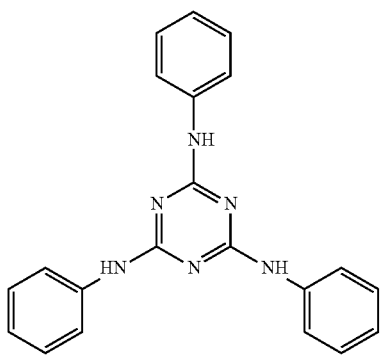

Compound U-3

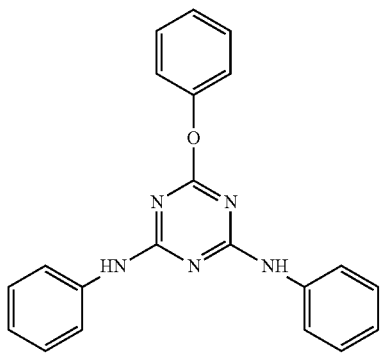

[Chemical Formula 78]

Compound U-4

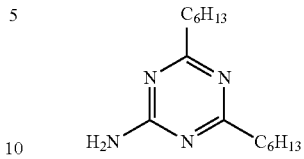

Compound U-5: penta-O-acetyl-β-D-galactopyranose (by Tokyo Chemical)

[Chemical Formula 79]

Compound U-6

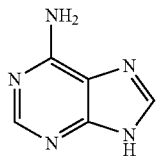

Example 421

Production of Polarizer Protective Film 421

The cellulose acylate solution C01 for low-substitution layer prepared in Example 421 was cast to form a layer having a thickness of 90 μm and the cellulose acylate solution S01 for high-substitution layer was cast to form a skin A layer and a skin B layer each having a thickness of 3 μm. The formed web (film) was peeled from the band and clipped, and while the residual solvent amount in the film was from 20 to 5% by mass of the entire mass of the film, this was laterally stretched by 1.3 times at 140° C. using a tenter. Next, the film was unclipped and dried at 130° C. for 20 minutes, thereby producing a polarizer protective film 410 of the invention.

The residual solvent amount was computed according to the following formula:

Residual Solvent Amount (% by mass)=$\{(M-N)/N\} \times 100$, wherein M indicates the mass of the web at an arbitrary time, and N indicates the mass of the same web after dried at 120° C. for 2 hours.

Examples 422 to 430, and Comparative Examples 521 and 522

Polarizer protective films 421 to 430 of Examples 422 to 430 and polarizer protective films 521 and 522 of Comparative Examples 521 and 522 were produced in the same manner as in Example 421, except that the type of the hydrophobizing agent and/or the type of the hydrogen-bonding compound to be added to the cellulose acylate solution for low-substitution layer in Example 421 were changed to those in Table 16.

TABLE 16

| Number of Cellulose Acylate Film | Hydrophobizing Agent type | amount added* | Hydrogen-Bonding Compound type | donor number + acceptor number | molecular weight | molecular weight/(donor number + acceptor number) | number of whole aromatic ring structure | ClogP | amount added* | Remarks |
|---|---|---|---|---|---|---|---|---|---|---|
| 421 | Polycondensate Ester J-38 | 10 | A-11 | 5 | 187 | 37 | 1 | 2.2 | 6.0 | the invention |
| 422 | Polycondensate Ester J-38 | 10 | A-35 | 7 | 362 | 52 | 3 | 4.8 | 6.0 | the invention |
| 423 | Polycondensate Ester J-38 | 10 | C-116 | 8 | 409 | 51 | 3 | 3.0 | 6.0 | the invention |
| 424 | Polycondensate Ester J-38 | 10 | C-143 | 8 | 376 | 47 | 3 | 3.6 | 6.0 | the invention |
| 425 | Polycondensate Ester J-38 | 10 | D-103 | 7 | 258 | 37 | 2 | 1.8 | 6.0 | the invention |
| 426 | Polycondensate Ester J-38 | 10 | D-104 | 7 | 258 | 37 | 2 | 1.8 | 6.0 | the invention |
| 427 | Polycondensate Ester J-38 | 10 | E-203 | 6 | 362 | 60 | 3 | 4.6 | 6.0 | the invention |
| 428 | Polycondensate Ester J-38 | 10 | E-207 | 7 | 377 | 54 | 3 | 4.1 | 6.0 | the invention |
| 429 | Polycondensate Ester J-38 | 10 | F-111 | 7 | 320 | 46 | 2 | 3.5 | 6.0 | the invention |
| 430 | Polycondensate Ester J-38 | 10 | H-104 | 6 | 240 | 40 | 2 | 1.3 | 6.0 | the invention |
| 521 | Polycondensate Ester J-38 | 10 | none | — | — | — | — | — | 0.0 | comparative example |
| 522 | none | 0 | A-35 | 7 | 362 | 52 | 3 | 4.8 | 6.0 | comparative example |

Thus produced, the cellulose acylate films were analyzed for Re and Rth thereof in the same manner as in Example 1, the films were used for producing polarizers, and the produced polarizers were tested for the cross transmittance change thereof at a wavelength of 410 nm when stored in an environment at a temperature of 60° C. and at a relative humidity of 95%. The results are shown in Table 17.

TABLE 17

| Number of Cellulose Acylate Film | Re (548) | Rth (548) | Temperature Dependence of Re[a] | Temperature Dependence of Rth[b] | Polarizer Durability (1)[c] | Remarks |
|---|---|---|---|---|---|---|
| 401 | 54 | 120 | 13% | 13% | 0.50% | the invention |
| 402 | 51 | 124 | 14% | 13% | 0.53% | the invention |
| 403 | 50 | 119 | 14% | 12% | 0.54% | the invention |
| 404 | 53 | 123 | 13% | 12% | 0.53% | the invention |
| 405 | 51 | 115 | 13% | 12% | 0.54% | the invention |
| 406 | 59 | 122 | 12% | 12% | 0.51% | the invention |
| 407 | 62 | 141 | 12% | 11% | 0.53% | the invention |
| 408 | 64 | 148 | 12% | 11% | 0.53% | the invention |
| 409 | 52 | 121 | 13% | 12% | 0.54% | the invention |
| 410 | 65 | 153 | 11% | 11% | 0.52% | the invention |
| 501 | 47 | 112 | 20% | 19% | 0.55% | comparative example |
| 502 | 65 | 160 | 16% | 15% | 0.51% | comparative example |
| 503 | 68 | 162 | 16% | 15% | 0.50% | comparative example |
| 504 | 59 | 144 | 16% | 16% | 0.52% | comparative example |
| 505 | 49 | 108 | 17% | 17% | 0.59% | comparative example |
| 506 | 45 | 103 | 18% | 18% | 0.00% | comparative example |
| 507 | | | The compound U-6 did not dissolve in the dope. | | | comparative example |
| 508 | 52 | 132 | 19% | 19% | 0.80% | comparative example |
| 411 | 52 | 125 | 13% | 11% | 0.40% | the invention |
| 412 | 53 | 123 | 12% | 10% | 0.39% | the invention |
| 413 | 54 | 119 | 13% | 11% | 0.40% | the invention |
| 414 | 55 | 120 | 12% | 11% | 0.39% | the invention |
| 415 | 52 | 118 | 13% | 11% | 0.38% | the invention |
| 416 | 54 | 122 | 11% | 10% | 0.39% | the invention |
| 417 | 58 | 139 | 10% | 9% | 0.40% | the invention |

TABLE 17-continued

| Number of Cellulose Acylate Film | Re (548) | Rth (548) | Temperature Dependence of Re[a] | Temperature Dependence of Rth[b] | Polarizer Durability (1)[c] | Remarks |
|---|---|---|---|---|---|---|
| 418 | 59 | 141 | 9% | 8% | 0.38% | the invention |
| 419 | 50 | 123 | 11% | 11% | 0.39% | the invention |
| 420 | 60 | 149 | 9% | 8% | 0.40% | the invention |
| 511 | 38 | 130 | 34% | 24% | 0.40% | comparative example |
| 512 | 58 | 140 | 15% | 15% | 0.82% | comparative example |
| 421 | 70 | 214 | 9% | 9% | 0.57% | the invention |
| 422 | 74 | 209 | 9% | 9% | 0.56% | the invention |
| 423 | 71 | 218 | 9% | 8% | 0.57% | the invention |
| 424 | 72 | 215 | 8% | 9% | 0.56% | the invention |
| 425 | 69 | 221 | 10% | 9% | 0.55% | the invention |
| 426 | 74 | 220 | 8% | 8% | 0.56% | the invention |
| 427 | 80 | 241 | 7% | 7% | 0.57% | the invention |
| 428 | 85 | 251 | 7% | 7% | 0.56% | the invention |
| 429 | 71 | 220 | 9% | 9% | 0.56% | the invention |
| 430 | 88 | 256 | 6% | 7% | 0.56% | the invention |
| 521 | 66 | 185 | 26% | 23% | 0.57% | comparative example |
| 522 | 62 | 178 | 13% | 12% | 0.82% | comparative example |

From the results in Table 17, it is known that, of the polarizers using the cellulose acylate film of the invention, the environmental humidity-dependent Re and Rth change is small and that, after aged in high-temperature and high-humidity environments, the polarizers deteriorate little, as compared with the polarizers using the cellulose acylate film of Comparative Examples which does not contain the hydrophobizing agent falling within the scope of the invention and which contains the hydrogen-bonding compound falling within the scope of the invention. In addition, it is also known that the polarizers using the cellulose acylate film of the invention are noticeably improved in point of the resistance to environmental humidity-dependent Re and Rth change while they maintain the polarizer durability thereof as such, as compared with the polarizers using the cellulose acylate film of Comparative Examples which contains the hydrophobizing agent falling within the scope of the invention and which does not contain the hydrogen-bonding compound falling within the scope of the invention.

Synthesis Example

Synthesis of Compound Represented by General Formula (A-2)

The hydrogen-bonding compounds represented by the general formula (A-2) mentioned below for use in the invention were synthesized.

(Chemical Formula 80]

Compound (3-1)

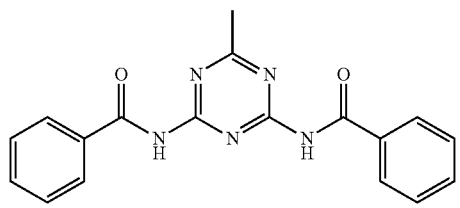

Compound (3-2)

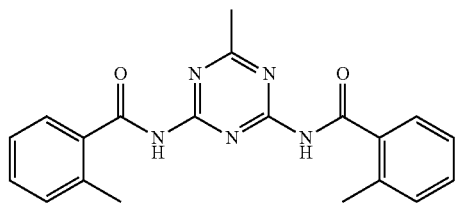

Compound (3-3)

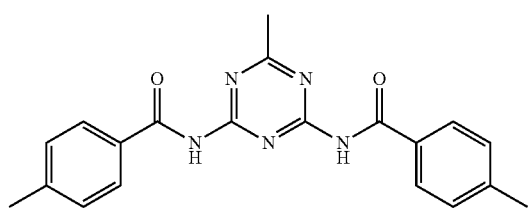

Compound (3-4)

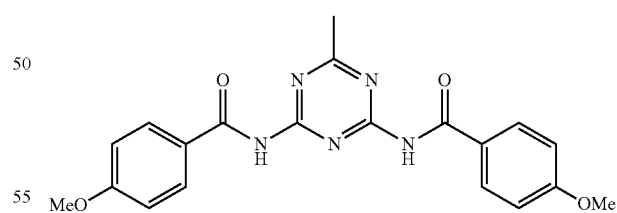

Compound (3-5)

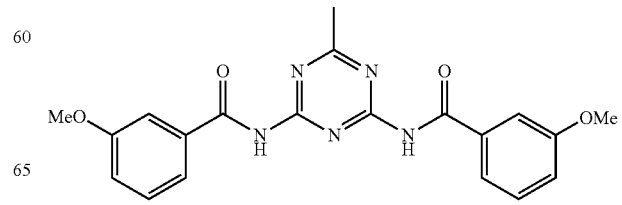

Compound (3-6)

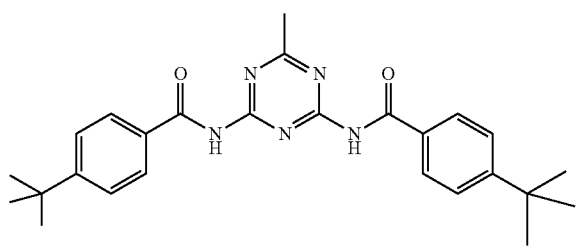

Compound (3-7)

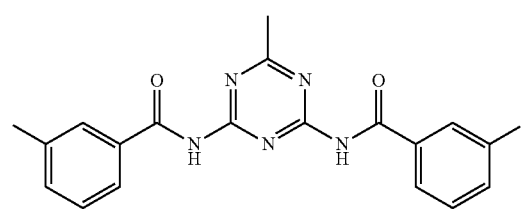

Compound (3-8)

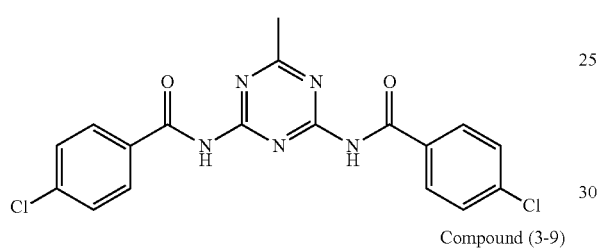

Compound (3-9)

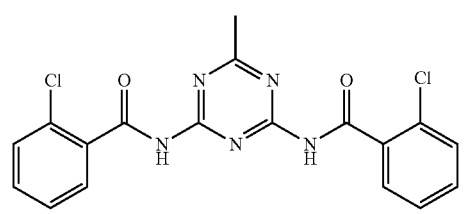

Compound (3-10)

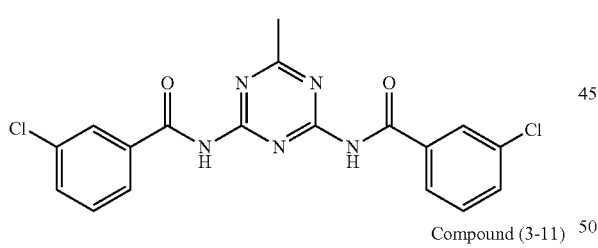

Compound (3-11)

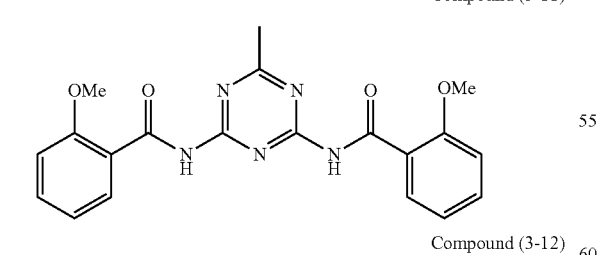

Compound (3-12)

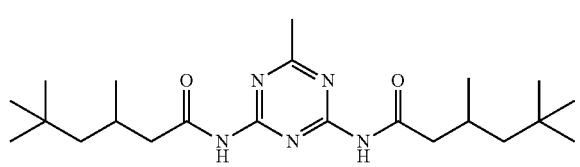

Compouind (3-13)

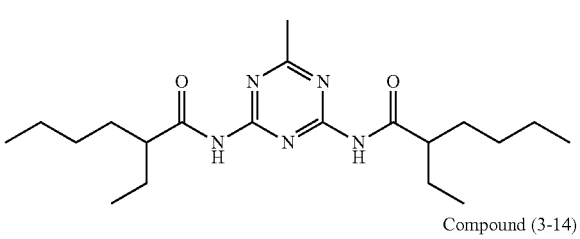

Compound (3-14)

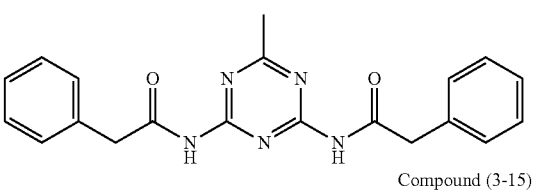

Compound (3-15)

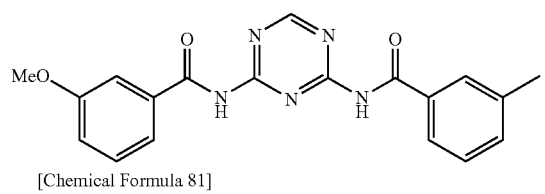

[Chemical Formula 81]

Compound (3-16)

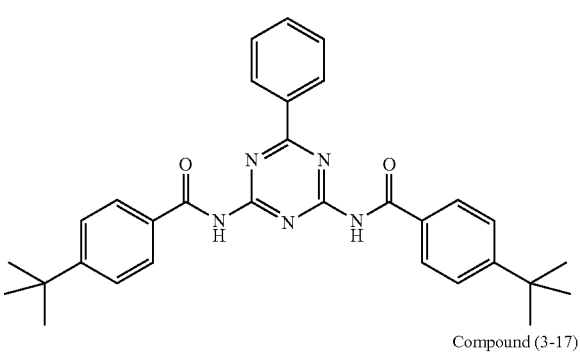

Compound (3-17)

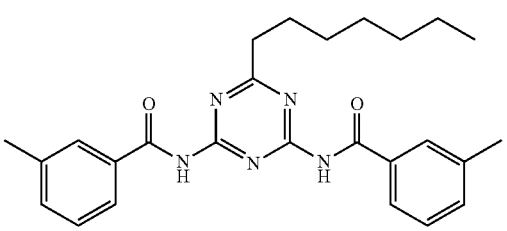

Compound (3-18)

Synthesis of Compound (3-1)

9.9 g (70 mmol) of benzoyl chloride was added to a pyridine 50 mL solution of 10 g (32 mmol) of acetoguanamine, and heated under reflux for 8 hours. The temperature of the reaction system was restored to room temperature, the system was processed for liquid-liquid separation with ethyl acetate and water added thereto, and the organic layer was washed with 1N hydrochloric acid solution and water in that order. The organic layer was dried with magnesium sulfate, the solvent was evaporated away under reduced pressure, and the residue was purified through column chromatography to give the compound (3-1).

The NMR spectrum of the obtained compound (3-1) is as follows:
1H-NMR (solvent, heavy DMSO, standard: tetramethylsilane) δ (ppm):
2.50 (3H, s)
7.45-7.55 (4H, m)
7.60-7.65 (2H, m)
7.90-8.00 (4H, m)
11.20 (2H, s)

Synthesis of Compound (3-2)

The compound was synthesized in the same manner as that for the compound (3-1), except that the starting material was changed from benzoyl chloride to o-methylbenzoyl chloride.

The NMR spectrum of the obtained compound (3-2) is as follows:
1H-NMR (solvent, CDCl$_3$, standard: tetramethylsilane) δ (ppm):
2.50 (6H, s)
2.60 (3H, s)
7.20-7.30 (4H, m)
7.35-7.45 (2H, m)
7.50-7.60 (2H, m)
8.55 (2H, s)

Synthesis of Compound (3-3)

The compound was synthesized in the same manner as that for the compound (3-1), except that the starting material was changed from benzoyl chloride to p-methylbenzoyl chloride.

The NMR spectrum of the obtained compound (3-3) is as follows:
1H-NMR (solvent, heavy DMSO, standard: tetramethylsilane) δ (ppm):
2.35 (6H, s)
2.50 (3H, s)
7.30 (4H, d)
7.85 (4H, d)
11.10 (2H, s)

Synthesis of Compound (3-4)

The compound was synthesized in the same manner as that for the compound (3-1), except that the starting material was changed from benzoyl chloride to p-methoxybenzoyl chloride.

The NMR spectrum of the obtained compound (3-4) is as follows:
1H-NMR (solvent, heavy DMSO, standard: tetramethylsilane) δ (Ppm):
2.50 (3H, s)
3.80 (6H, s)
7.00 (4H, d)
7.95 (4H, d)
11.00 (2H, s)

Synthesis of Compound (3-5)

The compound was synthesized in the same manner as that for the compound (3-1), except that the starting material was changed from benzoyl chloride to m-methoxybenzoyl chloride.

The NMR spectrum of the obtained compound (3-5) is as follows:
1H-NMR (solvent, heavy DMSO, standard: tetramethylsilane) δ (Ppm):
2.50 (3H, s)
3.80 (6H, s)
7.10-7.20 (2H, m)
7.35-7.45 (2H, m)
7.50-7.60 (4H, m)
11.20 (2H, s)

Synthesis of Compound (3-6)

The compound was synthesized in the same manner as that for the compound (3-1), except that the starting material was changed from benzoyl chloride to p-tert-butylbenzoyl chloride.

The NMR spectrum of the obtained compound (3-6) is as follows:
1H-NMR (solvent, heavy DMSO, standard: tetramethylsilane) δ (Ppm):
1.30 (18H, s)
2.50 (3H, s)
7.55 (4H, d)
7.95 (4H, d)
11.10 (2H, s)

Synthesis of Compound (3-7)

The compound was synthesized in the same manner as that for the compound (3-1), except that the starting material was changed from benzoyl chloride to m-methylbenzoyl chloride.

The NMR spectrum of the obtained compound (3-7) is as follows:
1H-NMR (solvent, CDCl$_3$, standard: tetramethylsilane) δ (ppm):
2.40 (6H, s)
2.65 (3H, s)
7.35-7.45 (4H, m)
7.70-7.80 (4H, m)
8.80 (2H, s)

Synthesis of Compound (3-8)

The compound was synthesized in the same manner as that for the compound (3-1), except that the starting material was changed from benzoyl chloride to p-chlorobenzoyl chloride.

The NMR spectrum of the obtained compound (3-8) is as follows:
1H-NMR (solvent, CDCl$_3$, standard: tetramethylsilane) δ (ppm):
2.60 (3H, s)
7.40-7.50 (4H, m)
7.90-8.00 (4H, m)
9.10 (2H, s)

Synthesis of Compound (3-9)

The compound was synthesized in the same manner as that for the compound (3-1), except that the starting material was changed from benzoyl chloride to o-chlorobenzoyl chloride.

The NMR spectrum of the obtained compound (3-9) is as follows:
1H-NMR (solvent, CDCl$_3$, standard: tetramethylsilane) δ (ppm):
2.50 (3H, s)
7.30-7.50 (6H, m)
7.60-7.70 (2H, m)
8.95 (2H, s)

Synthesis of Compound (3-10)

The compound was synthesized in the same manner as that for the compound (3-1), except that the starting material was changed from benzoyl chloride to m-chlorobenzoyl chloride.

The NMR spectrum of the obtained compound (3-10) is as follows:

1H-NMR (solvent, heavy DMSO, standard: tetramethylsilane) δ (Ppm):
2.50 (3H, s)
7.55 (2H, m)
7.70 (2H, m)
7.90 (2H, m)
8.00 (2H, s)
11.35 (2H, s)

Synthesis of Compound (3-11)

The compound was synthesized in the same manner as that for the compound (3-1), except that the starting material was changed from benzoyl chloride to o-methoxybenzoyl chloride.

The NMR spectrum of the obtained compound (3-11) is as follows:

1H-NMR (solvent, heavy DMSO, standard: tetramethylsilane) δ (Ppm):
2.40 (3H, s)
3.80 (6H, s)
7.00-7.20 (4H, m)
7.55 (2H, m)
7.65 (2H, m)
10.70 (2H, s)

Synthesis of Compound (3-12)

The compound was synthesized in the same manner as that for the compound (3-1), except that the starting acid chloride was changed. The product was identified by the MS spectrum thereof.

Synthesis of Compound (3-13)

The compound was synthesized in the same manner as that for the compound (3-1), except that the starting acid chloride was changed. The product was identified by the MS spectrum thereof.

Synthesis of Compound (3-14)

The compound was synthesized in the same manner as that for the compound (3-1), except that the starting acid chloride was changed.

The NMR spectrum of the obtained compound (3-14) is as follows:

1H-NMR (solvent, heavy DMSO, standard: tetramethylsilane) δ (ppm):
2.40 (3H, s)
4.00 (4H, s)
7.20-7.30 (10H, m)
10.90 (2H, s)

Synthesis of Compound (3-15)

The compound was synthesized in the same manner as that for the compound (3-1), except that the starting acid chloride was changed.

The NMR spectrum of the obtained compound (3-15) is as follows:

1H-NMR (solvent, heavy DMSO, standard: tetramethylsilane) δ (Ppm):
2.40 (3H, s)
3.80 (3H, s)
7.15 (1H, m)
7.35-7.55 (5H, m)
7.75 (2H, m)
11.10 (1H, s)
11.20 (1H, s)

Synthesis of Compound (3-16)

The compound was synthesized in the same manner as that for the compound (3-1), except that benzoguanamine and p-tert-butylbenzoyl chloride were used as the starting materials.

The NMR spectrum of the obtained compound (3-16) is as follows:

1H-NMR (solvent, heavy DMSO, standard: tetramethylsilane) δ (Ppm):
1.35 (18H, s)
7.50-7.60 (7H, m)
7.90-8.00 (4H, m)
7.30 (2H, m)
11.20 (2H, s)

Synthesis of Compound (3-17)

[Chemical Formula 82]

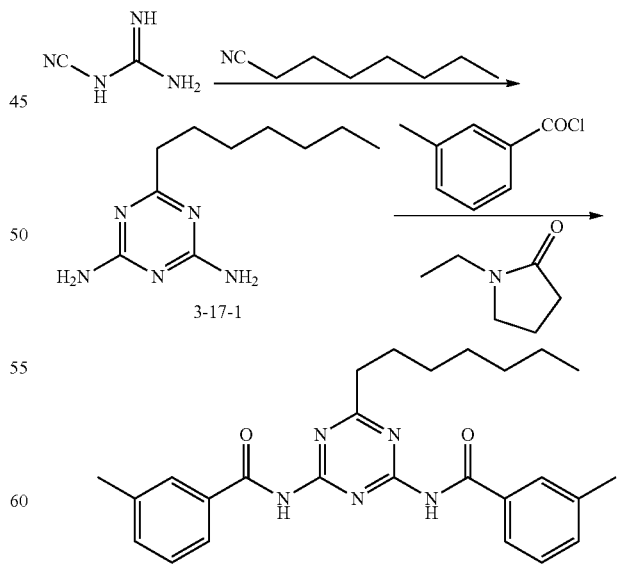

The intermediate 3-17-1 was synthesized according to the method described in Chemistry-A European Journal, 2005, Vol. 11, #22, pp. 6616-6628, with which the compound was synthesized in the same manner as that for the compound (3-7). The product was identified by the MS spectrum thereof.

Synthesis of Compound (3-18)

The compound was synthesized in the same manner as that for the compound (3-17), and the product was identified by the MS spectrum thereof.

Synthesis of Compound (C-103)

[Chemical Formula 83]

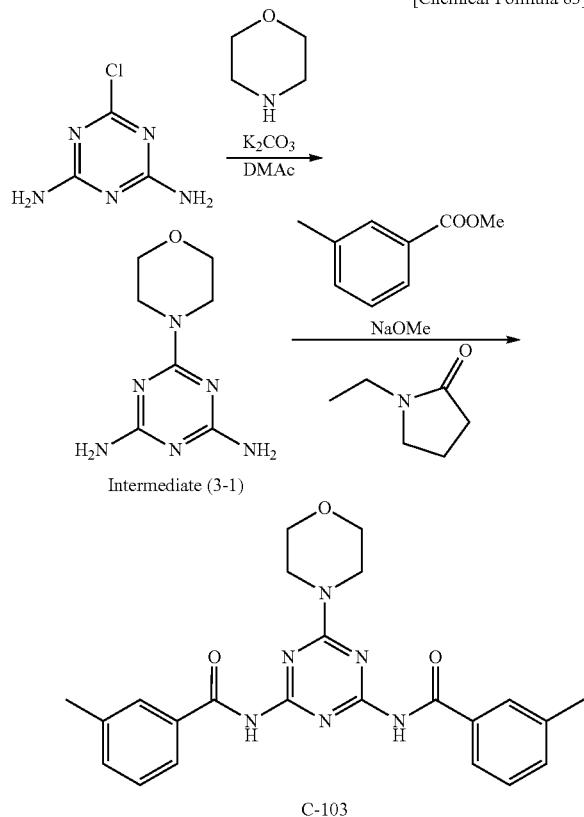

50 g of 2-chloro-4,6-diamino-1,3,5-triazine, 60 g of morpholine and 95 g potassium carbonate were added to 300 ml of dimethylacetamide, and stirred at 100° C. for 3 hours. After cooled to room temperature, 1 L of saline water was added to the reaction liquid, cooled to 10° C., and the precipitated crystal was taken out through filtration. The crystal was washed with water and acetonitrile, and dried to give 55 g of the intermediate (3-1). 40 g of the intermediate (3-1), 64 g of methyl 2-methylbenzoate and 55 g of sodium methoxide were added to 400 ml of N-ethylpyrrolidone, and stirred at 40° C. for 30 minutes. After cooled to room temperature, 1N hydrochloric acid solution was added to the reaction liquid, and the precipitated crystal was taken out through filtration. The crystal was washed with water and dried. The crystal was stirred in a mixed solvent of ethyl acetate, methanol and aqueous sodium hydrogencarbonate solution, and the crystal was taken out through filtration. The crystal was washed with water and acetonitrile, and dried to give 60 g of the intended product.

1H-NMR (solvent: CDCl$_3$, standard: tetramethylsilane) δ (ppm):

Synthesis of Compound (C-153)

[Chemical Formula 84]

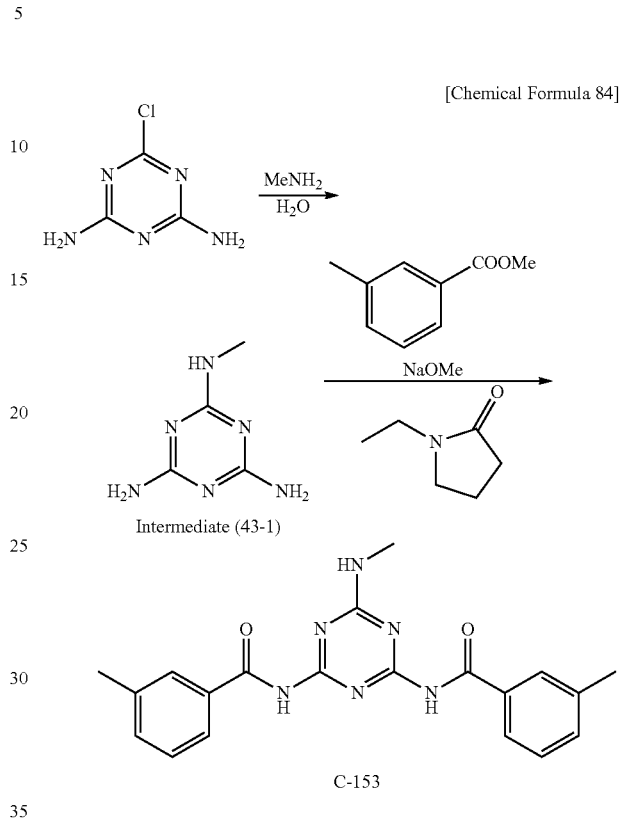

60 ml of aqueous 40% methylamine solution was added to 20 g of 2-chloro-4,6-diamino-1,3,5-triazine, and stirred at 70° C. for 2 hours. After cooled to room temperature, water was added to the reaction liquid, and the crystal was taken out through filtration. The crystal was washed with isopropanol and hexane, and dried to give 16 g of the intermediate (43-1). Afterwards, this was processed in the same manner as that for the compound (C-103) to give the intended product.

1H-NMR (solvent: CDCl$_3$, standard: tetramethylsilane) δ (ppm):

Synthesis of Compound (C-113)

300 ml of methanol and 16 g of sodium hydroxide were added to 27 g of 2-chloro-4,6-diamino-1,3,5-triazine, and heated under reflux for 5 hours. After cooled to room temperature, water was added to the reaction liquid, and the crystal was taken out through filtration. The crystal was washed with water, and dried to give 17 g of the intermediate (13-1). 17 g of the intermediate (13-1), 38 g of methyl 2-methylbenzoate and 33 g of sodium methoxide were added to 200 ml of N-ethylpyrrolidone, and stirred at 40° C. for 8 hours. After cooled to room temperature, 1N hydrochloric acid solution, ethyl acetate and hexane were added to the reaction liquid, and the precipitated crystal was taken out through filtration. The crystal was recrystallized with isopropanol and dried to give 20 g of the intended product.

1 Upper Polarizer
2 Direction of Absorption Axis of Upper Polarizer
3 Liquid-Crystal Cell Upper Electrode Substrate
4 Upper Substrate Alignment Control Direction 5 Liquid-Crystal Layer
6 Liquid-Crystal Cell Lower Electrode Substrate
7 Lower Substrate Alignment Control Direction
8 Lower Polarizer
9 Direction of Absorption Axis of Lower Polarizer
10 Liquid-Crystal Display Device

The invention claimed is:

1. A cellulose acylate film, which contains a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent:
(A) the compound has both a hydrogen-bonding donor part and a hydrogen-bonding acceptor part in one molecule,
(B) the value computed by dividing the molecular weight of the compound by the total number of the hydrogen-bonding donor number and the hydrogen-bonding acceptor number in the compound is from 30 to 65, and
(C) the total number of the aromatic ring structures in the compound is from 1 to 3, and further satisfies that a C log P value of the hydrogen-bonding compound is from 0 to 5.5,
wherein the hydrogen-bonding compound is a compound represented by the following general formula (A-1):

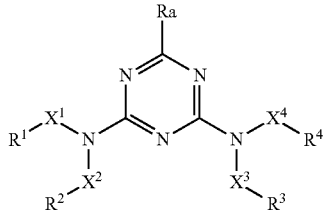

General Formula (A-1)

wherein Ra represents an alkyl group, an alkenyl group, an alkynyl group, a heterocyclic group or an aryl group; X1 and X4 each independently represent at least one selected from divalent linking groups represented by the following general formula (P):

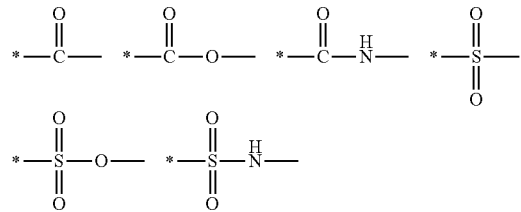

General Formula (P)

wherein the side * is the linking site via which the formula links with the N atom substituting on the 1,3,5-triazine ring in the compound represented by the general formulae (A-1); $X^2$ and $X^3$ each represent a single bond; $R^1$, $R^2$, $R^3$ and $R^4$ each independently represent a hydrogen atom, an alkyl group, an alkenyl group, an alkynyl group, an aryl group or a heterocyclic group.

2. The cellulose acylate film according to claim 1, wherein the molecular weight of the hydrogen-bonding compound is from 100 to 1000.

3. A retardation film containing a cellulose acylate film containing a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent:
(A) the compound has both a hydrogen-bonding donor part and a hydrogen-bonding acceptor part in one molecule,
(B) the value computed by dividing the molecular weight of the compound by the total number of the hydrogen-bonding donor number and the hydrogen-bonding acceptor number in the compound is from 30 to 65, and
(C) the total number of the aromatic ring structures in the compound is from 1 to 3, and further satisfies that a C log P value of the hydrogen-bonding compound is from 0 to 5.5,
wherein the hydrogen-bonding compound is a compound represented by the following general formula (A-1):

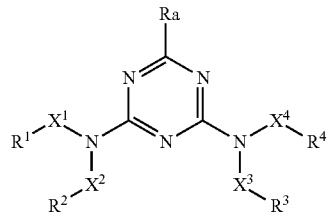

General Formula (A-1)

wherein Ra represents an alkyl group, an alkenyl group, an alkynyl group, a heterocyclic group or an aryl group; X1 and X4 each independently represent at least one selected from divalent linking groups represented by the following general formula (P):

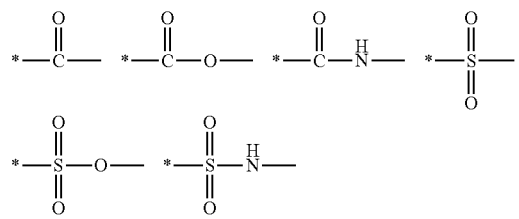

General Formula (P)

wherein the side * is the linking site via which the formula links with the N atom substituting on the 1,3,5-triazine ring in the compound represented by the general formulae (A-1); $X^2$ and $X^3$ each represent a single bond; $R^1$, $R^2$, $R^3$ and $R^4$ each independently represent a hydrogen atom, an alkyl group, an alkenyl group, an alkynyl group, an aryl group or a heterocyclic group.

4. A polarizer containing a cellulose acylate film containing a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent:
(A) the compound has both a hydrogen-bonding donor part and a hydrogen-bonding acceptor part in one molecule,
(B) the value computed by dividing the molecular weight of the compound by the total number of the hydrogen-bonding donor number and the hydrogen-bonding acceptor number in the compound is from 30 to 65, and (C) the total number of the aromatic ring structures in the compound is from 1 to 3, and further satisfies that a C log P value of the hydrogen-bonding compound is from 0 to 5.5, wherein the hydrogen-bonding compound is a compound represented by the following general formula (A-1):

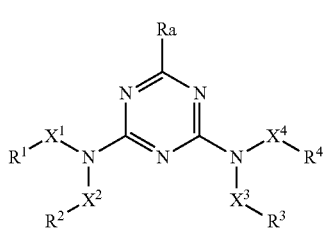

General Formula (A-1)

wherein Ra represents an alkyl group, an alkenyl group, an alkynyl group, a heterocyclic group or an aryl group; X1 and X4 each independently represent at least one selected from divalent linking groups represented by the following general formula (P):

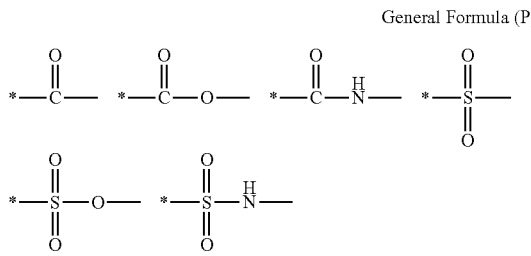

General Formula (P)

wherein the side * is the linking site via which the formula links with the N atom substituting on the 1,3,5-triazine ring in the compound represented by the general formulae (A-1); $X^2$ and $X^3$ each represent a single bond; $R^1$, $R^2$, $R^3$ and $R^4$ each independently represent a hydrogen atom, an alkyl group, an alkenyl group, an alkynyl group, an aryl group or a heterocyclic group.

5. A liquid-crystal display device containing a cellulose acylate film containing a hydrogen-bonding compound satisfying the following requirements (A) to (C), and at least one hydrophobizing agent selected from a polyalcohol ester-base hydrophobizing agent, a polycondensate ester-base hydrophobizing agent and a carbohydrate derivative-base hydrophobizing agent:

(A) the compound has both a hydrogen-bonding donor part and a hydrogen-bonding acceptor part in one molecule,
(B) the value computed by dividing the molecular weight of the compound by the total number of the hydrogen-bonding donor number and the hydrogen-bonding acceptor number in the compound is from 30 to 65, and
(C) the total number of the aromatic ring structures in the compound is from 1 to 3, and further satisfies that a C log P value of the hydrogen-bonding compound is from 0 to 5.5, wherein the hydrogen-bonding compound is a compound represented by the following general formula (A-1):

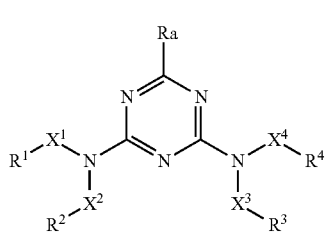

General Formula (A-1)

wherein Ra represents an alkyl group, an alkenyl group, an alkynyl group, a heterocyclic group or an aryl group; X1 and X4 each independently represent at least one selected from divalent linking groups represented by the following general formula (P):

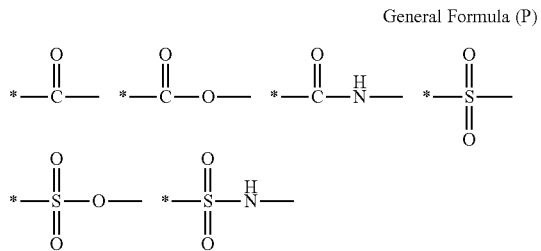

General Formula (P)

wherein the side * is the linking site via which the formula links with the N atom substituting on the 1,3,5-triazine ring in the compound represented by the general formulae (A-1); $X^2$ and $X^3$ each represent a single bond; R', $R^2$, $R^3$ and $R^4$ each independently represent a hydrogen atom, an alkyl group, an alkenyl group, an alkynyl group, an aryl group or a heterocyclic group.

* * * * *